US012332767B2

United States Patent
Lucioni et al.

(10) Patent No.: US 12,332,767 B2
(45) Date of Patent: Jun. 17, 2025

(54) TECHNIQUES FOR AUTOMATICALLY TRIAGING AND DESCRIBING ISSUES DETECTED DURING USE OF A SOFTWARE APPLICATION

(71) Applicant: LogRocket, Inc., Boston, MA (US)

(72) Inventors: Renzo F. Lucioni, Somerville, MA (US); Nikhil S. Phatak, Somerville, MA (US)

(73) Assignee: LogRocket, Inc., Boston, MA (US)

( * ) Notice: Subject to any disclaimer, the term of this patent is extended or adjusted under 35 U.S.C. 154(b) by 0 days.

(21) Appl. No.: 18/422,216

(22) Filed: Jan. 25, 2024

(65) Prior Publication Data

US 2024/0256424 A1    Aug. 1, 2024

Related U.S. Application Data

(60) Provisional application No. 63/596,215, filed on Nov. 3, 2023, provisional application No. 63/441,701, filed on Jan. 27, 2023.

(51) Int. Cl.
*G06F 11/3604*    (2025.01)
*G06F 11/362*    (2025.01)
*G06F 11/3698*    (2025.01)

(52) U.S. Cl.
CPC ........ *G06F 11/3608* (2013.01); *G06F 11/366* (2013.01); *G06F 11/3698* (2025.01)

(58) Field of Classification Search
None
See application file for complete search history.

(56) References Cited

U.S. PATENT DOCUMENTS

| | | | |
|---|---|---|---|
| 8,935,581 B2 | 1/2015 | Orzell et al. | |
| 9,129,058 B2 | 9/2015 | Cui et al. | |
| 10,838,571 B2 | 11/2020 | Webber et al. | |
| 11,714,637 B1* | 8/2023 | Jin | G06F 8/73 |
| | | | 717/120 |
| 2004/0031017 A1 | 2/2004 | Vaidyanathan et al. | |
| 2010/0191952 A1 | 7/2010 | Keinan | |
| 2013/0246996 A1 | 9/2013 | Duggal et al. | |
| 2017/0052870 A1 | 2/2017 | Shuvali et al. | |
| 2017/0331910 A1 | 11/2017 | Lada et al. | |
| 2018/0239904 A1* | 8/2018 | Kiner | H04L 63/20 |
| 2018/0276063 A1* | 9/2018 | Mendes | G06F 11/3409 |
| 2019/0004823 A1 | 1/2019 | Walker et al. | |

(Continued)

OTHER PUBLICATIONS

International Search Report and Written Opinion mailed Apr. 25, 2024 for International Application No. PCT/US2024/012873.

(Continued)

*Primary Examiner* — Andrew M. Lyons
(74) *Attorney, Agent, or Firm* — Wolf, Greenfield & Sacks, P.C.

(57) ABSTRACT

Described herein are techniques that use machine learning to triage issues by classifying the issues into impact levels. Described herein are also techniques for generating a natural language description of issues that occur in sessions of a software application. The techniques collect data during sessions in which a user is interacting with the software application. The techniques process the data collected during the sessions using a language model to obtain natural language descriptions of issues that occur in the sessions.

21 Claims, 20 Drawing Sheets

(56) References Cited

U.S. PATENT DOCUMENTS

| | | | |
|---|---|---|---|
| 2019/0377652 A1* | 12/2019 | Sahoo | G06F 11/3447 |
| 2020/0026502 A1* | 1/2020 | Moore | G06F 8/38 |
| 2020/0089761 A1* | 3/2020 | Guerra | G06F 40/30 |
| 2020/0159499 A1 | 5/2020 | Bodin et al. | |
| 2021/0091998 A1 | 3/2021 | Ellis et al. | |
| 2022/0237104 A1 | 6/2022 | Davis | |
| 2022/0244975 A1* | 8/2022 | Begert | G06F 8/73 |
| 2022/0382858 A1* | 12/2022 | Ellam | G06Q 10/20 |
| 2023/0084422 A1* | 3/2023 | Shah | G06F 11/366 |
| | | | 714/26 |
| 2023/0109280 A1* | 4/2023 | Eberlein | G06F 11/302 |
| | | | 714/47.1 |
| 2024/0070434 A1* | 2/2024 | Garg | G06F 40/35 |
| 2024/0104002 A1* | 3/2024 | Kumar | G06F 11/3664 |
| 2024/0256429 A1 | 8/2024 | Lucioni et al. | |

OTHER PUBLICATIONS

[No Author Listed], "application impact level issues GUI". Google Patents. Mar. 13, 2024. https://patents.google.com/?q=(application+impact+level+issues+GUI)&scholar&oq=application+impact+level+issue+GUI [last accessed Mar. 19, 2024], 2 pages.

\* cited by examiner

TECHNIQUES FOR AUTOMATICALLY TRIAGING AND DESCRIBING ISSUES DETECTED DURING USE OF A SOFTWARE APPLICATION

CROSS-REFERENCE TO RELATED APPLICATIONS

This application claims the benefit of priority under 35 U.S.C. 119(e) to U.S. Provisional Patent Application Ser. No. 63/441,701, filed on Jan. 27, 2023, and titled "TECHNIQUES FOR AUTOMATICALLY TRIAGING ISSUES DETECTED DURING USE OF A SOFTWARE APPLICATION," and U.S. Provisional Patent Application Ser. No. 63/596,215, filed on Nov. 3, 2023, and titled "TECHNIQUES FOR AUTOMATICALLY TRIAGING AND DESCRIBING ISSUES DETECTED DURING USE OF A SOFTWARE APPLICATION," each of which is incorporated by reference herein in its entirety.

FIELD

Aspects of the present disclosure relate to techniques for automatically triaging issues in a software application detected during sessions in which users interact with the software application. The techniques can facilitate identification of a subset of detected issues that warrant further investigation (e.g., by technical support and/or software developers). Aspects of the present disclosure further relate to techniques for automatically generating natural language descriptions of issues that occur in sessions of a software application.

BACKGROUND

A software application may be used by a large number of users (e.g., thousands of users). For example, the software application may be a web application that is accessible by devices using an Internet browser application. The web application may be accessed hundreds or thousands of times on a daily basis by users through various different sessions. As another example, the software application may be a mobile application that can be accessed using a mobile device. Users may interact with the mobile application through a graphical user interface (GUI) of the mobile application presented on mobile devices. Issues may occur in sessions of the software application. The issues may need to be investigated in order to improve functionality of the software application.

SUMMARY

Described herein are techniques for detecting and triaging potential issues that occur during interactions of users with a software application. The techniques collect data during sessions in which a user is interacting with the software application. The data may be obtained from a device being used to access the software application. The techniques detect occurrences of potential issues in at least some of the sessions. The techniques generate, in a graphical user interface (GUI), an indication of impact level of the potential issues. The techniques obtain data collected during one or more sessions in which an issue occurred, determine a classification of the issue into one of multiple impact levels using the data collected during the session(s), and generate a visual indication in the GUI indicating an impact level into which the issue was classified.

Described herein are techniques for automatically generating natural language descriptions of software application sessions. For example, the techniques automatically generate natural language descriptions of issues that occur during software application sessions. The techniques access data collected during sessions of a software application session. The techniques process the data using a language model (e.g., a large language model (LLM)) to obtain natural language descriptions of activity that occurred in the software application sessions.

Some embodiments provide a system for detecting and triaging potential issues that occur during interactions of a plurality of users with a software application. The system comprises: a processor; and a non-transitory computer-readable storage medium storing instructions that, when executed by the processor, cause the processor to: collect, during each of a plurality of sessions in which a user of the plurality of users is interacting with the software application, data from a device being used to interact with the software application; detect occurrences of a plurality of potential issues in at least some of the plurality of sessions; generate, in a graphical user interface (GUI), visual indications of impact levels of the plurality of potential issues, the generating comprising, for each of the plurality of potential issues: obtain data collected during one or more of the plurality of sessions in which the issue occurred; determine a classification of the issue into one of a plurality of impact levels using the data collected during the one or more sessions; and generate, in the GUI, a visual indication of the impact level into which the issue level was classified.

Some embodiments provide a method for detecting and triaging potential issues that occur during interactions of a plurality of users with a software application. The method comprises using a processor to perform: collecting, during each of a plurality of sessions in which a user of the plurality of users is interacting with the software application, data from a device being used to interact with the software application; detecting occurrences of a plurality of potential issues in at least some of the plurality of sessions; generating, visual indications of impact levels of the plurality of potential issues, the generating comprising, for each of the detected plurality of potential issues: obtaining data collected during one or more of the plurality of sessions in which the issue occurred; determining a classification of the issue into one of a plurality of impact levels using the data collected during the one or more sessions; and generating, in the GUI, a visual indication of the impact level into which the issue was classified.

Some embodiments provide a non-transitory computer-readable storage medium storing instructions that, when executed by a processor, cause the processor to perform: collecting, during each of a plurality of sessions in which a user of a plurality of users is interacting with a software application, data from a device being used to interact with the software application; detecting occurrences of a plurality of potential issues in at least some of the plurality of sessions; generating visual indications of impact levels of the plurality of potential issues, the generating comprising, for each of the detected plurality of potential issues: obtaining data collected during one or more of the plurality of sessions in which the issue occurred; determining a classification of the issue into one of a plurality of impact levels using the data collected during the one or more sessions; and generating, in the GUI, a visual indication of the impact level into which the issue was classified.

Some embodiments provide a system for automatically generating natural language descriptions of issues that occur during interactions of users with a software application. The system comprises: a processor; and a non-transitory computer-readable storage medium storing instructions that, when executed by the processor, cause the processor to: access data collected during at least one software application session in which at least one user was interacting with the software application; generate, using the data collected during the at least one software application session, at least one representation of the at least one software application session, wherein the at least one representation of the at least one software application session indicates a sequence of events that occurred in the at least one software application session; and process the at least one representation of the at least one software application session using a trained language model to obtain a natural language description of an issue that occurred in the at least one software application session.

Some embodiments provide a method for automatically generating natural language descriptions of issues that occur during interactions of users with a software application. The method comprises using a processor to perform: accessing data collected during at least one software application session in which at least one user was interacting with the software application; generating, using the data collected during the at least one software application session, at least one representation of the at least one software application session, wherein the at least one representation of the at least one software application session indicates a sequence of events that occurred in the at least one software application session; and processing the at least one representation of the at least one software application session using a trained language model to obtain a natural language description of an issue that occurred in the at least one software application session.

Some embodiments provide a non-transitory computer-readable storage medium storing instructions that, when executed by a processor, cause the processor to perform a method for automatically generating natural language descriptions of issues that occur during interactions of users with a software application. The method comprises: accessing data collected during at least one software application session in which at least one user was interacting with the software application; generating, using the data collected during the at least one software application session, at least one representation of the at least one software application session, wherein the at least one representation of the at least one software application session indicates a sequence of events that occurred in the at least one software application session; and processing the at least one representation of the at least one software application session using a trained language model to obtain a natural language description of an issue that occurred in the at least one software application session.

Some embodiments provide a system for automatically generating natural language descriptions of issues that occur during interactions of users with a software application. The system comprises: a processor; and a non-transitory computer-readable storage medium storing instructions. The instructions, when executed by the processor, cause the processor to: access data collected during at least one software application session in which at least one user was interacting with the software application and in which an issue occurred; generate, using the data collected during the at least one software application session, at least one representation of the at least one software application session, wherein the at least one representation of the at least one software application session indicates a sequence of events that occurred in the at least one software application session; and process the at least one representation of the at least one software application session using the trained language model to obtain the natural language description of the issue that occurred in the at least one software application session.

Some embodiments provide a method for automatically generating natural language descriptions of issues that occur during interactions of users with a software application. The method comprises: using a processor to perform: accessing data collected during at least one software application session in which at least one user was interacting with the software application and in which an issue occurred; generating, using the data collected during the at least one software application session, at least one representation of the at least one software application session, wherein the at least one representation of the at least one software application session indicates a sequence of events that occurred in the at least one software application session; and processing the at least one representation of the at least one software application session using the trained language model to obtain the natural language description of the issue that occurred in the at least one software application session.

Some embodiments provide a non-transitory computer-readable storage medium storing instructions that, when executed by a processor, cause the processor to perform a method for automatically generating natural language descriptions of issues that occur during interactions of users with a software application. The method comprises: accessing data collected during at least one software application session in which at least one user was interacting with the software application and in which an issue occurred; generating, using the data collected during the at least one software application session, at least one representation of the at least one software application session, wherein the at least one representation of the at least one software application session indicates a sequence of events that occurred in the at least one software application session; and processing the at least one representation of the at least one software application session using the trained language model to obtain the natural language description of the issue that occurred in the at least one software application session.

There has thus been outlined, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1:
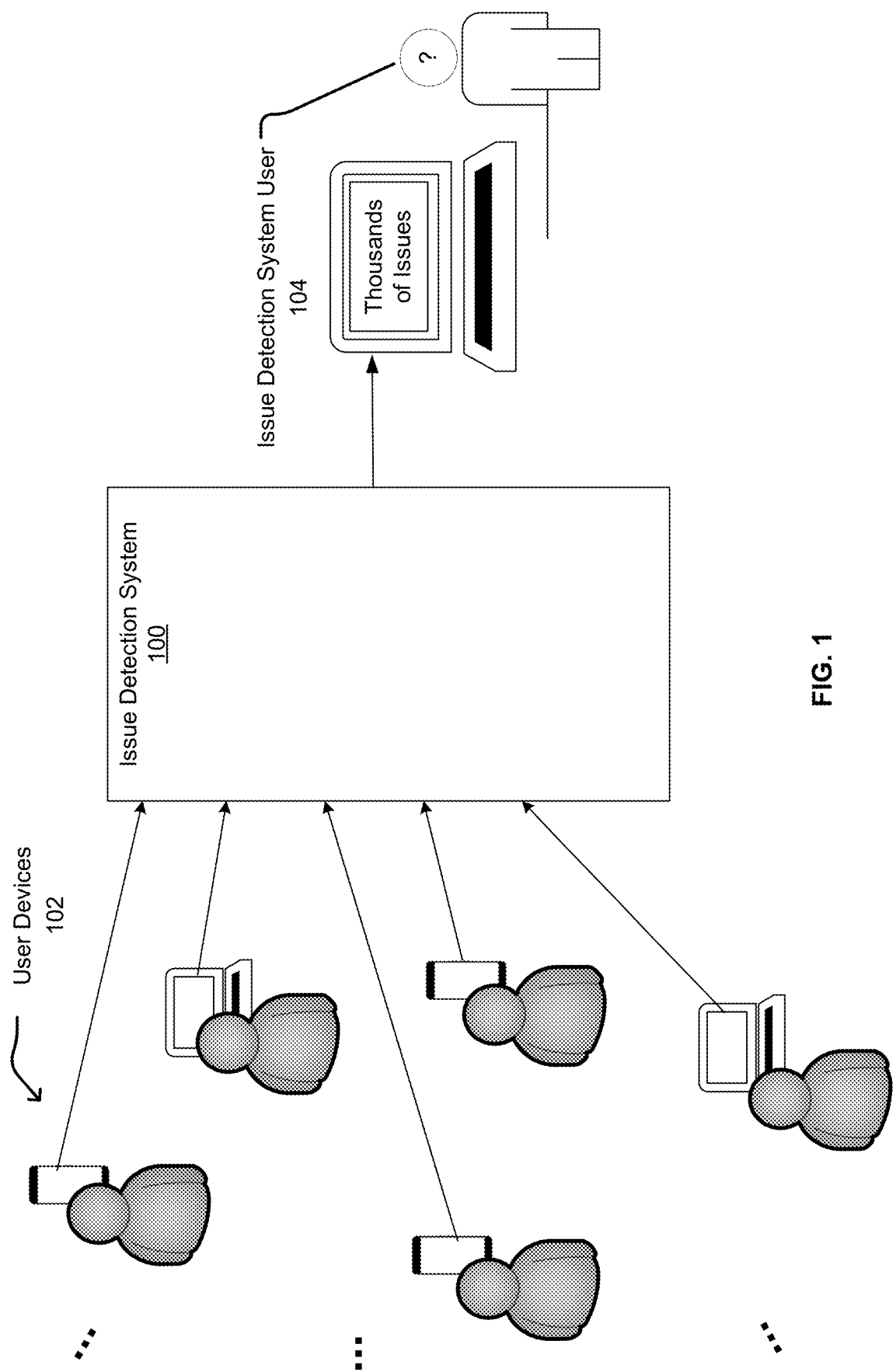
FIG. 1 is a diagram of an issue detection system.

Described herein are techniques for automatically triaging potential issues that occur across various sessions in which users interact with a software application. The techniques facilitate identifying, from among a set of detected potential issues, a subset of issues that have a high impact on operation and use of the software application. For example, results of triaging potential issues may be used by technical support and/or software developers in improving a software application. Some embodiments further use machine learning techniques to generate natural language descriptions of issues that assist users in understanding, troubleshooting, and/or resolving the issues to improve the software application.

A software application may be accessed and used by thousands of users on a daily basis. For example, the software application may be a web application accessed by various users through an Internet browser application. As another example, the software application may be a mobile application accessed by various users using mobile devices (e.g., smartphones or tablets). The software application may thus be accessed by users in a large number of sessions every day by various user devices.

A session refers to a time period in which a user interacts with a software application. A session may be represented by a sequence of events representing a user's perspective of operation of the software application in a time period. A session may be delimited by certain events. For example, a session of a web application may begin when a device accesses the web application using an Internet browser application and end when the device navigates away from the web application. As another example, a session of a mobile application may begin when the mobile application is initiated on a mobile device and end when the mobile application is closed. As another example, a session may end after a certain time period of inactivity.

During a given session in which a user is interacting with the software application, a user may experience an issue in the software application. For example, the issue may be improper functionality of the software application (e.g., an exception) resulting from a bug in code of the software application. As another example, the issue may be improper functionality of a graphical user interface element (e.g., a button) in a GUI of the software application that the user is interacting with. As another example, the issue may be a problem resulting from a failed network communication. As another example, the issue may be slow operation of the software application. Such issues may negatively affect operation of the software application (e.g., by preventing or otherwise delaying completion of functions) or otherwise create an undesired user experience for users interacting with the software application.

To improve a software application, a provider may use an issue detection system to monitor sessions in which the software application is being accessed to detect whether an issue occurred. For example, the provider may employ an issue detection system that automatically collects data from a device accessing the software application, and detects potential issues that occur in the software application. The issue detection system may collect information about usage of the software application during a session that can then be used to investigate any issue that occurred during the session (e.g., to identify a root cause) and/or to identify a resolution in the software application that prevents the issue from occurring in the future (e.g., updating code of the software application to resolve a bug).

FIG. 1 illustrates an issue detection system 100 that may be employed to detect issues that occur in sessions of usage of a software application. As illustrated in FIG. 1, the issue detection system 100 obtains data from many different devices that are accessing the software application. The issue detection system 100 may collect data during each session and use the data to detect whether an issue occurred. The issue detection system 100 may further collect data associated with occurrence of the issue. For example, the issue detection system 100 may collect data about usage of the software application within a time period before and after occurrence of the issue. The collected data may then be provided to a user 104 of the issue detection system 100 for use in investigation of issues and identification of a resolution. For example, the information for each session can include data that allows for re-performing and/or playing back each session that included one or more detected issues. In some examples, the data can be used to provide a graphical animation, video and/or other replay that shows how the user interacted with the software application. For example, the replay can include information about what the user saw while interacting with the software application, how the user behaved during the interaction, and/or other information of the session.

The inventors have recognized that, given the large number of user sessions for a software application, an issue detection system may detect occurrence of a large number (e.g., thousands) of different issues across the user sessions. As illustrated in FIG. 1, a user 104 of the issue detection system 100 may be presented with information about the issues in a GUI. For example, the user 104 may be provided with a listing of detected issues. The user 104 may be able to access data associated with the issue by selecting one of the detected issues. The user 104 may need to analyze data associated with each issue in order to investigate the issue and/or identify a resolution that would prevent the issue from occurring in the future. Given the large number of issues that may be presented by an issue detection system, it may be impractical or otherwise very difficult for the user 104 to analyze each and every issue detected by an issue detection system. Moreover, the user 104 is unable to determine which of the detected issues to concentrate resources (e.g., technical support and/or developers) on. For example, an enterprise software application provider may receive data from thousands of issues detected in thousands of sessions every day. It is impractical for the user 104 to analyze each of the issues or even determine which of the issues to investigate further.

To address such problems, the inventors have developed techniques that automatically triage potential issues by determining an impact level (e.g., high impact or low impact) of each issue on operation of the software application. The techniques use the data collected during one or more sessions in which an issue occurred to determine how significantly the issue impacts operation of the software application. The techniques then generate, in a GUI provided to a user, a visual indication of an impact level of the potential issues. The triaging facilitates troubleshooting of issues and identification of resolutions by allowing resources to be focused on issues with high impact on the software application. For example, technical support and/or software developers may focus on issues determined to be of high impact. As another example, the triaging may allow a system to perform additional processing on a subset of issues determined to be of high impact without having to perform the processing on issues determined to be of low impact.

In some embodiments, the techniques may identify, from among thousands of detected issues, a subset of 100 or fewer issues (e.g., 5, 10, 15, 20, 25, 30, 35, 40, 45, or 50 issues) that may be of high impact. The techniques may triage issues by visually indicating a determined impact level for the issues in a GUI that displays information about detected issues to inform users of their impact. In some embodiments, determined impact levels of issues may be used by a system in determining whether to perform additional processing for issues. For example, the system may generate alerts for issues that are determined to be high impact. As another example, the system may execute additional diagnostic operations for issues that are determined to be of high impact. As another example, the system may generate natural language descriptions of issues that are determined to be of high impact.

In some embodiments, the techniques collect, during each session, data from a device being used by the user to interact with the software application. The techniques detect occurrence of potential issues during the sessions. The techniques triage the issues by determining impact levels of potential issues using data collected during sessions in which occurrence of the issues were detected. The techniques use the data collected in one or more sessions in which a particular issue occurred to determine a classification of the issue into one of multiple impact levels (e.g., low impact and high impact). The techniques generate, in a GUI for presenting information about detected issues, a visual indication of an impact level into which the issue was classified. For example, the techniques may generate a visual indication that the issue is of high impact or that the issue is low impact.

In some embodiments, the techniques determine a classification of a given issue into one of the impact levels using a trained machine learning model. The techniques use data collected from one or more sessions in which an issue was detected to generate one or more sets of feature values. The techniques then provide the set(s) of feature values as input to the machine learning model to obtain output(s). The techniques use the output(s) to determine a classification of the issue into one of the impact levels. In some embodiments, the machine learning model may be trained to perform its classification using labeled training data. The techniques may generate the labeled training data using user input about detected issues (e.g., obtained through a GUI). For example, a GUI may allow users (e.g., technical support users and/or software developers) to provide input indicating an impact level of a particular issue. The techniques may use the user input to generate one or more labeled sets of feature values that can be used in performing a supervised learning technique.

In some embodiments, the techniques may perform additional processing using determined impact levels for detected issues. For example, the techniques may transmit alerts to notify user(s) of issues that are determined to be of high impact. As another example, the techniques may apply filtering to a set of detected issues to present issues determined to be of high impact in a GUI while not displaying issues determined to be of low impact. In some embodiments, the techniques may use the impact level to determine whether to perform further diagnostic processing for an issue. For example, the techniques may generate additional GUI screens or elements for issues determined to be of high impact while not generating the additional GUI screens or elements for issues determined to be of low impact from triaging. The additional GUI screens or elements may allow users to view additional information about the issues determined to be of high impact to operation of the software application. In some embodiments, the techniques may perform additional processing for issues determined to be of high impact. For example, the techniques may perform additional processing using a trained language model to generate a natural language description of each issue. The techniques may display the natural language descriptions of the issues in a GUI to provide a user information about the high impact issues.

Described herein are also techniques for automatically generating natural language descriptions of issues that are detected in sessions. The techniques process information about usage of a software application collected during a session using a trained language model to obtain a natural language description of an issue that occurred in the session. A natural language description of an issue makes an effect on a user's experience clear and immediately obvious to technical and non-technical users of an issue detection system. This reduces the time required to understand the effect on user experience. Natural language descriptions of issues provide users (e.g., technical support and/or software developers) a better understanding of issues detected in a session (e.g., for troubleshooting of the issue) than just providing the users data collected during the session (e.g., information about error messages and/or logs of activity in the application).

The inventors have recognized that conventional software application issue detection systems fail to provide descriptions of issues that are easy to understand for humans. Conventional software application issue detection systems provide computer-generated data related to a detected issue that must be further analyzed by a user to understand the issue and its effect on user experience. For example, a user may need to analyze data indicating a sequence of events before and/or after an issue in order to understand the issue and/or its effect on user experience.

To address the above-described shortcomings in conventional software application issue detection technology, the inventors have developed techniques of automatically generating natural language descriptions of issues that occur in sessions of a software application. The techniques process data collected during session(s) of a software application using a trained language model (e.g., a large language model (LLM)) to obtain a natural language description of an issue that occurred in the session(s). The techniques generate input(s) to the language model using the data and provide the input(s) to the trained language model(s) to obtain the natural language description of the issue. The natural language description of the issue allows a user to quickly and easily understand the issue without requiring analysis of data. For example, the natural language description of the issue may indicate the effects of the issue on user experience with the software application. The natural language description may thus facilitate improving the software application and/or users' experience in using the software application.

In some embodiments, the techniques generate a representation of a session using data collected from the session. The data collected from the session may indicate events such as user actions, the rendering of content (e.g., text and/or graphics) in a GUI of the application during the session, and/or other information. The techniques generate the representation by identifying the events in the session and generating data (e.g., text and/or graphics) representing the event. The session representation may indicate a sequence of events that occurred during the session. For example, the session representation may be a textual log indicating a sequence of events (e.g., user actions) in a session, a sequence of images of the sequence of events, and/or other indication of the sequence of events. The techniques generate input to the trained language model that includes at least a portion of the session representation. For example, the techniques may generate input including a request for a description of an issue that occurred in a session along with at least a portion of a session representation (or all of the session representation). Session representation(s) or portion(s) thereof included in inputs to the language model may be processed by the language model to generate responses to requests (e.g., for whether an issue occurred and/or for a description of an issue that occurred).

Data collected from a session may include text in a language that is different from a target language (e.g., English) in which a natural language description is desired. For example, text displayed in the GUI of the application that is included in the data may be in a language different from the target language. Typically, a user analyzing an issue that occurred in the software application may need to translate the text to understand an issue that occurred in the session (e.g., executing a translation software application). Some embodiments allow for the generation of a natural language description of the session without requiring translation of the text. A session representation of a session may be generated in the same way regardless of the language of the application, and can be provided as input to a language model. Generation of the session representation thus allows the system to generate natural language descriptions of issues in a target language (e.g., English) irrespective of the language of the data collected from the session. This eliminates processing that would otherwise be required (e.g., to execute a translation software application) to process data to understand the issue.

The inventors have further recognized that the quality of natural language descriptions of issues improves when data provided to a language model indicates user activity during the session. In some embodiments, the techniques generate input to a language model using portions of session representations that indicate user activity. The techniques may further generate input to a language model using portions of session representations that indicate user activity proximate occurrence of an issue. For example, the techniques may identify a portion of a session representation that corresponds to user actions and include the portion in an input to a language model. This may allow the language model to provide higher-quality natural language descriptions than when an entire session representation is provided to the language model.

In some embodiments, the techniques use a series of input/output exchanges with a trained language model to process data collected during session(s) to obtain a natural language description of an issue that occurred in the session(s). For example, the techniques may: (1) query a trained language model for whether an issue occurred in one or more sessions using representation(s) of the session(s); and (2) if the trained language model provides output indicating that an issue did occur in the session(s), query the trained language model for a natural language description of the issue. The series of input/output exchanges provide the trained language model with additional information to guide its generation of a natural language description.

The inventors have recognized that a language model provides better descriptions when it is guided to provide a desired output with multiple inputs. Accordingly, in some embodiments, the techniques may use a series of input/output exchanges that guide a language model to generate a desired output. For example, the techniques may generate a series of inputs that guide the language model to output a concise description of an issue that occurred in session(s) of a software application. After the techniques determine that the language model has identified an issue in the session(s), the techniques provide input to the language model requesting a description of the issue (e.g., in a few sentences). After receiving a description, the techniques provide input to the language model requesting a concise summary that includes the initial description as part of the input. Accordingly, the techniques guide the language model to the generation of a concise summary of the issue in the session(s).

The inventors have further recognized that processing involving a trained language model is computationally expensive. A trained language model typically has a large number (e.g., millions or billions) of parameters that are used to compute an output corresponding to an input. As a result, a computer uses a large amount of computing and electrical resources to process a given input to the language model to determine a corresponding output. Further, computations involving the trained language model may be performed by processing hardware such as graphical processing unit(s) GPU(s) (e.g., Nvidia H100 GPU(s)) which may be limited in supply relative to demand for the hardware. Accordingly, some embodiments limit the generation of a natural language description of issues to those issues that are classified as high impact (e.g., after triaging the issues). Triaging techniques described herein are used to identify a subset of issues that are classified as high impact and for which to generate natural language descriptions by processing data using a trained language model. Some embodiments apply one or more heuristics to sessions to determine whether to generate a natural language description of an issue that occurred in the sessions. For example, the system may only generate a natural language description when repeated user activity is detected proximate occurrence of an event, a particular event (e.g., an error) occurs in the sessions, and/or a session representation has a minimum number of entries. By limiting the use of the trained language model to issues classified as high impact and/or that meet other rule(s), the techniques efficiently use the trained language model (e.g., by not wasting electrical and computing resources to generate natural language descriptions of issues that are classified as low impact on a software application).

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 2:
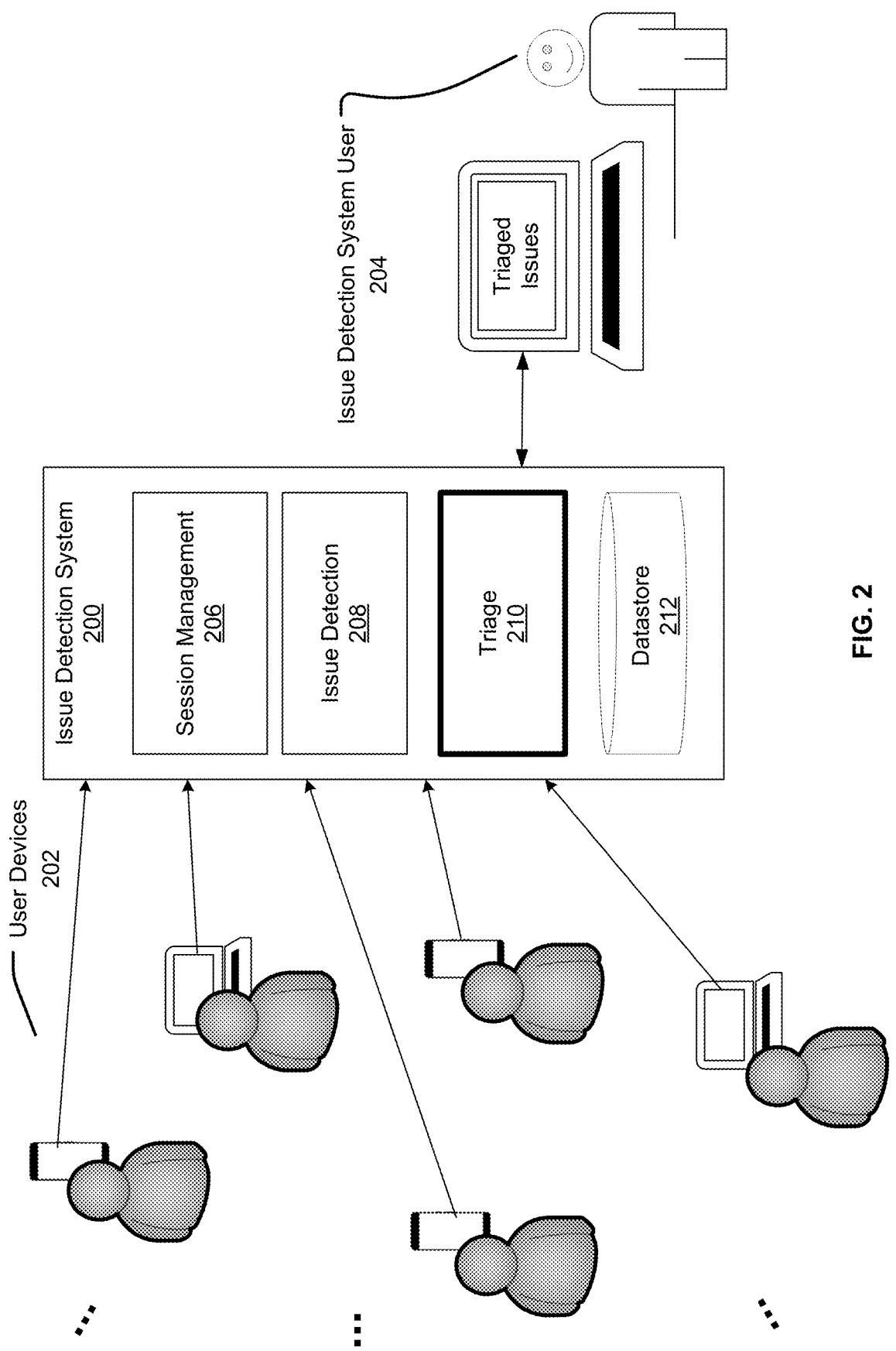
FIG. 2 is a diagram of an issue detection system including a triage module, according to some embodiments of the technology described herein.

FIG. 2 is a diagram of an issue detection system 200, according to some embodiments of the technology described herein. In contrast to the issue detection system 100 described herein with reference to FIG. 1, the issue detection system 200 triages issues detected by the issue detection system 200. The issue detection system 200 triages issues by classifying the issues into one of multiple impact levels.

Issue detection system 200 may comprise one or more computing devices. In some embodiments, the issue detection system 200 may comprise one or more servers. For example, the software application may be a web application that is hosted by server(s) and component(s) of the issue detection system 200 may be implemented on the server(s). In some embodiments, one or more components of the issue detection system 200 may be executed on a device hosting a software application that is being monitored for issue detection by the issue detection system 200. For example, component(s) of the issue detection system 200 may be executed as part of the software application that is being monitored by the issue detection system 200.

The issue detection system 200 is configured to communicate with multiple different user devices 202 that may access the software application. Each of the user devices 202 may be any computing device that can access the software application. For example, a user device may be a laptop computer, desktop computer, smartphone, tablet, wearable device, or any other suitable computing device.

Each of the user devices 202 may be configured to access the software application. A user device may access the software application in various ways. In some embodiments, a user device may access the software application using an Internet browser application. For example, the software application may be a web application accessed using an Internet browser application. In some embodiments, the software application may be installed on the user device, and the user device may access the software application by executing the software application. For example, the software application may be a mobile application that is executed by a user device (e.g., a smartphone). In some embodiments, the software application may include components executed locally on a user device and other components accessed through a network (e.g., the Internet). For example, the software application may include a component that is installed on a user device and used by the user device to interact with another component of the software application that is installed on a system remote from the user device (e.g., on a server).

The issue detection system 200 is in communication with a device of a user 204 of the issue detection system 204. The issue detection system 200 may be configured to provide a GUI on the device of the user 204 that presents information about issues detected in sessions of the software application. For example, the issue detection system 200 may provide an Internet website through which developers and/or technical support specialists may view information about issues detected in the software application. In some embodiments, information about issues detected in sessions of the software application may include natural language description(s) of one or more of the issues (e.g., generated by session description system 700 described herein with reference to FIGS. 7A-7B). As described in further detail herein, the GUI may further provide a visual indication of impact level determined for triaged issues.

The user 204 may be any user of the issue detection system 200. For example, the user 204 may be a technical support specialist, a software developer, a product manager, and/or any other suitable user. Although the example embodiment of FIG. 2 shows a single user 204, in some embodiments, there may be multiple users of the issue detection system 200.

As shown in FIG. 2, the issue detection system 200 includes multiple components. The components include a session management module 206, an issue detection module 208, a triage module 210, and a datastore 212.

The session management module 206 may track sessions of usage of the software application. The session management module 206 may determine when a given session begins and ends. In some embodiments, the session management module 206 may determine that a session begins when the session management module 206 determines that a user device has accessed the software application. For example, if the software application is a web application, the session management module 206 may determine that a given session has initiated when a user device accesses the web application using a browser application. As another example, the session management module 206 may determine that a given session has been initiated by determining that a user has completed a login process to access the software application.

In some embodiments, the session management module 206 may determine that a session ends when the session management module 206 determines that a user device has stopped use of the software application. For example, if the software application is a web application, the session management module 206 may determine that a given session has ended when a user device navigates away from a website associated with the web application or when a browser application is closed. As another example, the session management module 206 may determine that a given session has ended by determining that a user has completed a logout process. As another example, the session management module 206 may determine that a given session has ended by determining that a user has stopped interacting with the software application for an extended period of time (e.g., for at least 5-10 minutes, at least 10-15 minutes, at least 15-20 minutes, or another suitable period of time).

In some embodiments, the session management module 206 may store an indication of an identified session (e.g., in the datastore 212). The session management module 206 may store information identifying the session. For example, the session management module 206 may store an identifier for a session, a time at which the session started and/or ended, information identifying a user device and/or user that was interacting with the software application in the session, and/or other information identifying the session. The information may be used to organize data collected from the session. For example, the information may be associated with one or more data records storing data collected from the session.

The session management module 206 may collect information during a given session in which a user device is accessing the software application. The session management module 206 may determine values of various parameters during the session. In some embodiments, the session management module 206 may access information from a user device. For example, the session management module 206 may access information about hardware of the user device and/or software installed on the user device. As another example, the session management module 206 may access information about a display of the user device (e.g., viewport dimensions, screen resolution, and/or other information). In some embodiments, the session management module 206 may collect information about network communication (e.g., network requests and responses, connection status, etc.). In some embodiments, the session management module 206 may collect information indicating user activity (e.g., performed in a GUI of the software application).

Example parameters of which values may be collected by the session management module 206 include the following:

a. Hypertext markup language (HTML) document object model (DOM) tree changes such as node additions, deletions, and mutations.
b. CSS styles and/or stylesheets
c. Navigation events (e.g., page loads and/or change in history)
d. User device viewport dimensions
e. User device type
f. Browser application type
g. User activity (e.g., changes in cursor position, click count, touch interaction count, click coordinates, touch surface interaction coordinates, scroll coordinates, and/or interactions with input elements)
h. Console logs
i. Network requests and responses (e.g., headers, bodies, and/or status codes of network requests and responses)

-continued j. Exceptions
k. User device processor and/or memory usage
l. Network connection status It should be appreciated that the example types of information collected by the session management module 206 discussed herein are for illustration purposes. In some embodiments, the session management module 206 may collect other information during a session in addition to or instead of information discussed herein. In some embodiments, the session management module 206 may collect different information for different software applications and/or types of user devices.

In some embodiments, the information collected by the session management module 206 may be configurable (e.g., by the user 204). For example, the session management module 206 may receive configuration information indicating one or more parameters that the session management module 206 collects during a given session. As another example, the session management module 206 may programmatically configure which information is collected during a session (e.g., based on factors such as the software application, type of user device, type of Internet browser application, and/or other factors).

In some embodiments, the session management module 206 may include a component that executes on the user devices 202. The component may collect information from a user device. For example, the component may collect values of the example parameters listed herein. In some embodiments, the component may further process data collected from a device (e.g., to determine values of one or more parameters). The component may transmit data collected from the device to server(s) of the issue detection system 200 (e.g., for use by other components of the issue detection system 200). Data collected by the component executing on a user device may be stored and/or used for further processing (e.g., in detecting and/or triaging issues). In some embodiments, the component may execute within the software application being monitored by the issue detection system 200. For example, the component may include a client-side software development kit (SDK) for execution of processes on the user devices 202 (e.g., for collection of information).

The issue detection module 208 may detect issues that occur during the various sessions. In some embodiments, the issue detection module 208 may detect issues during a session. In some embodiments, the issue detection module 208 may detect issues after a session has ended (e.g., by analyzing data collected during the session by the session management module 206).

The issue detection module 208 may detect the occurrence of an issue in various ways. In some embodiments, the issue detection module 208 may detect an issue by detecting occurrence of an error in the software application. The issue detection module 208 may use data obtained by the session management module 206 (e.g., by a component executing on user devices) to detect occurrence of issues. For example, the issue detection module 208 may detect occurrence of an application error, a failed network request (e.g., indicated by response status code), a delayed network request coinciding with user activity (e.g., mouse movement, scrolling), a particular pattern of user activity (e.g., click or touch interaction followed by a lack of visible change in a GUI within a certain amount of time, or a large number of clicks or touches in a given area of a GUI within a time period), and/or common and user-configured application GUI error states. In some embodiments, the issue detection module 208 may detect an issue by tracking performance of the software application. For example, the issue detection module 208 may determine whether time elapsed in performing a particular operation has exceeded a threshold time to determine whether an issue has occurred. In some embodiments, the issues that are detected by the issue detection module 208 may be configurable. The module 208 may be configurable to add new issues that can be detected and/or remove issues that it was previously configured to detect.

The issue detection module 208 may store data associated with a detected issue. In some embodiments, the issue detection module 208 may store data within a time period preceding a detected issue and/or a time period after the detected issue. The data may include data collected by the session management module 206 during a session and/or information derived using the data. In some embodiments, the issue detection module 208 may store data associated with the detected issue in the datastore 212. For example, the issue detection module 208 may generate a data record storing the data associated with the detected issue. The data associated with a detected issue may be provided to a user 204 of the system 200 (e.g., by displaying the information in a GUI).

The triage module 210 may triage detected issues by determining an impact level of the detected issues. The triaged issues may be a set of issues for which the triage module 210 has determined an impact level. In some embodiments, the triaged issues may consist of less than 100 issues determined to be of high impact (e.g., classified into a high impact level). For example, the triaged issues may consist of 5, 10, 15, 20, 25, 30, 35, 40, 45, or 50 issues determined to be of high impact from all of the issues detected in a timeframe (e.g., in a day, week, month, or other timeframe). The triaged issues may thus facilitate the user's 204 review of potential issues by allowing the user 204 to focus resources on issues determined to be of high impact on the software application.

In some embodiments, impact levels of the triaged issues may be used in further processing by the issue detection system 200 and/or a computing device of the user 204. For example, triaged issues determined to be of high impact may have further processing performed using data associated with the issues. The issue detection system 200 may execute additional operations for high impact issues to provide additional information to the user 204 about the issues. For example, the issue detection system 200 may obtain a natural language description of the issues (e.g., by performing process 1200 described herein with reference to FIG. 12). The issue detection system 200 may perform filtering to only display high impact issues in a GUI displayed to the user 204. As another example, the issue detection system 200 may send alerts for high impact issues to users as a notification (e.g., to allow quick resolution and mitigation of effect on user experience and/or business). As another example, the issue detection system 200 may generate additional GUIs for high impact issues to allow the user 204 to view more information about those issues (e.g., by allowing the user 204 to view data from particular occurrences of the issue in various different sessions). A user 204 of the system 200 may additionally or alternatively use the impact level of the triaged issues. For example, the user 204 of the system 200 may perform diagnostic processing on the software application to collect additional information about the issues (e.g., by simulating the issues in a development environment) of high impact.

In some embodiments, the triage module 210 may triage detected issues using data collected during one or more sessions in which the issues occurred (e.g., by session management module 206). For a given session in which an issue occurred, the triage module 210 may determine, using data collected during the session, a classification of the issue into one of multiple impact levels. For example, the triage module 210 may classify a given issue into a low impact level or a high impact level. As another example, the triage module 210 may classify the given issue into one of three or more impact levels. In some embodiments, the triage module 210 may determine a classification of an issue using data collected during a session in which the issue occurred by: (1) determining values of one or more parameters using the data; and (2) determining the classification of the issue using the values of the parameter(s). For example, the parameter(s) may include one or more parameters indicating a reaction of the user in a time period after occurrence of the issue in the session. Example parameters are described herein.

In some embodiments, the triage module 210 may determine a classification of an issue using data collected from multiple occurrences of the issue (e.g., in different sessions). The triage module 210 may: (1) determine a classification for each occurrence of the issue; and (2) aggregate results of the classifications for the occurrences of the issue. The triage module 210 may determine an impact level classification for an issue based on aggregated results of classifying multiple occurrences of the issue. In some embodiments, the triage module 210 may generate a visualization indicating an aggregated classification result only when the issue has occurred in a threshold number of sessions. For example, the triage module 210 may only generate a visual indication of a classification for the issue when the issue has occurred in at least 5, 10, 15, 20, 25, 30, 35, 40, 45, or 50 sessions. In some embodiments, the triage module 210 may aggregate classification results of multiple occurrences of an issue during a single session into one classification for the session. The classification for the session may then be aggregated with classification results determined for occurrences of the issue in other sessions to determine an impact level classification for the issue.

In some embodiments, the triage module 210 may allow the user 204 to view information about specific occurrences of an issue. The triage module 210 may provide a GUI through which the user 204 can navigate to and view information about a particular occurrence of an issue. In some embodiments, the triage module 210 may select information from one of multiple occurrences to display in a GUI displayed to the user 204. In some embodiments, the triage module 210 may aggregate information from multiple occurrences and display the aggregate information in a GUI displayed to the user 204.

In some embodiments, the triage module 210 may determine a classification of an issue using data collected from a session in which the issue occurred using a machine learning model. The triage module 210 may: (1) use the data to determine a set of feature values; and (2) provide the set of feature values as input to the machine learning model to obtain output indicating the classification of the issue. The set of features may include one or more parameters for which values are determined using the data collected from the session.

The machine learning model used by the triage module 210 for determining a classification may be any suitable machine learning model. In some embodiments, the machine learning model may be a neural network. For example, the machine learning model may include a convolutional neural network (CNN), a recurrent neural network (RNN), and/or a long short-term memory (LSTM) network. In some embodiments, the machine learning model may be a gradient-boosted decision tree model, a support vector machine (SVM), or other suitable machine learning model. In some embodiments, the machine learning model used by the triage module 210 may be an ensemble of multiple machine learning models. Example techniques of training the machine learning model are described herein.

In some embodiments, the triage module 210 may generate, in a GUI, a visual indication of impact levels determined for triaged issues. The triage module 210 may mark the triaged issues in a GUI (e.g., presented on a device of the user 204) to indicate an impact level determined for the triaged issues. For example, the triage module 210 may indicate triaged issues by including, in a listing of detected issues, a graphical element indicating an impact level for each of the triaged issues. For example, the graphical element may include text (e.g., "high impact" or "low impact") indicating an impact level of an issue, a color (e.g., red, yellow, or green) indicating an impact level for an issue, and/or a symbol indicating an impact level of an issue. This may allow the user 204 to distinguish the triaged issues from other detected issues, and to view an impact level determined for the triaged issues. In some embodiments, the triage module 210 may display a listing of only triaged issues (e.g., in response to user configuration of a filter to display triaged issues). In some embodiments, the triage module 210 may display a listing of only triaged issues that have been classified into a particular impact level (e.g., a high impact). For example, the triage module 210 may filter the triaged issues based on their impact levels to list, in a GUI, only those triaged issues classified into a high impact level. In some embodiments, the triage module 210 may display a listing of only triaged issues classified into a particular impact level and for which a natural language description was successfully generated (e.g., by the session description system 700).

The user 204 may use the impact levels indicated for the triaged issues for various purposes. The user 204 may take various actions with respect to an impact level indicated for a triaged issue. For example, the user 204 may decide to investigate an issue further when the issue is indicated as having a high impact. As another example, the system 200 may allow the user 204 to provide input assigning a classification to the issue that may match or differ from the classification determined by the system 200. As another example, the system 200 may allow the user to modify an impact level indicated for the issue. As another example, the user 204 may ignore an impact level indicated for an issue.

The datastore 212 may be any suitable storage hardware. In some embodiments, the datastore 212 may comprise one or more hard drives (e.g. hard disk drives and/or solid state drives). In some embodiments, the datastore 212 may be remote storage hardware. For example, the datastore 212 may be a cloud database distributed in one or more datacenters.

In some embodiments, the datastore 212 may store data collected during various user sessions by the session management module 206. The datastore 212 may store data records associated with respective sessions. In some embodiments, the datastore 212 may store data associated with detected issues. The data may be used by the triage module 210 to triage detected issues (e.g., by using the data to determine a classification of the issues into an impact level).

In some embodiments, the datastore 212 may store training data used for training a machine learning model (e.g., for use by the triage module 210 in triaging detected issues). The issue detection system 200 may be configured to generate training data samples that may be stored in the datastore 212 (e.g., for use in performing a training technique). For example, the training data may comprise sets of feature values and corresponding labels that can be used in performing a supervised learning technique to train the machine learning model.

In some embodiments, the datastore 212 may store parameters of a machine learning model used in determining a classification of issues into an impact level. The parameters may be used by the triage module 210 when the machine learning model is used to determine a classification for an issue based on a set of feature values corresponding to the issue. For example, the parameters may be weights and/or biases of a trained neural network that are used to determine an output of the trained neural network indicating a classification of an issue based on a set of feature values corresponding to the issue.

Figure 3:
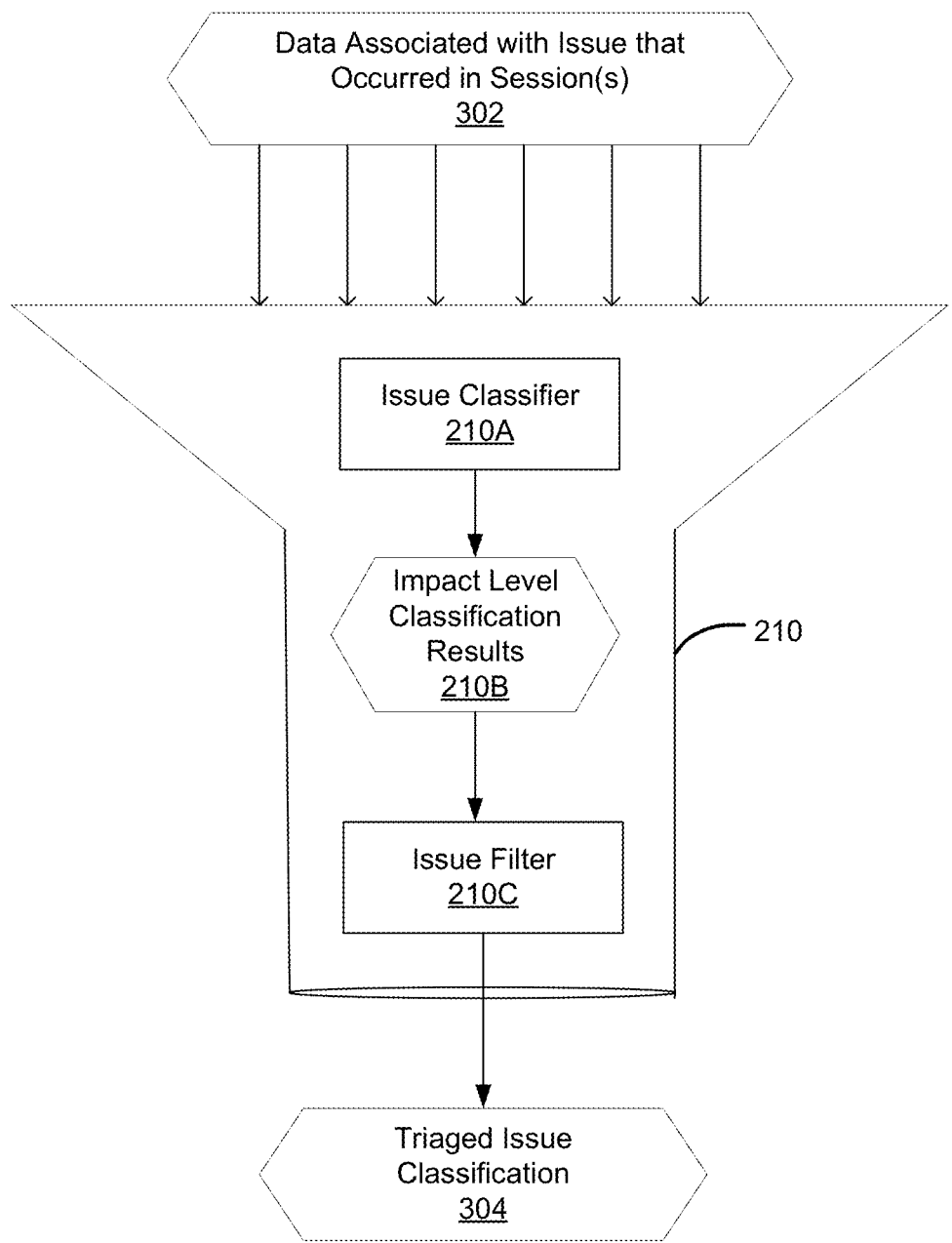
FIG. 3 is a diagram illustrating operation of the triage module of an issue detection system, according to some embodiments of the technology described herein.

FIG. 3 is a diagram of the triage module 210 of the issue detection system 200 of FIG. 2, according to some embodiments of the technology described herein. As illustrated in FIG. 3, the triage module 210 obtains data 302 (e.g., collected by the session management module 206) associated with potential issues (e.g., detected by the issue detection module 208). In some cases, there may be thousands of potential issues that were detected by the issue detection module 208 across multiple sessions of using a software application. The triage module 210 may obtain data associated with each of the potential issues.

As shown in FIG. 3, the triage module 210 includes an issue classifier 210A and an issue filter 210C.

The issue classifier 210A may determine a classification of a potential issue into one of multiple impact levels (e.g., a low impact level and a high impact level) using data associated with the issue. The data associated with a given issue may include data collected during one or more sessions in which the issue occurred. For example, the data may include values of one or more parameters collected in a time period before and/or after occurrence of the potential issue during each of the session(s). In some embodiments, the data associated with the given issue may include multiple sets of data that were each collected in one of multiple sessions in which the issue occurred. For example, each set of data may include values of parameter(s) collected in a time period before and/or after occurrence of the potential issue in a respective session.

The classifier 210A may determine a classification for an occurrence of a given issue using data collected during a session in which the issue occurred. In some embodiments, the classifier 210A may determine the classification for the occurrence of the issue based on value(s) of one or more parameters. The classifier 210A may use the value(s) of the parameter(s) as an indication of potential impact level of the issue.

In some embodiments, the classifier 210A may determine a classification for an occurrence of a given issue using a machine learning model. The machine learning model may be trained to output a classification of the issue into one of the multiple impact levels using a set of feature values generated using data associated with the issue (e.g., data collected from a session in which the issue occurred). An example of how the classifier 210A may use a machine learning model to determine an impact level classification for a given issue is described herein with reference to FIG. 4A.

As shown in FIG. 3, the issue classifier 210A outputs impact level classification results 210B for an occurrence of a given issue. In some embodiments, the classification results 210B may comprise a value associated with each of multiple impact levels. For example, the classification results 210B may include, for each of multiple impact levels, a value (e.g., a probability value) indicating a likelihood that the issue is of the impact level. For example, in an embodiment in which there is a high impact level and a low impact level, the classification results 210B for an occurrence of an issue may include a probability value associated with the high impact level and a probability value associated with the low impact level.

In some embodiments, the impact level classification results 210B may include classification results for multiple different occurrences of a given issue (e.g., that were detected in multiple different sessions). The results 210B may include, for each occurrence of the given issue, values associated with multiple impact levels. For example, the results 210B may include, for each occurrence of the given issue, likelihood values (e.g., probability values) associated with multiple impact levels.

The issue filter 210C may use the impact level classification results 210B to determine a classification result for a given issue. In some embodiments, the issue filter 210C may assign an impact level to the given issue using the impact level classification results 210B. The issue filter 210C may output a triaged issue classification 304. In some embodiments, the issue filter 210C may assign a particular attribute value in a data record associated with the classification 304 determined for the issue. The particular attribute value may indicate an impact level of the given issue. For example, the attribute value may be used to visually indicate an impact level of the given issue (e.g., in a GUI provided to a user 204 of the system 200) and/or to perform other processing.

In some embodiments, the issue filter 210C may determine the classification 304 by aggregating the classification results 210B obtained from occurrences of the issues in multiple different sessions. The classification results 210B may include, for each occurrence of the issue, likelihood values (e.g., probability values) associated with different impact levels. The issue filter 210C may determine aggregate values for the impact levels across all the occurrences. For example, the issue filter 210C may determine a mean value for each of the impact levels across all of the occurrences. As another example, the issue filter 210C may determine a maximum likelihood value (e.g., probability value) for each impact level among all the occurrences of the issue. As another example, the issue filter 210C may determine a likelihood value associated with the impact levels at a particular percentile (e.g., $75^{th}$ percentile, $80^{th}$ percentile, $85^{th}$ percentile, $90^{th}$ percentile, $95^{th}$ percentile, or $99^{th}$ percentile) of the occurrences of the issue. The issue filter 210C may use aggregated values associated with the impact levels to determine the triaged issue classification. Example techniques of aggregating classification results from multiple occurrences of an issue are for illustration of some embodiments. Some embodiments may use other suitable techniques of aggregating classification results from multiple occurrences of an issue.

In some embodiments, the issue filter 210C may determine whether to classify the issue into a particular impact level by determining whether an aggregate likelihood value (e.g., probability value) determined from multiple occurrences of the issue meets a threshold value. For example, the issue filter 210C may determine to classify the issue into a high impact level when a probability value associated with the high impact level aggregated from a set of occurrences of the issue is at least 0.5, 0.55, 0.6, 0.65, 0.7. 0.75, 0.8, 0.85, 0.9, 0.95, or another suitable value. In some embodiments, the threshold value may be a configurable parameter. For example, the issue filter 210C may be configurable by a user setting indicating a threshold probability value required to classify an issue into a particular impact level. This may allow configurable control of a sensitivity of the issue filter 210C in classifying issues as high impact.

In some embodiments, the triaged issue classification 304 may be used to determine a visualization to be displayed for the issue in a GUI. The visualization may indicate the impact level into which the issue was classified. In some embodiments, the triage module 200 may only generate a visualization for the issue when the issue has occurred in a threshold number of sessions. For example, the threshold number of sessions may be 5, 10, 15, 20, 25, 30, 35, 40, 45, or 50 sessions. In some embodiments, the threshold number of sessions may be a configurable parameter. For example, the triage module 200 may provide a user setting that controls a threshold number of sessions in which the issue must occur in order to display a visualization of the classification of the issue.

Figure 4A:
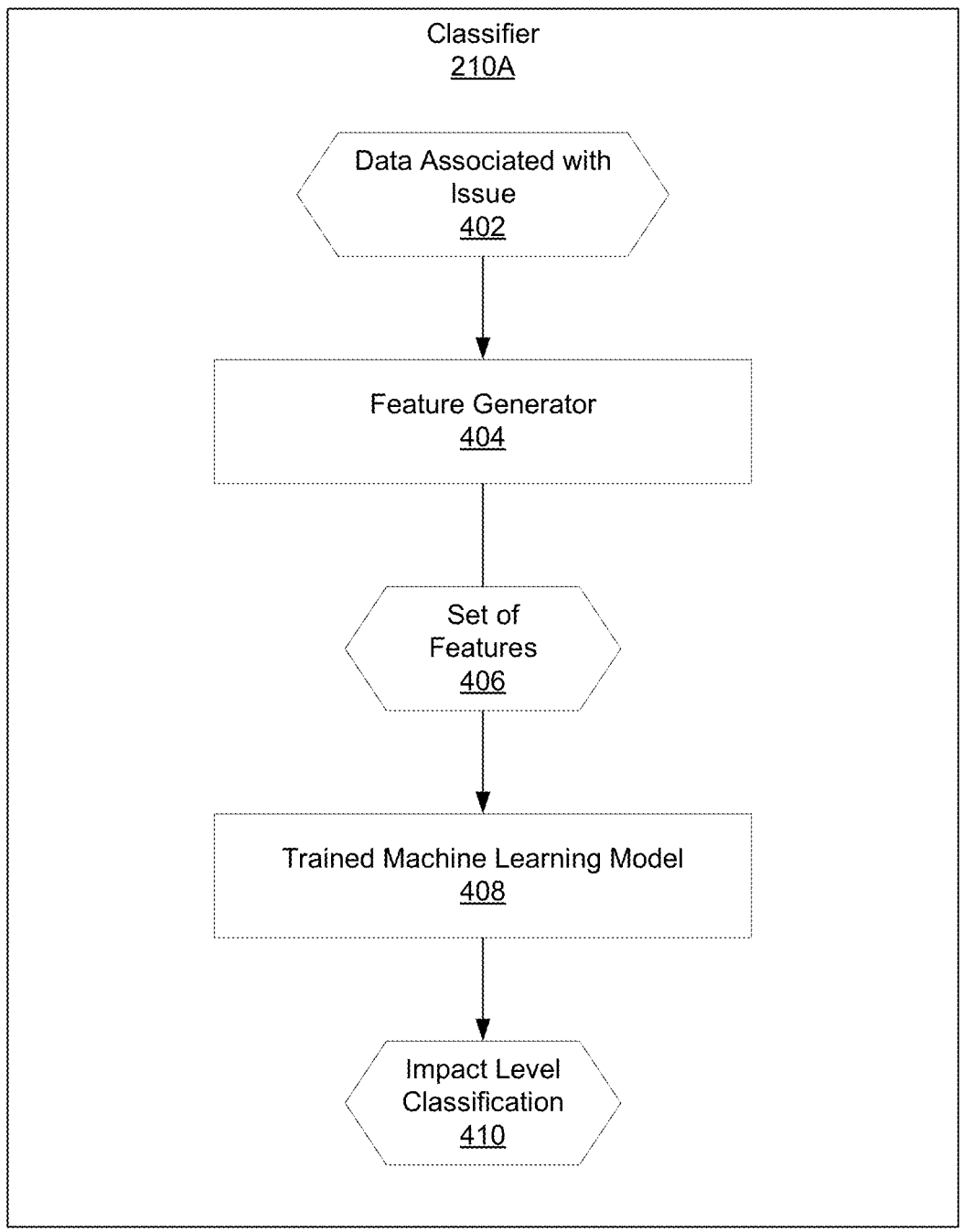
FIG. 4A is a diagram of a classifier that may be used by a triage module, according to some embodiments of the technology described herein.

FIG. 4A is a diagram of an example classifier 210A of the triage module 210, according to some embodiments of the technology described herein. The classifier 210A includes a feature generator 404 and a trained machine learning model 408.

As shown in FIG. 4A, the feature generator 404 obtains data 402 associated with a given issue (e.g., that was collected during a session in which the issue occurred). The feature generator 404 uses the data 402 to generate a set of features 406 corresponding to the issue. The feature generator 404 may generate the set of features 406 by: (1) determining values of parameters using the data 402; and (2) outputting the values of the parameters as the set of features 406. In some embodiments, the feature generator 404 may determine values of parameters indicating actions performed by a user in a session in a time period before and/or after occurrence of the issue. The actions performed by the user in response to occurrence of the issue may be a strong indicator of the severity of the issue. For example, the feature generator 404 may determine a density of user activity in a GUI of the software application before and/or after occurrence of the issue, change in frequency of user activity in the GUI before and/or after occurrence of the issue, information about click or touch interactions in the GUI before and/or after occurrence of the issue, and/or other parameters. Information about click or touch interactions in the GUI may include a count of mouse moves, mouse clicks, and/or touch interactions. The information about click or touch interactions in the GUI may include a count of repeated clicks and/or touch interactions.

In some embodiments, the feature generator 404 may determine values of parameters indicating operation of the software application before and/or after occurrence of the issue. For example, the feature generator 404 may determine a time required by the software application to complete a requested action, memory and/or processor usage of the software application before and/or after occurrence of the issue, and/or other parameter values indicating operation of the software application before and/or after occurrence of the issue. In some embodiments, the feature generator 404 may determine values of parameters indicating a state of a user device accessing the software application before and/or after occurrence of the issue. For example, the feature generator 404 may determine values indicating memory and/or processor usage of the user device, an indication that the software application was closed by the user device, an amount of time taken to close the software application, and/or other parameters indicating the state of the user device.

Example parameters described herein are for illustration of example embodiments. Some embodiments may determine values of parameters in addition or instead of parameters described herein to include in the set of features 406.

The classifier 210A may provide the set of features 406 as input to the trained machine learning model 408 to obtain an output impact level classification 410. In some embodiments, the classifier 210A may determine an output of the machine learning model 408 using learned parameters of the machine learning model 408. To illustrate, the machine learning model 408 may be a neural network with learned weights and bias values. The classifier 210A may use the set of features 406 as input to an input layer of the neural network and then use the weights and bias values to determine an output of the neural network. The output of the neural network may indicate an impact level classification for the set of features 406.

Figure 4B:
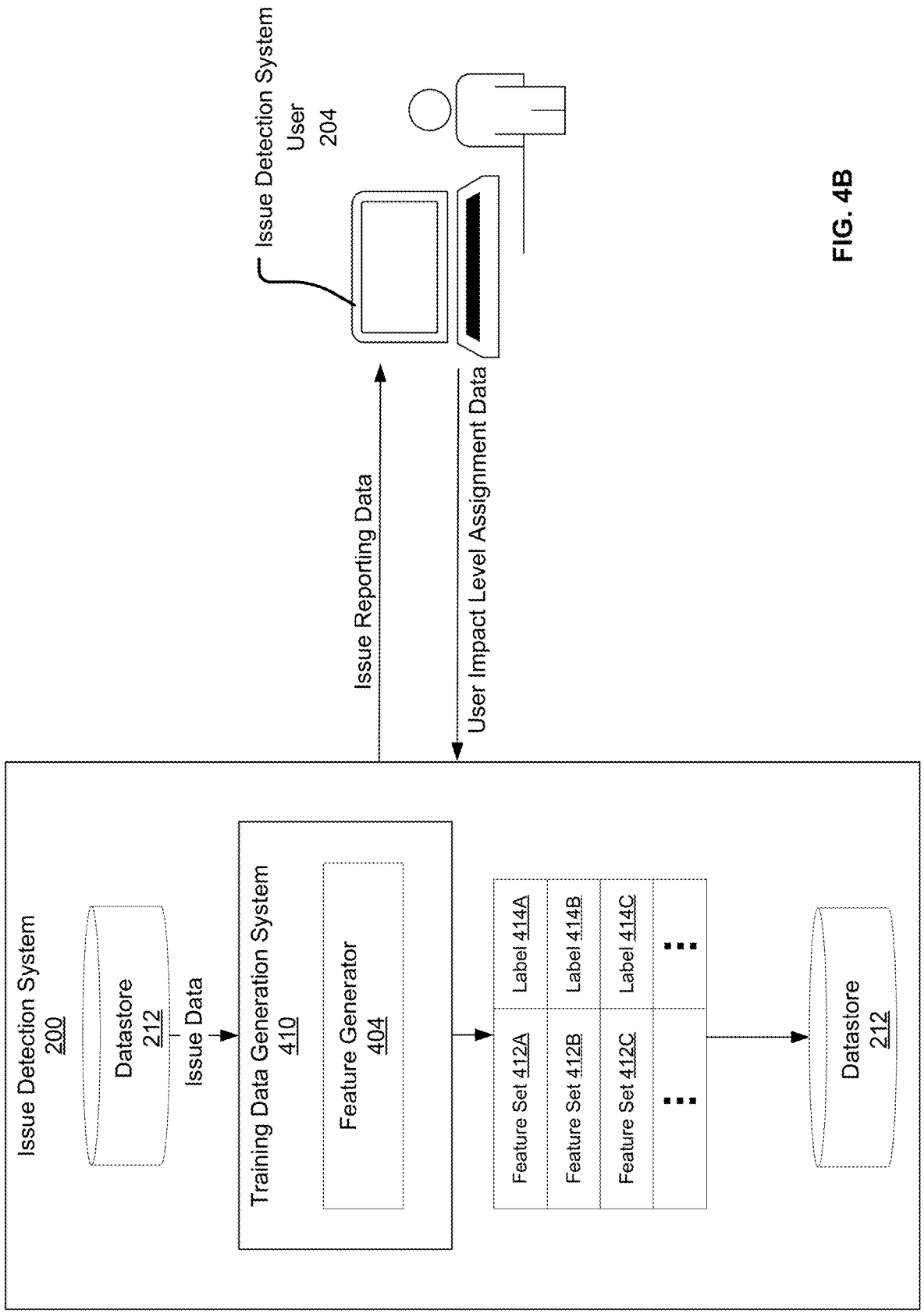
FIG. 4B is a diagram of a training data generation system that generates training data for use in training a machine learning model that is used by the classifier of FIG. 4A, according to some embodiments of the technology described herein.

FIG. 4B is a diagram of a training data generation system 410 that generates training data for use in training a machine learning model that is used by the classification system of FIG. 4A, according to some embodiments of the technology described herein. As shown in FIG. 4B, the training data generation system 410 may be a part of the issue detection system 200 described herein with reference to FIG. 2.

As shown in FIG. 4B, the issue detection system 200 transmits issue reporting data to a user 204 of the system 200. In some embodiments, the issue detection system 200 may provide information about potential issues by presenting the information in a GUI displayed by the system of the user 204. For example, the issue detection system 200 may provide a website that displays information about detected potential issues. The GUI may include a listing of potential issues. The GUI may allow a user to select an issue and view information about the potential issue. The displayed information may include and/or be generated from data collected during a session in which the issue was detected.

As shown in FIG. 4B, the issue detection system 200 receives user impact level assignment data from the user 204 of the system 200. The user impact level assignment data may include user input indicating user-assigned impact levels for issues. In some embodiments, the issue detection system 200 may provide a GUI through which the user 204 may provide input indicating whether a particular issue is high impact or low impact. For example, the issue detection system 200 may provide a GUI including a set of selectable options associated with different impact levels from which a user may select one option to indicate an impact designation for a given issue. The issue detection system 200 may obtain data indicating the impact designation for the various issues.

The training data generation system 410 uses the user-assigned impact levels in conjunction with data associated with issues to generate training data. For each issue for which the training data generation system 410 obtains a user-assigned impact level, the training data generation system generates one or more sets of features using data associated with the issue. The training data generation system 410 may use the feature generator 404 (described herein with reference to FIG. 4A) to generate set(s) of feature values. The training data generation system 410 may further assign a label to each of the generated set(s) of feature values based on a user-assigned impact level for the issue. For example, the training data generation system 410 may assign a first value as a label when the issue is assigned a low impact level by the user 204 and a second value as a label when the issue is assigned a high impact level by the user 204.

In some embodiments, the impact level assignment data from the user 204 may include data obtained based on user input associated with triaged issues. For example, the issue detection system 200 may have previously indicated one or more issues as having a high impact. The issue detection system 200 may receive user input indicating that those issues are not high impact. This may indicate that those issues should not have been indicated as having a high impact. This information may be used to assign labels to set(s) of feature values associated with the issues (e.g., by assigning a label associated with a low impact level to the set(s) of feature values). The labeled set(s) of feature values may be included in training data for retraining the machine learning model 408. Accordingly, the machine learning model 408 may be updated using feedback obtained from the user 204 to continuously improve the classification performance of the machine learning model 408.

In some embodiments, the training data generation system 410 may use a user-assigned impact level for an issue to generate multiple labeled training data samples. The issue detection system 200 may have previously detected multiple occurrences of the issue in multiple different sessions. The issue detection system 200 may generate a set of feature values for each occurrence of the issue (e.g., as described herein with reference to FIG. 3). The training data generation system 410 may use the user-assigned impact level for the issue to assign a label to all of the sets of feature values generated for respective occurrences of the issue. Accordingly, a single user-assigned impact level may be used by the training data generation system 410 to generate multiple training data samples.

FIG. 4B shows a depiction of example training data generated by the training data generation system 410. As shown in FIG. 4B, the training data includes sets of feature values 412A, 412B, 412C with respective assigned labels 414A, 414B, 414C. The training data may be stored in the datastore 212 for use in training the machine learning model 408. In some embodiments, the training data may be used to perform a supervised learning technique. For example, a stochastic gradient descent may be performed to learn parameters of the machine learning model 408. The stochastic gradient descent may be performed by: (1) determining an output of a machine learning model for each set of feature values in the training data; (2) determining a difference between an output of the machine learning model and labels associated with the set of feature values; and (3) updating parameters of the machine learning model based on the difference. The parameters may be updated by determining a gradient of the parameters (e.g., with respect to a loss function), and updating the parameters based on the gradient. The machine learning model may thus be iteratively updated to obtain a trained machine learning model 408. For example, the parameters may be updated until a threshold loss function value is achieved or until a threshold number of iterations of training have been performed.

Figure 5:
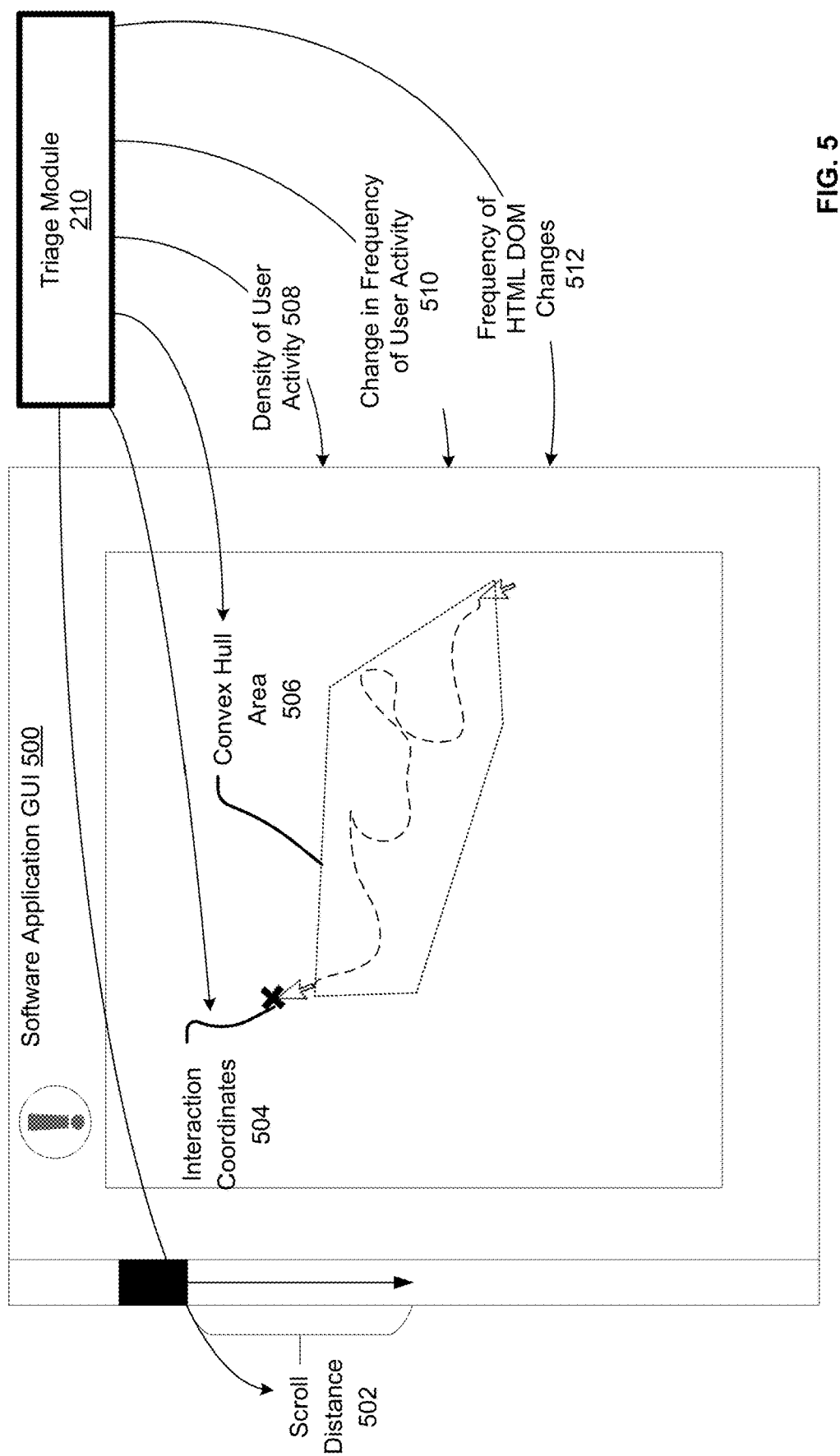
FIG. 5 illustrates example features that may be generated using data collected from a session in which a user was interacting with a software application, according to some embodiments of the technology described herein.

FIG. 5 illustrates example parameters that may be determined using data collected from a session in which a user was interacting with a software application, according to some embodiments of the technology described herein. In some embodiments, the parameter values may be used as a set of feature values for input to a machine learning model (e.g., machine learning model 408 described herein with reference to FIGS. 4A-4B).

FIG. 5 shows a GUI 500 of a software application for which issue detection is being performed by the issue detection system 200 described herein with reference to FIG. 2. The triage module 210 determines values of parameters using data collected during a session in which a user is interacting with the software application through the GUI 500. In some embodiments, the triage module 210 may determine the parameter values incident to occurrence of an issue. For example, the triage module 210 may determine the values of the parameters in a time period after the issue occurred (e.g., 1 second, 5 seconds, 10 seconds, 30 seconds, 1 minute, 2 minutes, 5 minutes, or 10 minutes after the issue occurred, or another time period). The triage module 210 may additionally or alternatively determine the values of the parameters in a time period prior to the issue occurring (e.g., 1 second, 5 seconds, 10 seconds, 30 seconds, 1 minute, 2 minutes, 5 minutes, or 10 minutes prior to occurrence of the issue, or another time period).

The triage module 210 may determine how far a user scrolled a scroll bar of the GUI 500. The triage module 210 may determine coordinates 504 of an interaction with the GUI 500. For example, the interaction may be a click of a mouse or a touch on a touch screen interface. The triage module 506 may determine an area 506 of a convex hull around an area in which movement occurred in the GUI 500. For example, the triage module 210 may determine an area of a convex hull enclosing an area in which a mouse was moved in the GUI 500. As another example, the triage module 210 may determine a count of mouse moves, mouse clicks, and/or touch interactions. As another example, the triage module 210 may determine a count of repeated clicks and/or touch interactions. The triage module 210 may determine a density 508 of user activity (e.g., in a time period before and/or after occurrence of an issue), a change 510 in frequency of user activity (e.g., relative to a time period prior to occurrence of an issue), and frequency 512 of HTML DOM changes in the GUI 500. In some embodiments, the triage module 210 may use one or more of these parameter values as feature values to be included in the set of feature values 406.

Figure 6:
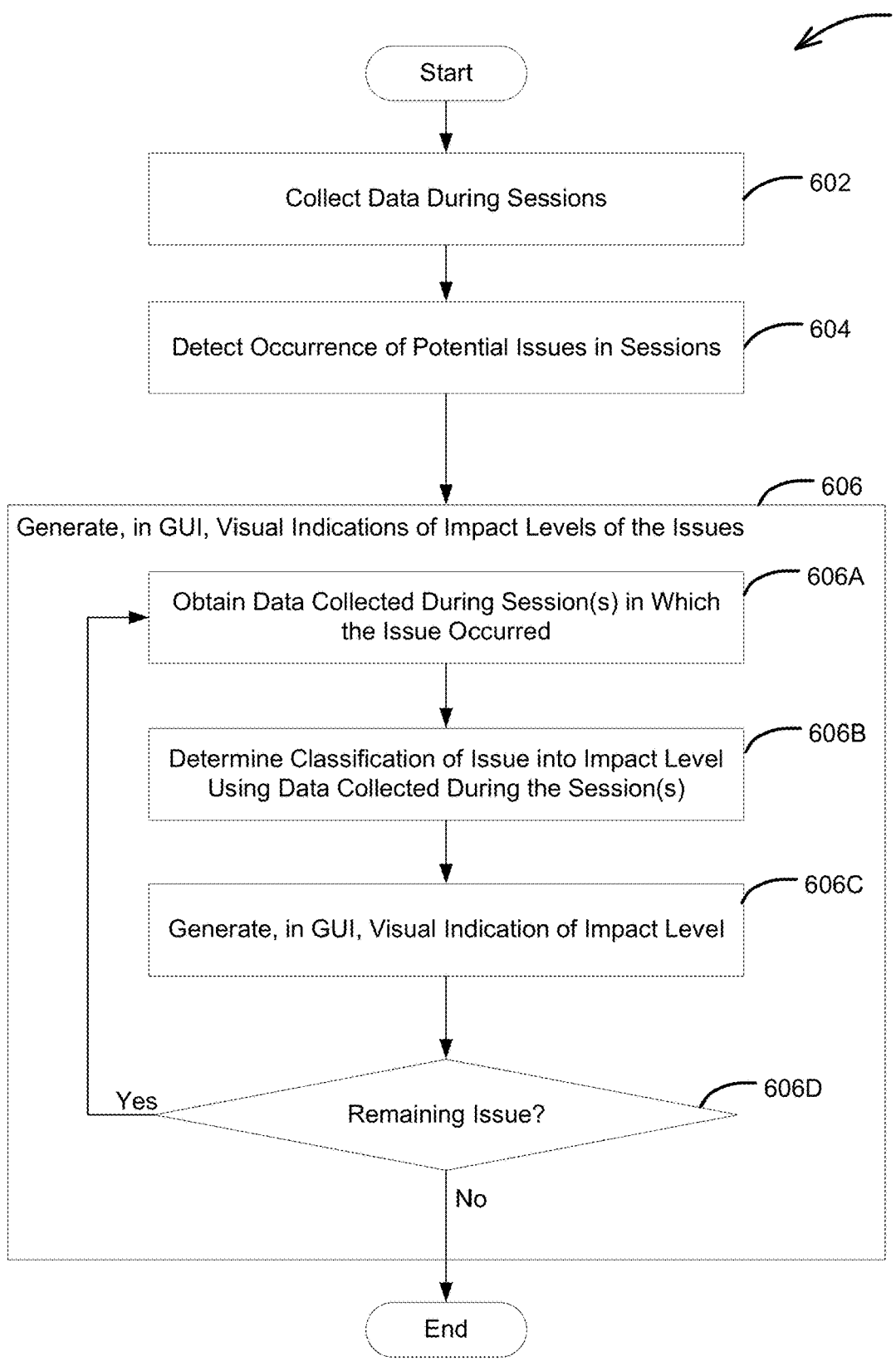
FIG. 6 is an example process of triaging issues detected in a software application, according to some embodiments of the technology described herein.

FIG. 6 is an example process 600 of triaging issues detected in a software application, according to some embodiments of the technology described herein. In some embodiments, process 600 may be performed by issue detection system 200 described herein with reference to FIG. 2.

Process 600 begins at block 602, where the system collects data during sessions in which the software application is being used. As described herein with reference to FIG. 2, the software application may be accessed by several different user devices. The system may collect data in each session in which a device is interacting with the software application program.

In some embodiments, the system may collect data from a device interacting with the software application. The system may access information from one or more applications of the device. For example, the system may collect data from an Internet browser application being used by the device to access a web application. As another example, the software application may be installed on and executing on a user device and the system may collect data from the software application. In some embodiments, the system may organize the collected data based on sessions in which the data was collected. The system may generate a data record for each session in which data collected during the session is stored.

Next, process 600 proceeds to block 604, where the system detects occurrence of potential issues in the sessions. The system may detect occurrence of an issue in a given session using data collected during the session. In some embodiments, the system may perform issue detection while a user device is interacting with the software application. For example, the system may execute in concert with the software application to identify any issues. In some embodiments, the system may perform issue detection after a session is complete. For example, the system may detect issues in a session using data collected during the session after the session has completed.

The system may analyze data collected during a session to detect occurrence of an issue. For example, the system may determine whether an error has occurred in the software application, whether the software application has stopped working, or whether functionality of the software application is not operational. The system may detect an issue based on the analysis.

Next, process 600 proceeds to block 606, where the system generates, in a GUI, visual indications of impact levels determined for the potential issues. The block 606 includes steps at blocks 606A-606D.

At block 606A, the system obtains data collected during one or more sessions in which an issue occurred. In some cases, the issue may have occurred in multiple different sessions. The system may obtain a set of parameter values in a time period before and/or after occurrence of the issue in each of the sessions. In some cases, the issue may have occurred in a single session. The system may obtain a set of parameter values in a time period before and/or after occurrence of the issue in the session.

At block 606B, the system determines a classification of the issue into one of multiple 5 impact levels using data collected during the session(s) in which the issue occurred. The system may determine a classification as described herein with reference to FIG. 3. For example, the system may determine a classification by analyzing data collected during the session(s) (e.g., based on the value(s) of one or more parameters determined from the data). In some embodiments, the system may determine a classification for the issue using a trained machine learning model. The system may: (1) generate one or more sets of feature values using the data; and (2) provide the set(s) of feature values as input(s) to the trained machine learning model to obtain output(s). The system may determine, using the output(s), a classification of the issue into one of the multiple impact levels. Example techniques of how the system may use a machine learning model to determine a classification for an issue are described herein with reference to FIG. 4A.

In some embodiments, the system may determine a classification for an issue by determining values (e.g., probability values or scores) corresponding to the multiple impact levels using the data collected during a session in which the issue occurred. The values associated with each impact level may indicate a likelihood that the issue has the impact level. In some embodiments, the scores may be output by a machine learning model used to determine the classification. The system may determine the classification into an impact level (e.g., the first impact level) when the value corresponding to the impact level exceeds a threshold score. For example, when the system determines that a probability value corresponding to a high impact level is above a threshold probability, the system may determine a classification of the issue into the high impact level. In some embodiments, the threshold value may be a configurable parameter. For example, the threshold value may indicate a sensitivity for designating issues as high impact. The threshold value may be configured differently for different uses of the system.

In some embodiments, the system may determine classification of the issue into one of multiple impact levels using data collected from multiple sessions in which the issue occurred. The system may determine a classification for each occurrence of the issue. The system may aggregate classification results from all the occurrences of the issue.

In some embodiments, the system may determine a classification for each occurrence of the issue using a machine learning model. For each occurrence, the system may: (1) generate a set of feature values using data from the session of the occurrence; (2) and provide the set of feature values as input to the machine learning model to obtain an output. The system may determine a classification of the issue using outputs obtained from the multiple occurrences of the issue. The system may aggregate values associated with the impact levels obtained from the machine learning model from processing data associated with the occurrences. For example, the system may determine a mean value (e.g., probability value) associated with each impact level across the occurrences, determine a maximum value associated with each impact level across the occurrences, or determine a value associated with each impact level at a particular percentile (e.g., $95^{th}$ percentile) of the occurrences. The system may use the aggregated value to determine the classification. For example, the system may determine whether an aggregate value associated with a high impact level is above a threshold value, and classify the issue into the high impact level when it is determined that the aggregate value is above the threshold value.

In some embodiments, the system may aggregate classification results for multiple occurrences of the issue in a single session into a single classification result for the session. The classification result for the session may be aggregated with classification results of other session(s) in which the issue occurred. The system may: (1) obtain a single classification result for each of one or more sessions in which the issue occurred; and (2) combine the aggregation results across all the session(s) to obtain the final issue classification. The system may aggregate values associated with impact levels obtained for occurrences of an issue within a single session using techniques of classification result aggregation described herein. For example, the system may determine a mean value (e.g., probability value) associated with each impact level across the occurrences in the session, or determine a maximum value associated with each impact level across the occurrences in the session.

Next, at block 606C, the system generates, in the GUI, a visual indication of the impact level determined for the issue at block 606B. For example, the system may graphically mark a listing entry associated with the issue and/or a GUI displaying information about the issue to indicate the determined impact level. The visual indication may indicate to a user that the issue is of the impact level (e.g., that the issue has a high impact on the software application). In some embodiments, the system may generate, in the GUI, a natural language description of the issue. In some embodiments, the system may conditionally generate the natural language description of the issue. For example, the system may generate a natural language description of the issue when the issue is of a particular impact level (e.g., a high impact level).

In some embodiments, the system may generate a visualization of the impact level determined for the issue only when occurrence of the issue was detected in a threshold number of sessions (e.g., 5, 10, 15, 20, 25, 30, 35, 40, 45, or 50 sessions). In such embodiments, the system may not provide a visualization for an issue if it did not occur in the threshold number of sessions. In some embodiments, the system may generate a visualization of the impact level determined for the issue irrespective of the number of sessions in which the issue occurred.

Next, at block 606D, the system determines if there are remaining issues to classify. If the system determines that there are no more remaining issues, then process 600 ends. If the system determines that there are other issues, the system returns to block 606A to classify another issue. In some embodiments, the system may perform the steps of block 606 for multiple issues in parallel.

Figure 7A:
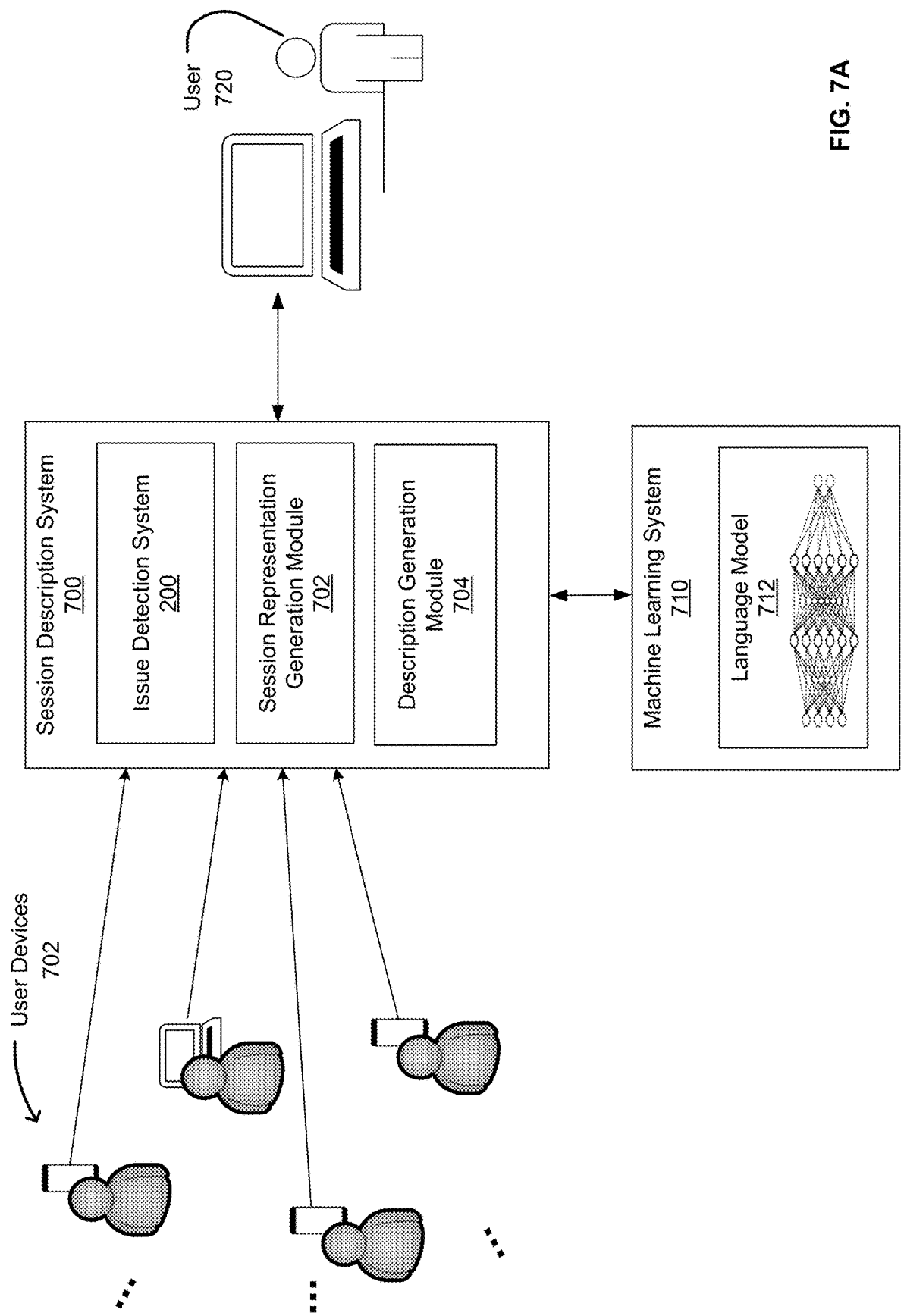
FIG. 7A is an example environment in which a session description system may operate, according to some embodiments of the technology described herein.

FIG. 7A is an example environment in which a session description system 700 may operate, according to some embodiments of the technology described herein. As shown in FIG. 7A, the session description system 700 is in communication with user devices 702, a machine learning system 710, and a user device 720. The session description system 700 may collect data from the devices 702 during sessions of a software application. The session description system 700 may use the data to generate natural language descriptions of events that occurred in the sessions (e.g., issues that occurred during the sessions). The session description system 700 may use the machine learning system 710 to generate the natural language descriptions. The session description system 700 may transmit generated natural language descriptions to a device of a user 720 (e.g., for display in a GUI displayed by the device of the user 720).

Session description system 700 may comprise one or more computing devices. In some embodiments, the session description system 700 may comprise one or more servers. For example, the software application may be a web application that is hosted by server(s) and component(s) of the session description system 700 may be implemented on the server(s). In some embodiments, one or more components of the session description system 700 may be executed on a device hosting a software application that is being monitored for issue detection and description. For example, component(s) of the session description system 700 may be executed as part of the software application.

In some embodiments, each of the user devices 702 may be any computing device that can access the software application. For example, a user device may be a laptop computer, desktop computer, smartphone, tablet, wearable device, or any other suitable computing device. In some embodiments, each of the user devices 702 may be configured to access the software application. A user device may access the software application in various ways. In some embodiments, a user device may access the software application using an Internet browser application. For example, the software application may be a web application accessed using an Internet browser application. In some embodiments, the software application may be installed on the user device, and the user device may access the software application by executing the software application. For example, the software application may be a mobile application that is executed by the user device (e.g., a smartphone). In some embodiments, the software application may include components executed locally on a user device and other components accessed through a network (e.g., the Internet). For example, the software application may include a component that is installed on a user device and used by the user device to interact with another component of the software application that is installed on a system remote from the user device (e.g., on a server).

In some embodiments, the session description system 700 may be configured to provide a GUI on the device of the user 720 that presents information about issues detected in sessions of the software application. For example, the session description system 700 may provide an Internet website through which developers and/or technical support specialists may view session descriptions. The user 720 may be any user of the session description system 700. For example, the user 700 may be a technical support specialist, a software developer, a product manager, and/or any other suitable user. Although the example embodiment of FIG. 7A shows a single user 720, in some embodiments, there may be multiple users of the session description system 700.

In some embodiments, the machine learning system 710 may be a computer system configured to execute a trained language model 712. The machine learning system 710 may include memory storing parameters of the language model 712. The machine learning system 710 may be configured to use the parameters to process input to the language model 712 (e.g., received from the session description system 700). For example, the machine learning system 710 may store weights of a neural network that the machine learning system 710 uses to process inputs to the neural network to generate corresponding outputs. The machine learning system 710 may be configured to receive, from the session description system 700, an input to the language model. The machine learning system 710 may process the input using stored parameters of the language model 712 to generate an output. The machine learning system 710 may transmit the output to the session description system 700.

In some embodiments, the language model 712 may be a neural network. In some embodiments, the neural network may be a large language model (LLM). The LLM may be a transformer neural network. The LLM may be trained to process input (e.g., a session representation) to generate output. In some embodiments, the LLM may include millions of neurons and connections between the neurons. In some embodiments, the neural network may include a convolutional neural network (CNN), a recurrent neural network (RNN), a long short-term memory (LSTM) network, and/or other suitable neural network.

In some embodiments, the language model 712 may be a pre-trained language model or a tuned version thereof. For example, the language model 712 may be OpenAI's GPT-4 model described in "GPT-4 Technical Report" arXiv:submit/4812508 [cs.CL] 27 (March 2023), which is incorporated by reference herein in its entirety. As another example, the language model 712 may be OpenAI's GPT-3.5 Turbo model. As another example, the language model 712 may be Google's PaLM 2 model described in "PaLM 2 Technical Report" arXiv: 2305.10403v3 [cs.CL] 13 Sep. 2023, which is incorporated by reference herein in its entirety. As another example, the language model 712 may be Meta's LLAMA 2 model described in "LLAMA 2: Open Foundation and Fine-Tuned Chat Models" arXiv:2307.09288v2 [cs.CL] 19 Jul. 2023, which is incorporated by reference herein in its entirety. As another example, the language model 712 may be Anthropic's Claude 2 model described in "Model Card and Evaluations for Claude Models", which is incorporated by reference herein in its entirety.

In some embodiments, the language model 712 may be a pre-trained generative model. For example, the language model 712 may be a generative pre-trained transformer (GPT) (e.g., GPT-3 or GPT-4 model developed by OpenAI, FLAN-T5 model, or other GPT model). The GPT model may be a pre-trained model. The GPT model may have been pre-trained using existing data. For example, the GPT model may been pre-trained using existing textual data (e.g., books, Internet website text, academic papers, and/or other textual data) and/or image data (e.g., images and/or video). The GPT model may include an encoder that generates a numerical representation of input. For processing text in the input, the encoder may include a vocabulary of words that the encoder uses to generate a numerical representation (e.g., a numerical vector) of each word in the text. The GPT model may include an embedding layer that takes the numerical representation (e.g., a matrix) of the input and generates an embedding having lower dimensionality than the input. An embedding generated by the embedding layer may have a dimensionality between 100-500 dimensions, 500-1000 dimensions, 1000-2000 dimensions, 2000-3000 dimensions, 3000-4000 dimensions, 4000-5000 dimensions, 5000-6000 dimensions, 6000-7000 dimensions, 7000-8000 dimensions, 8000-9000 dimensions, 9000-10000 dimensions, 10000-11000 dimensions, 11000-12000 dimensions, 12000-13000 dimensions, 13000-14000 dimensions, 14000-15000 dimensions, or another suitable dimensionality. In some embodiments, the GPT model may include a positional encoder that encodes information about the position of each word in text of an input. The positional encoding may be combined with the embedding (e.g., by adding an embedding matrix and a positional encoding matrix). In some embodiments, the GPT model may include an encoder that encodes information in image(s) and/or video of an input. The GPT model may include multiple layers (e.g., attention layers and/or feed forward layers) that process a combination of the input text embedding and positional encoding. In some embodiments, the GPT model may include between 10-20 layers, 20-30 layers, 30-40 layers, 40-50 layers, 50-60 layers, 60-70 layers, 70-80 layers, 80-90 layers, 90-100 layers, 100-110 layers, 110-120 layers, 120-130 layers, 130-140 layers, or other suitable number of layers that are used to process the combination of the input text embedding and the positional encoding. The GPT model may decode the output of the layers to obtain an output. The output may be transformed into a word encoding which may be used to obtain output probabilities of various words (e.g., by applying a softmax function to the word encoding). The output probabilities of the words may be used to generate a final output of the model. For example, the model may output one or more responses to requests identified in the input.

In some embodiments, the language model 712 may be configured to receive input in the form of text, image(s), and/or video. The input may specify a request for the model. For example, the language model 712 may receive a textual query requesting the language model 712 for a particular output such as a description of an issue that occurred in a software application session, a description of a sequence of events that occurred in a software application session, whether an issue occurred in a software application session, whether repeated user activity occurred in the session after occurrence of an issue, and/or other queries. The language model 712 may generate a response by processing the textual query. In some embodiments, input to the language model 712 may include data in addition to a request. The data may include additional text, image(s), and/or video. The language model 712 may generate a response by processing the request with the additional data. For example, the language model 712 may receive input including a representation of a software application session (e.g., text indicating a sequence of events in the session, image(s) of a session replication, and/or video of a session replication) in addition to a request. The language model 712 may use the data provided with, before, or after the request to generate a response to the request.

In some embodiments, the language model 712 may be a pre-trained model. The language model 712 may be trained using a corpus of textual data. For example, the corpus of text data may be a corpus of textual data collected from various sources (e.g., websites, dictionaries, electronic books, and/or other sources). In some embodiments, the language model 712 may be trained by a self-supervised learning technique. For example, the language model may be given a portion of a set of text (e.g., a portion of a sentence) and be trained to predict a remaining portion of the text (e.g., the rest of the sentence). The output of the language model 712 may be compared to the actual remaining portion of the text, and parameters of the language model 712 may be updated based on the difference. For example, the parameters of the language model 712 may be iteratively updated using stochastic gradient descent. In each iteration, output(s) of the language model 712 may be compared to target input(s) (e.g., a label(s)), a gradient may be determined based on a difference between the output(s) and target input(s), and the parameters of the language model 712 may be updated using the gradient (e.g., by subtracting a proportion of the gradient from the parameters). In some embodiments, the language model 712 may be obtained by fine-tuning a pre-trained language model. For example, a self-supervised learning technique may be performed using a set of training data generated using data collected during software application sessions. The pre-trained model may thus be fine-tuned for processing data related to software application sessions.

In some embodiments, the language model 712 may be trained using a corpus of image data. For example, the corpus of image data may be a corpus of image data collected from various sources (e.g., websites, dictionaries, electronic books, and/or other sources). In some embodiments, the language model 712 may be trained by a self-supervised learning technique. For example, the language model may be given a portion of an image and be trained to predict a remaining portion of the image. The output of the language model 712 may be compared to the actual remaining portion of the image, and parameters of the language model 712 may be updated based on the difference. For example, the parameters of the language model 712 may be iteratively updated using stochastic gradient descent. In each iteration, output(s) of the language model 712 may be compared to target input(s) (e.g., a label(s)), a gradient may be determined based on a difference between the output(s) and target input(s), and the parameters of the language model 712 may be updated using the gradient (e.g., by subtracting a proportion of the gradient from the parameters). In some embodiments, the language model 712 may be obtained by fine-tuning a pre-trained language model. For example, a self-supervised learning technique may be performed using a set of training data generated using data collected during software application sessions. The pre-trained model may thus be fine-tuned for processing data related to software application sessions.

Although in the example embodiment of FIG. 7A, the machine learning system 710 is separate from the session description system 700, in some embodiments, the machine learning system 710 may be a component of the session description system 700. For example, the machine learning system 710 may be implemented as a module of the session description system 700. In such embodiments, the machine learning system 710 may be implemented using memory and processing hardware of the session description system 700.

As shown in FIG. 7A, the session description system 700 includes the issue detection system 200, the session representation generation module 702, and the description generation module 704.

In some embodiments, the issue detection system 200 may be as described herein with reference to FIG. 2-FIG. 6. The issue detection system 200 may be used by the session description system 700 to collect data from the devices 720 (e.g., during software application sessions), detect occurrence of issues in sessions, and triage the detected issues.

The session representation generation module 702 may generate representations of sessions. A representation of a session ("session representation") may include data indicating a sequence of events that occurred in the session. The session representation generation module 702 may be configured to programmatically generate a session representation using data collected during the session. The session representation generation module 702 may be configured to generate a session representation in various ways. In some embodiments, the session representation generation module 702 may generate a session representation by generating a textual transcription of events. For example, the session representation generation module 702 may generate a log of events. The events may include user actions, changes in a GUI of the software application, actions executed by the software application, and/or other events that occurred in the session. In some embodiments, the session representation module 702 may generate a session representation by generating a sequence of images of a GUI of a software application captured during a session. For example, the sequence of images of the GUI may be screen captures of a replay of a software application session. The sequence of images may include images of the software application session and/or a replay GUI in which the software application session is being replayed. The replay GUI may include a timeline indicating how much of a session has elapsed, when the session occurred, information about network requests being made by the application during the session (e.g., shown in a pane of the replay GUI), information about messages logged to a console and/or application exceptions (e.g., shown in a pane of the replay GUI). In some embodiments, a session representation may indicate an order in which events occurred. For example, the session representation may include an index indicating an order of events. As another example, the session representation may include timestamps associated with events.

Below is an example sequence of entries from a session representation. In this example, the session representation is a textual transcription of events that occurred in the session.

m. Navigated to https://checkin.example.com/itinerary/123ABC
n. Clicked on 33B
o. Saw text Section Regular Seat regular Standard seat 10° recline angle USB Port Personal touchscreen Seat 33B - Regular Select passenger
p. Clicked on 12.34 USD
q. Saw text There was an error when selecting your seats. Try again.
r. Clicked on 33A
s. Saw text Section Regular Seat regular Standard seat 10° recline angle USB Port Personal touchscreen Seat 33A - Regular Select passenger
t. Clicked on <div> element
u. Clicked on <div> element
v. Clicked on 33A -continued w. Saw text Section Regular Seat regular Standard seat 10° recline angle USB Port Personal touchscreen Seat 33A - Regular Select passenger
x. Clicked on 12.34 USD
y. Saw text There was an error when selecting your seats. Try again.

In some embodiments, the session representation generation module 702 may generate a representation of a session using data collected from a user device during the session (e.g., collected by the session management module 206). For example, the data collected from the user device during the session may be data collected for generating a replay of the session in a replay GUI that allows a user to view a replication of a sequence of events that occurred during the session. The session representation generation module 702 may use the data to generate an indication of a sequence of events that occurred in the session. For example, the session representation generation module 702 may generate a textual transcription comprising multiple entries each indicating an event. As another example, the session representation generation module 702 may capture screenshots of a replay of the session to include in the session representation. As another example, the session representation generation module 702 may capture video of a replay of the session rendered in a replay GUI, and include the video in the session representation.

In some embodiments, the session representation generation module 702 may comprise a set of instructions executed (e.g., as part of a software application) by the user devices 702. For example, a set of code may be integrated into the software application code. When executed by a processor of a device, the set of instructions may cause a device to collect data for generation of a session representation and/or populate a session representation. For example, the set of instructions may cause the device to log entries in a session representation. As another example, the set of instructions may cause the device to store data (e.g., an event log) that may subsequently be processed to generate a session representation.

The description generation module 704 may be configured to generate natural language descriptions for sessions of a software application executed by the devices 702. In some embodiments, the description generation module 704 may generate descriptions of issues (e.g., detected by the issue detection system 200) that occurred in sessions of the software application.

In some embodiments, the description generation module 704 may be configured to use the language model 712 to generate a description of an issue in a session of a software application. An example of such a description is "Users unable to select flight seats." In some embodiments, the description generation module 704 may process a session representation using the language model 712 to obtain a description of the issue in the session. The description generation module 704 may process a session representation using the language model 712 by: (1) generating one or more inputs for the language model 712 using the session representation; and (2) providing the input(s) to the language model 712 to obtain the description of the issue. For example, the description generation module 704 may generate input comprising a textual request for a description of an issue that occurred in a session and provide the input to the language model 712 to obtain output indicating a natural language description of the issue.

In some embodiments, the description generation module 704 may be configured to generate a description of an issue using a sequence of inputs for the language model 712. The description generation module 704 may provide one input to the language model 712 and generate a subsequent input based on a response to the prior input obtained from the language model 712. The sequential processing of description generation module 704 may guide processing performed by the language model 712 in generating a description of an issue.

In some embodiments, the description generation module 704 may be configured to provide input to the language model 712 and obtain outputs from the language model 712 by communicating with the machine learning system 710. For example, the description generation module 704 may communicate with the machine learning system 710 through a communication network (e.g., the Internet). In this example, the description generation module 704 may transmit, through the communication network, inputs to the language model 712 (e.g., in network data packet(s)) and receive, through the communication network, outputs of the language model 712 (e.g., in network data packets). In some embodiments, the machine learning system 710 may be a component of the session description system 700 and the description generation module 704 may process inputs to the language model 712 using parameters of the language model 712 stored in memory of the session description system 700 to obtain outputs.

Figure 7B:
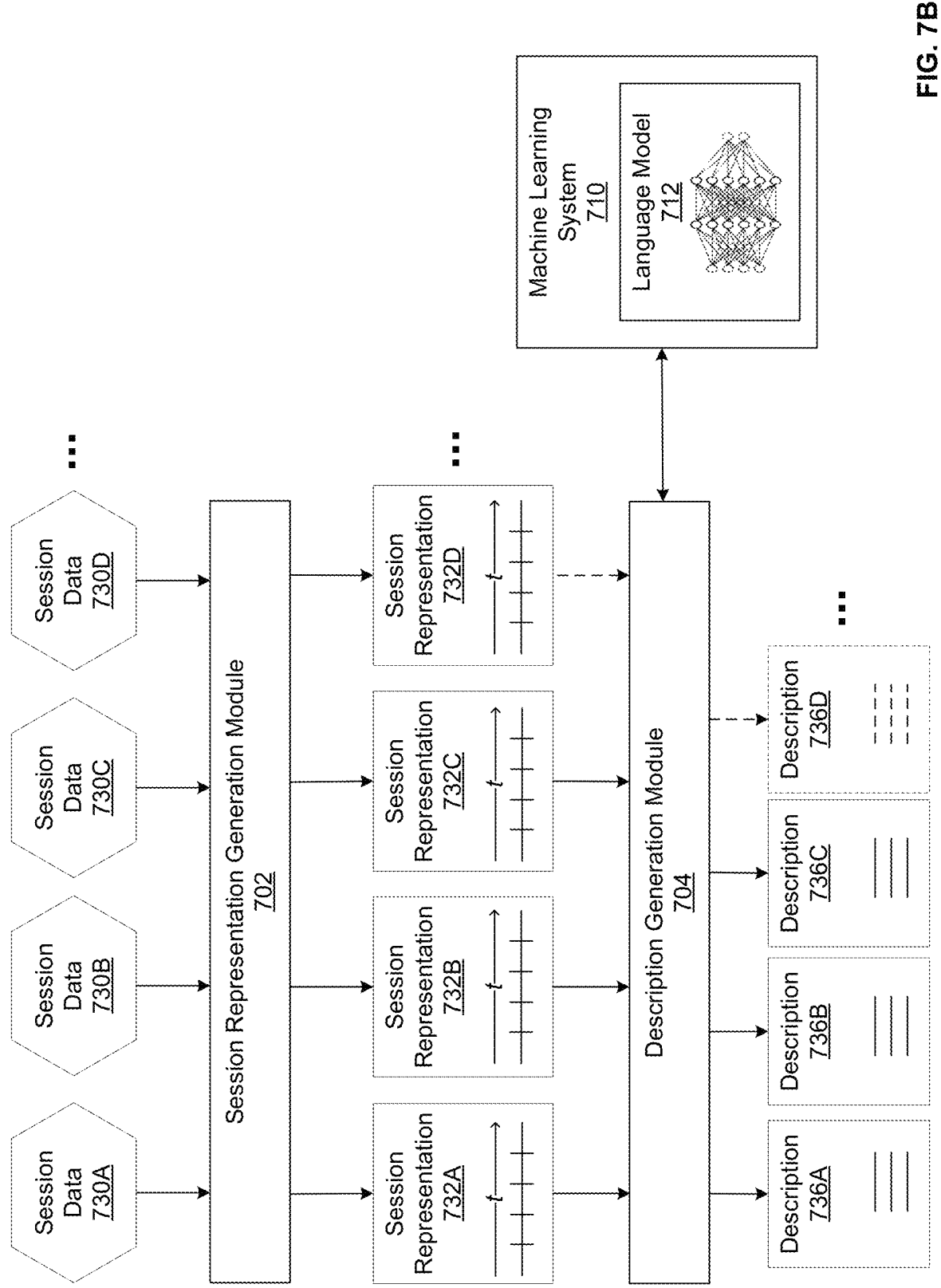
FIG. 7B illustrates an example interaction between the session representation generation module and the issue description generation module of the session description system of FIG. 7A, according to some embodiments of the technology described herein.

FIG. 7B illustrates an example interaction between the session representation generation module 702 and the issue description generation module 704 of the session description system 700 of FIG. 7A, according to some embodiments of the technology described herein. As shown in FIG. 7B the session representation generation module 702 obtains sets of session data 730A, 730B, 730C, 730D. Each of the sets of session data 730A, 730B, 730C, 730D may be associated with a respective session of the software application. For example, each of the sets of session data 730A, 730B, 730C, 730D may include information collected during a respective session of the software application executed by one of the user devices 702. Example techniques of collecting information during a session are described herein (e.g., with reference to session management module 206 described herein with reference to FIG. 2 and/or with reference to block 602 described herein with reference to FIG. 6). In some embodiments, the sets of session data 730A, 730B, 730C, 730D may be accessed from a datastore. For example, the sets of session data 730A, 730B, 730C, 730D may be accessed from a database of the session description system 700 that stores sets of session data. In some embodiments, the sets of session data 730A, 730B, 730C, 730D may be accessed from devices 702. For example, the sets of session data 730A, 730B, 730C, 730D may be accessed from memory of the devices 702 through an application programming interface (API).

As illustrated in FIG. 7B, the session representation generation module 702 generates session representations using data collected during the sessions. In the example of FIG. 7B, the session representation generation module 702 generates a session representation 732A using the session data 730A, session representation 732B using the session data 730B, session representation 732C using the session data 730C, and session representation 732D using the session data 730D. In some embodiments, the session representation generation module 702 may generate a session representation using session data by: (1) identifying events that occurred in the session using the session data; and (2)

generating entries in the session representation indicating the identified events. As an illustrative example, the session representation generation module 702 may identify receipt of user input to trigger actions and store entries indicative of the user actions in a session representation. As another example, the session representation generation module 702 may identify updates to a GUI of the software application and store entries indicative of the updates to the GUI in a session representation. As another example, the session representation generation module 702 may identify functions of the software application executed during a session and store entries indicative of the executed functions in a session representation. In some embodiments, the session representation generation module 702 may generate a representation of a session using events proximate occurrence of an issue in the session. For example, the session representation generation module 702 may generate a session representation using events that occurred 5, 10, 15, 30, 45, or 60 seconds before an issue occurred and/or events that occurred 5, 10, 15, 30, 45, or 60 seconds after the issue occurred. As an illustrative example, data collected from a session may indicate the following event corresponding to a user navigating to a webpage: {type: 'NavigationEvent', data: {action: 'PAGE_LOAD', href: 'https://example.com'}, time: 1696968408402}. In this example, the session representation generation module 702 may translate the event into a textual transcription of a user action that reads "Navigated to https://example.com". As another example, data collected from a session may indicate the following event corresponding to a user clicking on a button in a browser that is labeled "Add to Cart": {type: 'MouseEvent', data: {action: 'CLICK', text: 'Add to Cart' }, time: 1696968408402}. In this example, the session representation generation module 702 may translate the event into a textual transcription of a user action that reads "Clicked on Add to Cart". As another example, data collected from a session may include a document object model (DOM) tree indicating the structure and content of a GUI visible to the user. The session representation generation module 702 may extract text (e.g., that is displayed to the user in the GUI) from the DOM tree into entries of a session representation.

In some embodiments, the session representation generation module 702 may generate a session representation that includes images and/or video of a session. The session representation generation module 702 may generate a session replay in a GUI and capture screenshots and/or record video of the session replay. The session representation generation module 702 may use the captured screenshots and/or the recorded video as a representation of the session. In some embodiments, the session representation generation module 702 may store images as entries in a session representation (e.g., to indicate a sequence of events by a sequence of images of the GUI). In some embodiments, the session representation generation module 702 may use session data to replicate visualizations from the session in a replay GUI. The session representation generation module 702 may capture screenshots and/or video of the replicated visualizations and include them in a session representation.

As shown in FIG. 7B, the description generation module 704 generates descriptions of sessions using representations of the session generated by the session representation generation module 702. In the example of FIG. 7B, the description generation module 704 generates description 736A using session representation 732A, description 736B using session representation 732B, description 736C using session representation 732C, and description 736D using session representation 732D. In some embodiments, the description generation module 704 may be configured to generate descriptions of issues that occurred in sessions. For example, each of the session descriptions 736A, 736B, 736C, 736D may include a natural language description of an issue that occurred in a respective session. The description generation module 704 may process one or more session representations to generate a description of an issue that occurred in one or more sessions. For example, the description generation module 704 may process the session representations 732A, 732B, 732C to generate the description 736A of an issue that occurred in sessions corresponding to session representations 732A, 732B, 732C.

As shown in FIG. 7B, the description generation module 704 uses the machine learning system 710 to generate descriptions 736A, 736B, 736C, 736D. In particular, the description generation module 704 may process the session representations 732A, 732B, 732C, 732D using the language model 712 of the machine learning system 710 to obtain the descriptions 736A, 736B, 736C, 736D. In some embodiments, the description generation module 704 may process a given session representation to generate a description (e.g., of an issue that occurred in a session) by: (1) generating one or more inputs for the language model 712 using the session representation; and (2) providing the input(s) to the language model 712 to obtain the description. For example, the description generation module 704 may generate input(s) including request(s) for certain output(s) from the language model 712. The input(s) may include at least a portion of the session representation that is provided along with the request. The language model 712 may process the input(s) to generate the output(s). An example technique for processing a session representation by the description generation module 704 is described herein with reference to FIG. 8.

In some embodiments, the description generation module 704 may generate a description for only a subset of sessions for which it receives session representations. As indicated by the dashed lines of description 736D, for example, the description generation module 704 may not generate a description 736D using session representation 732D. The description generation module 704 may not generate a description for a session for various reasons. For example, the description generation module 704 may determine that no issue occurred in the session and, as a result, determine to not generate a description for the session. As another example, the description generation module 704 may determine that an issue detected in a session is not of sufficiently high impact to trigger additional processing to generate a description of the issue. As another example, the description generation module 704 may determine to not generate a description for a session when it determines that repeated user activity (e.g., user retrying a particular action multiple times) did not occur proximate occurrence of the issue. As another example, the description generation module 704 may determine whether to generate a description of an issue by checking whether an explicit failure event (e.g., an exception, a network error, and/or another failure event) occurs.

In some embodiments, the description generation module 704 may perform one or more heuristics to determine whether one or more rules are met by a set of sessions. The description generation module 704 may generate a description of an issue that occurred in the set of sessions when it is determined that the rule(s) are met. Example rules are described herein. In some embodiments, the description generation module 704 may generate a description of an issue using the language model when a threshold number of sessions (e.g., 1, 2, 3, 4, 5, 6, 7, 8, 9, 10 or another suitable number of sessions) in which the issue was detected meet the rule(s). Thus, the description generation module 704 may limit use of the language model 712 (e.g., to limit use of computational resources).

Figure 7C:
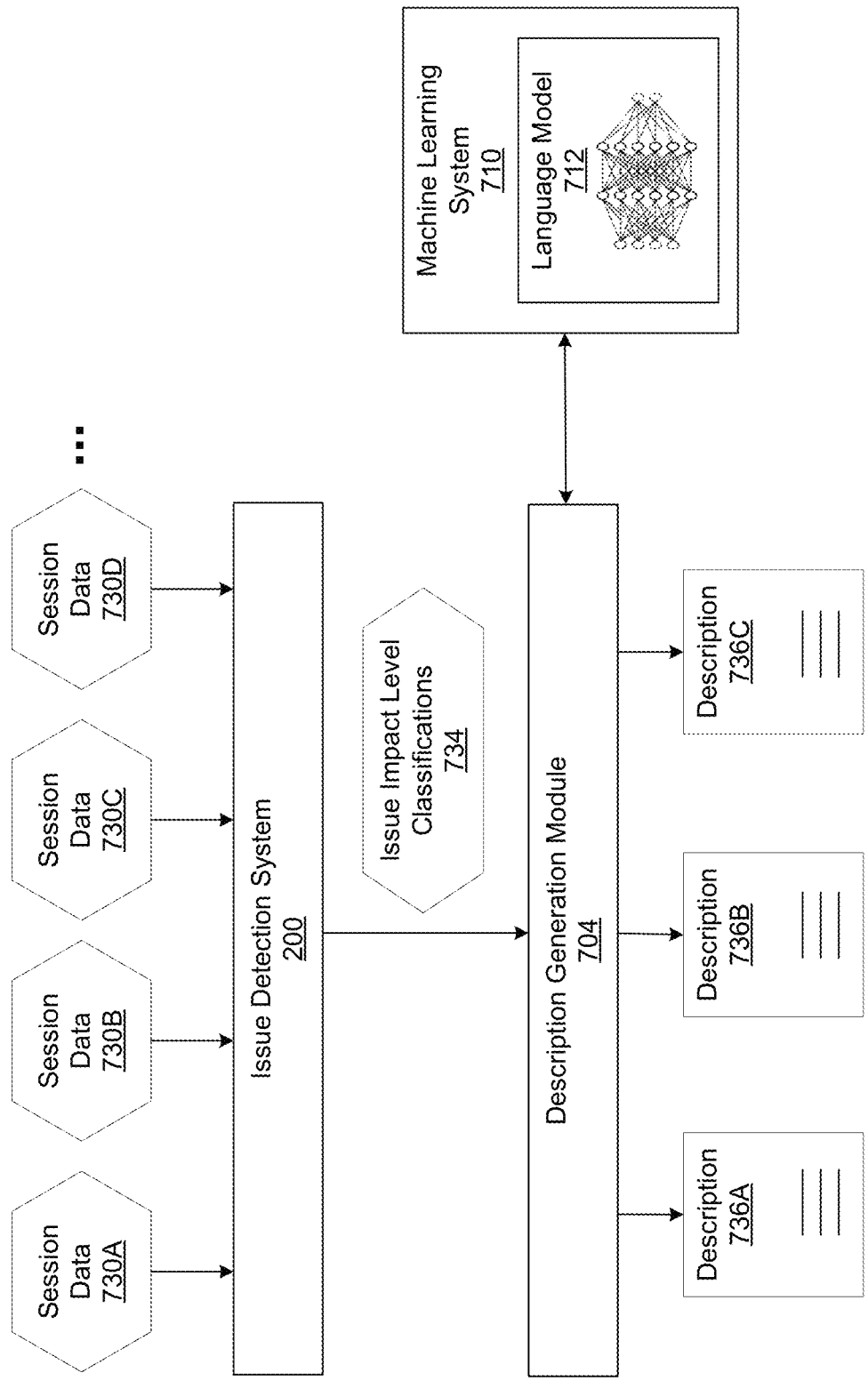
FIG. 7C illustrates an example interaction between the description generation module 704 and the issue detection system 200 of the session description system 700 of FIG. 7A, according to some embodiments of the technology described herein.

FIG. 7C illustrates an example interaction between the description generation module 704 and the issue detection system 200 of the session description system 700 of FIG. 7A, according to some embodiments of the technology described herein. As shown in FIG. 7C, the issue detection system 200 uses sets of session data 730A, 730B, 730C, 730D to: (1) determine whether an issue occurred in respective sessions for which sets of session data were collected; and (2) triage the issues. The issue detection system 200 may triage detected issues by classifying the detected issues into impact levels. As shown in FIG. 7C, the issue detection system 200 provides issue impact level classifications 304 to the description generation module 704.

In some embodiments, the description generation module 704 may use the issue impact level classifications 734 determined by the issue detection system 200 to determine whether to generate descriptions of issues that occurred in sessions. The description generation module 704 may determine whether to generate a description of an issue by: (1) determining whether impact level classification of the issue is a target impact level (e.g., high impact); and (2) determine to perform further processing to generate a description of the issue when it is determined that the impact level classification of the issue is the target impact level; and (3) bypass performance of further processing to generate a description of the issue when it is determined that the impact level classification of the issue is not the target impact level. In this manner, the description generation module 704 may limit processing to generate a description of an issue to only those issues that are of high impact, as determined by the issue detection system 200. The description generation module 704 may thus limit execution of the language model 712 to high impact issues. As the language model 712 may, in some embodiments, contain billions of parameters that are used to process an input, this may allow the description generation module 704 to generate descriptions more efficiently.

In the example of FIG. 7C, the issue detection system 200 receives sets of session data 730A, 730B, 730C, 730D associated with respective sessions. The issue detection system 200 may detect occurrence of an issue in each of the sessions using the sets of session data 730A, 730B, 730C, 730D. The issue detection system 200 further triages the issues by determining impact level classifications for the issues (e.g., by performing process 600 described herein with reference to FIG. 6). The description generation module 704 uses the issue impact class level classifications 734 to determine which of the detected issues for which to generate a description. In the example of FIG. 7C, the issues detected in the sessions associated with sets of session data 730A, 730B, 730C may be designated as high impact while the issue detected in the session associated with session data 730D may be designated as low impact. The description generation module 704 may use the impact level classifications 734 to determine to generate descriptions 736A, 736B, 736C of the issues with a high impact level classification. The description generation module 704 may use the impact level classifications 734 to bypass processing to generate a description of the issue with a low impact level classification.

In some embodiments, the issue detection system 200 may use results obtained from description generation to further refine triaged output provided to a user. The issue detection system 200 may, for example, only alert or otherwise display information about issues for which a natural language description was generated. These issues may have the greatest impact given the multiple filters (e.g., impact level, rule(s) that must be met to use the language model, and/or responses of the language model) they have passed prior to generation of the natural language description. Thus, a user may focus troubleshooting and development efforts for a software application accordingly.

Figure 8:
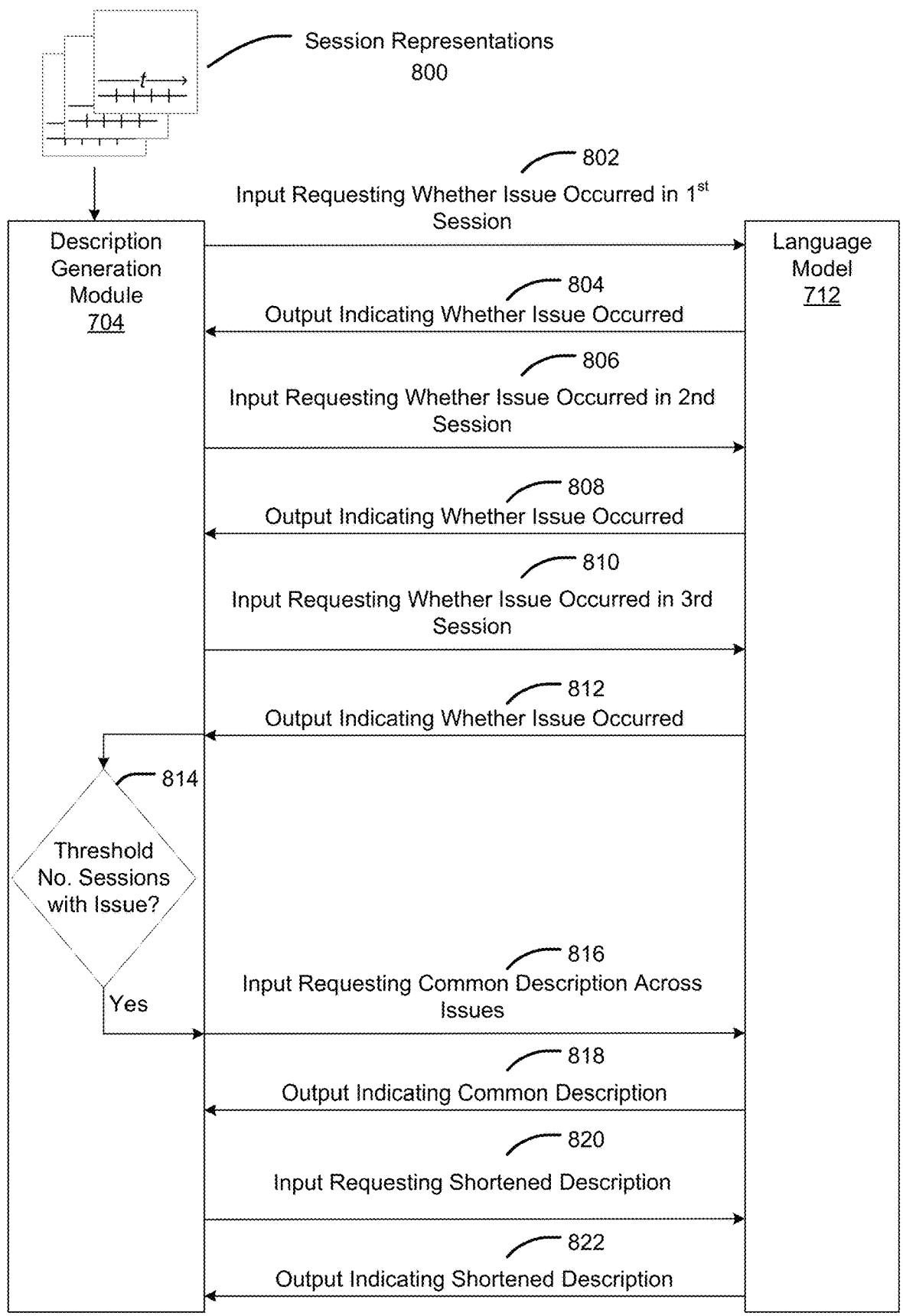
FIG. 8 is a diagram illustrating processing performed by the description generation module using the language model to generate a natural language description of an issue that occurred in one or more of a set of sessions, according to some embodiments of the technology described herein.

FIG. 8 is a diagram illustrating processing performed by the description generation module 704 using the language model 712 to generate a natural language description of an issue that occurred in one or more of a set of sessions, according to some embodiments of the technology described herein. In some embodiments, the processing illustrated in FIG. 8 may be performed for a subset of sessions in which an issue was detected. For example, the processing may be performed by selecting a number of sessions (e.g., 1, 2, 3, 4, 5, 6, 7, 8, 9, 10, or another number of sessions) from a set of sessions in which the issue was detected. In the example of FIG. 8, the processing is performed for 3 sessions in which an issue was detected. The description generation module 704 thus receives a set of 3 session representations 800 (e.g., generated by the session representation generation module 702). In some embodiments, the description generation module 704 may select a threshold number of sessions containing occurrences of an issue with the greatest probability of being high impact (e.g., the highest impact level classification determined by the triage module 210).

As shown in FIG. 8, the description generation module 704 uses the session representations to generate inputs requesting whether an issue occurred in the sessions. In some embodiments, the description generation module 704 may generate an input for a session by including, in the input: (1) text requesting the language model 712 to determine whether an issue occurred in the session; and (2) at least a portion of data from a corresponding representation of the session. For example, the description generation module 704 may generate an input including the following request "Does evidence of a technical issue appear in this user activity history delimited by triple quotes?" along with a portion of data from the session representation 800 (e.g., a subset of entries indicating user actions performed in the session). In some embodiments, the input may include at least a portion of data from a portion of the representation 800 of the session that is proximate occurrence of the issue.

In some embodiments, the description generation module 704 may process the output received in response to an input to determine whether an issue occurred by extracting a substring from the output and determining whether an issue occurred based on the extracted substring. For example, the description generation module 704 may extract the first word in the response and determine whether an issue occurred based on the first string. In this example, the description generation module 704 may determine that an issue did occur in the session if the extracted first word is "yes" and determine that an issue did not occur in the session if the extracted first word is "no".

In some embodiments, the description generation module 704 may generate a numeric 5 representation of the output from the language model 712 (e.g., by embedding the output as a numeric vector) and determine whether an issue occurred in the session using the numeric representation. In some embodiments, the description generation module 704 may determine whether an issue occurred in the session using the numeric representation (e.g., numeric vector) by comparing the numeric vector to one or more target representations (e.g., target numeric vector(s)) to determine whether the issue occurred. For example, the description generation module 704 may generate an output numeric vector representing a string in the output (e.g., by embedding the string as a numeric vector), and comparing the output numeric vector to each of multiple target numeric vectors. In this example, a first target numeric vector may indicate occurrence of an issue and a second target numeric vector may indicate that an issue did not occur. The description generation module 704 may compare the output numeric vector to a given target numeric vector by determining a measure of distance (e.g., Euclidean distance, cosine distance, or another suitable measure of distance) between the numeric vector and the target numeric vector. In some embodiments, the description generation module 704 may determine that an issue did occur in the session when the output numeric vector is closer to the first target numeric vector and determine that an issue did not occur in the session when the output numeric vector is closer to the second target numeric vector. In some embodiments, the description generation module 704 may determine that an issue did occur when the output numeric vector is less than a threshold distance from the first numeric vector and determine that an issue did not occur when the output numeric vector is less than a threshold distance from the second numeric vector.

In the example of FIG. 8, the description generation module 704 provides an input 802 requesting whether an issue occurred in a first one of the sessions. For example, the input 802 may include the following request: "Does evidence of a technical issue appear in this user activity history delimited by triple quotes?" The input 802 may further include the following session representation or portion thereof delimited by triple quotes:

- z. Navigated to https://checkin.example.com/itinerary/123ABC
- aa. Clicked on 33B
- bb. Saw text Section Regular Seat regular Standard seat 10° recline angle USB Port Personal touchscreen Seat 33B - Regular Select passenger
- cc. Clicked on 12.34 USD
- dd. Saw text There was an error when selecting your seats. Try again.
- ee. Clicked on 33A
- ff. Saw text Section Regular Seat regular Standard seat 10° recline angle USB Port Personal touchscreen Seat 33A - Regular Select passenger
- gg. Clicked on <div> element
- hh. Clicked on <div> element
- ii. Clicked on 33A
- jj. Saw text Section Regular Seat regular Standard seat 10° recline angle USB Port Personal touchscreen Seat 33A - Regular Select passenger
- kk. Clicked on 12.34 USD
- ll. Saw text There was an error when selecting your seats. Try again.

As another example, the input 802 may include the following session representation or portion thereof delimited by triple quotes:

- mm. Navigated to https://checkin.example.com/itinerary/111AAA
- nn. Clicked on 23A
- oo. Saw text Section Regular Seat regular Standard seat 10° recline angle USB Port Personal touchscreen Seat 23A - Regular Select passenger
- pp. Clicked on 12.34 USD
- qq. Clicked on Confirm selection
- rr. Saw text loading...

As shown in FIG. 8, the language model 712 may process the input 802 requesting whether an issue occurred and generate an output 804 indicating whether an issue occurred. In some embodiments, the output 804 may be a string indicating a response to the request included in the input 802. For example, the output 804 may be a string including (e.g., beginning with) "yes" string indicating that an issue did occur in the session or a string including (e.g., beginning with) "no" indicating that an issue did not occur in the session. As indicated at reference number 806, the description generation module 704 processes the output 804 received from the language model 712 to determine whether an issue occurred. In some embodiments, the output 804 may be a string indicating a description of any issue detected in the session. For example, the output 804 may be as follows: "Yes, there is evidence of a technical issue in this user activity history. The user encounters an error message 'There was an error when selecting your seats. Try again.' twice when trying to select a seat. This suggests that there is a problem with the seat selection process on the website" (e.g., in response to the first example of input 802 mentioned above". As another example, the output 804 may be as follows: "No, there is no evidence of a technical issue in this user activity history" (e.g., in response to the second example of input 802 mentioned above.

Next, the description generation module 704 provides input 806 to the language model 712 requesting whether the issue (that occurred in the first session) occurred in a second session. For example, the input 806 may include the following request: "Does evidence of the same technical issue also appear in this user activity history delimited by triple quotes?" The input 806 may further include the following session representation or portion thereof delimited by triple quotes:

- ss. Navigated to https://checkin.example.com/itinerary/456DEF
- tt. Clicked on 21E
- uu. Saw text There was an error when selecting your seats. Try again.
- vv. Saw text Section Regular Seat regular Standard seat 10° recline angle USB Port Personal touchscreen Seat 21E - Regular Select passenger
- ww. Clicked on Free
- xx. Saw text There was an error when selecting your seats. Try again.
- yy. Clicked on 21D
- zz. Saw text Section Regular Seat regular Standard seat 10° recline angle USB Port Personal touchscreen Seat 21D - Regular Select passenger
- aaa. Clicked on <div> element As shown in FIG. 8, the language model 712 may process the input 806 requesting whether an issue occurred and generate an output 808 indicating whether the issue occurred. In some embodiments, the output 808 may be a string indicating a response to the request included in the input 806. For example, the output 808 may be a string including (e.g., beginning with) "yes" string indicating that an issue did occur in the session or a string including (e.g., beginning with) "no" indicating that an issue did not occur in the session. The description generation module 704 processes the output 808 received from the language model 712 to determine whether an issue occurred. In some embodiments, the output 808 may be a string indicating a description of any issue detected in the session. For example, the output 808 may be as follows: "Yes, the same technical issue appears in this user activity history. The user encounters the same error message "There was an error when selecting your seats. Try again." multiple times when trying to select a seat. This suggests that the seat selection process on the website is still experiencing problems."

Next, the description generation module 704 provides input 810 to the language model 712 requesting whether the issue occurred in a third session. For example, the input 810 may include the following request: "Does evidence of the same technical issue also appear in this user activity history delimited by triple quotes?" The input 810 may further include the following session representation or portion thereof delimited by triple quotes:

| | |
|---|---|
| bbb. | Navigated to https://checkin.example.pt/itinerary/789GHI |
| ccc. | Clicked on 25B |
| ddd. | Saw text Seção Regular Padrão regular Assento padrão 4" Assento reclinável Suporte para dispositivo eletrônico Porta USB Assento 25B - Regular Selecione Passageiro |
| eee. | Clicked on <div> element |
| fff. | Saw text Ocorreu um erro ao selecionar seu assento. Tente novamente. |
| ggg. | Clicked on <div> element |
| hhh. | Saw text Ocorreu um erro ao selecionar seu assento. Tente novamente. |
| iii. | Clicked on 25B |
| jjj. | Saw text Seção Regular Padrão regular Assento padrão 4" Assento reclinável Suporte para dispositivo eletrônico Porta USB Assento 25B - Regular Selecione Passageiro |
| kkk. | Clicked on <div> element |
| lll. | Saw text Ocorreu um erro ao selecionar seu assento. Tente novamente. |
| mmm. | Clicked on <img> element |
| nnn. | Clicked on <img> element |

As shown in FIG. 8, the language model 712 may process the input 810 requesting whether an issue occurred and generate an output 812 indicating whether the issue occurred. In some embodiments, the output 812 may be a string indicating a response to the request included in the input 806. For example, the output 808 may be a string including (e.g., beginning with) "yes" string indicating that an issue did occur in the session or a string including (e.g., beginning with) "no" indicating that an issue did not occur in the session. The description generation module 704 processes the output 812 received from the language model 712 to determine whether an issue occurred. In some embodiments, the output 812 may be a string indicating a description of any issue detected in the session. For example, the output 808 may be as follows: "Yes, the same technical issue appears in this user activity history. The user encounters the error message "Ocorreu um erro ao selecionar seu assento. Tente novamente." multiple times when trying to select a seat. This is the Portuguese equivalent of the previous error message, indicating the same issue with the seat selection process on the website."

As can be appreciated from the example of input 810 and the corresponding output 812, the session representation allows the language model 712 to determine whether the issue occurred in the third session despite the fact that the session representation includes text in a different language from the language (i.e., English) being used to communicate with the language model 712.

After the session representations 800 are processed, the description generation module 704 determines whether a threshold number of sessions were determined to have the issue. For example, the description generation module 704 may determine whether the issue occurred in at least two of the sessions based on the outputs 804, 808, 812 obtained from the language model 712. If there is not a threshold number of sessions in which the issue was detected, then the processing may end. If there is a threshold number of sessions in which the issue was detected, then the description generation module 704 generates input 816 requesting a common description of the issue across all the sessions. For example, the input 816 may include the following request: "In at most a few sentences, describe what these users were trying but unable to do." The language model 712 processes the input 816 and generates output 818 indicating a common description. For example, the output 818 may be as follows: "These users were trying to select a seat for their flight, but they were unable to do so due to a recurring technical error."

Next, the description generation module 704 generates an input 820 requesting the language model 712 for a shortened description. For example, the input 820 may include the following request: "Turn this description into a short phrase using as few words as possible." The language model 712 may process the input 820 to generate the output 822. For example, the output 822 may be: "Users unable to select flight seats."

Although not illustrated in the example of FIG. 8, in some embodiments, the description generation module 704 may generate an input requesting whether a target user activity occurred in the session. In some embodiments, the description generation module 704 may generate the input by including, in the input: (1) text requesting the language model 712 to determine whether the target user activity occurred in the session after and/or before occurrence of the issue; and (2) at least a portion of data from the session representation 800. In some embodiments, the target user activity may be repetition of an action by the user before and/or after occurrence of the issue. For example, the description generation module 704 may generate an input including the following request "Was there repeated user activity before and/or after occurrence of the issue?" along with a portion of data from the session representation 800 (e.g., a subset of entries indicating user actions performed in the session). In some embodiments, the target user activity may be a density of user activity, a particular movement pattern (e.g., of a cursor or touch on a touch screen interface) in a GUI, a number of interactions (e.g., number of clicks or touches), and/or other target user activity. The language model 712 may process the input requesting whether the target user activity occurred and generate output indicating whether the target user activity occurred. In some embodiments, the output may be a string indicating a response to the request included in the input 814. For example, the output may be a string including (e.g., beginning with) "yes" string indicating that the target user activity did occur in the session or a string including (e.g., beginning with) "no" indicating that the target user activity did not occur. The description generation module 704 may process the output received from the language model 712 to determine whether the target user activity occurred.

If the description generation module 704 determines that the target user activity did not occur based on the output of the language model 712, then the description generation module 704 may stop further processing to generate a description of the issue. When the description generation module 704 has determined that the target user activity did not occur, the description generation module 704 may bypass further processing for the issue (e.g., to limit use of computing resources for execution of the language model 712). If the description generation module 704 determines that the target user activity did occur based on the output 816 of the language model 712, then the description generation module 704 may proceed to generate a description of the issue.

In some embodiments, an input (e.g., one of inputs 802, 806, 810, 816, and/or 820) generated by the description generation module 704 may include a transcript of previous inputs provided to the language model 712 and/or outputs received from the language model 712. For example, the input 806 may include a transcript of the input 802 and the output 804. As another example, the input 810 may include a transcript of the inputs 802, 806 and the outputs 804, 808. Accordingly, the description generation module 704 may provide a transcript of previous interactions as historical context that the language model 712 uses to generate an output in response to an input.

Figure 9:
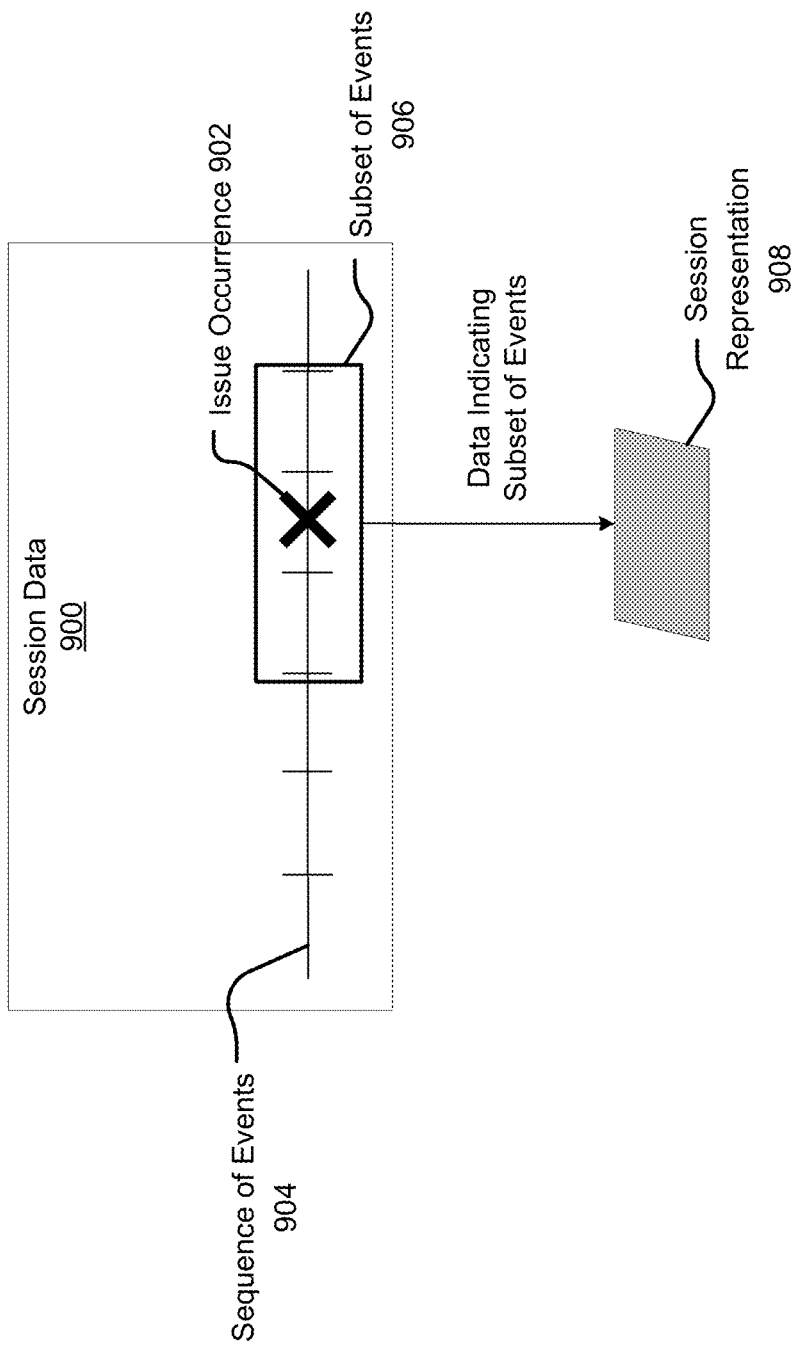
FIG. 9 illustrates the generation of input to a language model, according to some embodiments of the technology described herein.

FIG. 9 illustrates generation of input to a language model using session data 900, according to some embodiments of the technology described herein. In some embodiments, the input generation depicted in FIG. 9 may be used by the session description system 700 described herein with reference to FIG. 7A-FIG. 8. For example, the input generation depicted in FIG. 9 may be used by the description generation module 704 to generate one or more of the inputs 802, 806, 810 described herein with reference to FIG. 8.

As shown in FIG. 9, the session data 900 indicates a sequence of events 904 (e.g., user actions, executed functions, changes in GUI, and/or other events) that occurred in a session of a software application. There is a point 902 at which an issue was determined to occur in the sequence of events 904. For example, the point 902 may be one of a plurality of entries in the session representation 900 that is associated with occurrence of the issue. As another example, the point 902 may be a time at which the issue occurred in the session.

As shown in FIG. 9, the system may identify a subset of events 906 to include in a session representation 908, which may be provided as input to the language model. In some embodiments, the system may identify events to include in the subset of events 906 by: (1) identifying events indicative of user activity; and (2) including events indicative of user activity in the subset of events 906. For example, user actions may include navigation actions of the user in the session, what a user interacted with in a GUI (e.g., by clicking and/or touching), what a user viewed in a GUI, and/or other user actions.

In some embodiments, the system may identify the subset of events 906 by identifying which of the sequence of events 904 indicates a user's reaction to occurrence of an issue in the session. The system may identify one or more of the sequence of events 904 that occurred in response to occurrence of an issue. For example, the system may identify the point 902 at which the issue occurred and identify a set of user actions in the sequence of events 904 that occurred after the point 902 at which the issue occurred.

In some embodiments, the system may identify the subset of events 906 by determining which of the sequence of events 904 is within a time interval including the issue occurrence 902. The system may identify the subset of events 906 as a time window that includes events in the time interval. For example, the system may use those events that occurred in a time period (e.g., 1 second, 5 seconds, 10 seconds, 30 seconds, 1 minute, 2 minutes, 5 minutes, 10 minutes, or another time period) after the occurrence of the issue 902 to include in the subset of events 906. As another example, the system may identify events that occurred in a time period (e.g., 1 second, 5 seconds, 10 seconds, 30 seconds, 1 minute, 2 minutes, 5 minutes, 10 minutes, or another time period) prior to the occurrence of the issue 902 to include in the subset of events 906. In some embodiments, the system may identify a number of events in the session representation 900 before and/or after the occurrence of the issue 902 to include in the subset of events 906. For example, the system may identify 10-20, 20-30, 30-40, 40-50, 50-60, 60-70, 70-80, 80-90, or 90-100 events before and/or after occurrence of the issue 902 to include in the subset of events 906, and include the identified events in the window of events 906 included in the input 908.

In some embodiments, the system may use the subset of events 906 to generate the session representation 908. In some embodiments, the system may include data indicating the subset of events 906 in the session representation 908. For example, the system may include, in the session representation 908, entries from the session data 900 that are in the subset of events. The system may include data indicating the subset of events 906 in the session representation 908 in conjunction with a request for the language model. For example, the data indicating the subset of events 906 may include a textual transcription indicating the subset of events 906, images of the subset of events 906 (e.g., obtained from replicating the session in a replay GUI), and/or video of the subset of events 906 (e.g., captured from replicating the session in a replay GUI).

Figure 10:
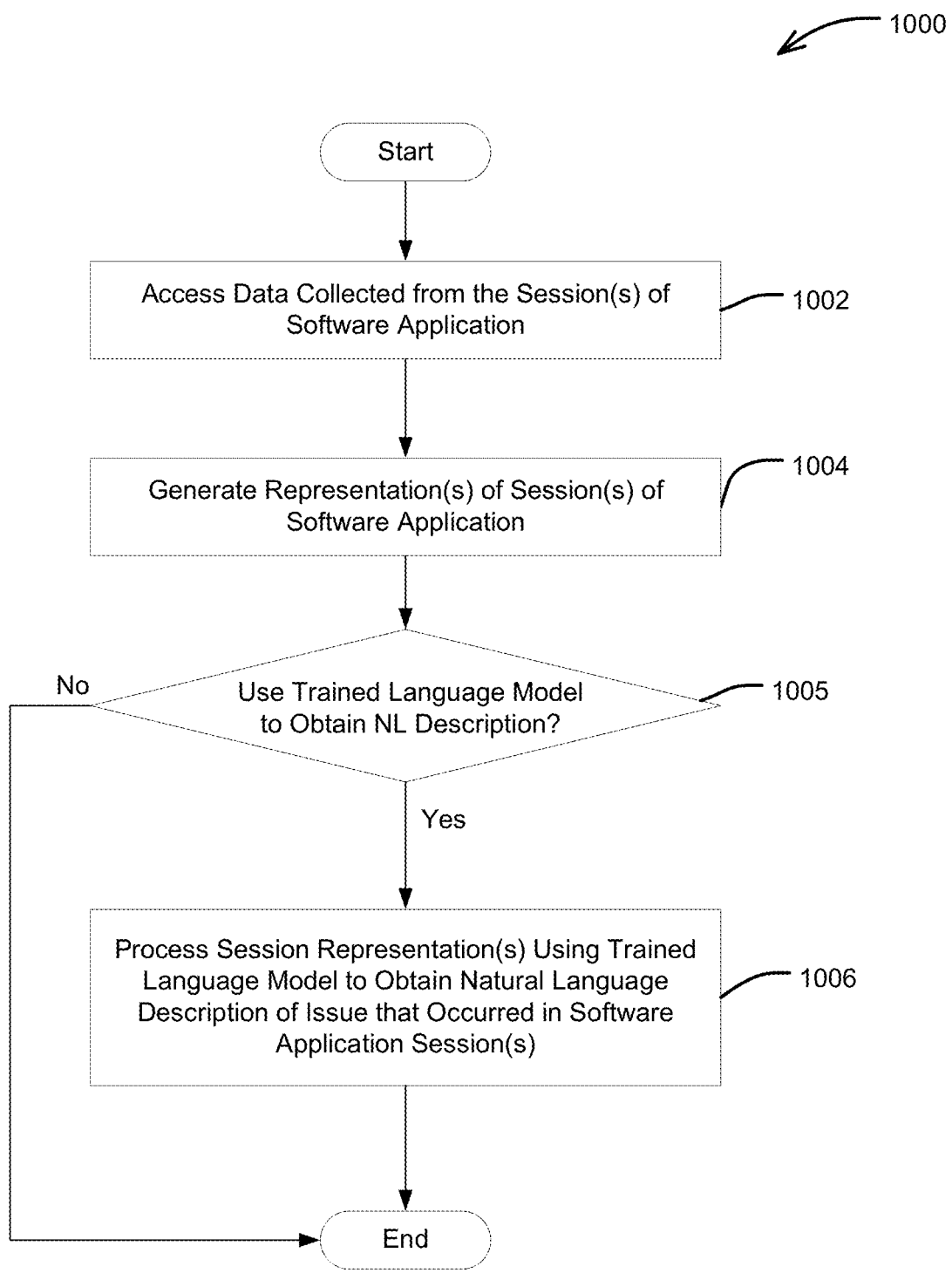
FIG. 10 is an example process for generating a natural language description of an issue that occurred in one or more sessions of a software application, according to some embodiments of the technology described herein.

FIG. 10 is an example process 1000 for generating a natural language description of an issue that occurred in one or more sessions of a software application, according to some embodiments of the technology described herein. In some embodiments, process 1000 may be performed by the session description system 700 described herein with reference to FIGS. 7A-7C.

Process 1000 begins at block 1002, where the system accesses data collected during the session(s) of the software application. In some embodiments, the system may access data that was previously collected during a session and stored in a datastore (e.g., a database) storing records associated with respective sessions. Each of the records may store data collected during a respective session. Examples of data that may be collected during a session are described herein. In some embodiments, the system may access data during a session of the software application. The system may access data from a device executing the session of the software application. For example, the system may access data from the device through a communication network (e.g., the Internet) using an Internet browser application.

The software application may be accessed by several different user devices. Data may be collected for each session in which a device is interacting with the software application. In some embodiments, the data may be collected from a device interacting with the software application. In some embodiments, data may be collected using one or more applications of the device separate from the software application. For example, the software application may be a web application and data may be collected from an Internet browser application being used by the device to access the web application. As another example, the software application may be installed on and executing on a user device and data may be collected from the software application. In some embodiments, data may be organized based on sessions during which the data was collected. The system may generate a data record for each session in which data collected during the session is stored.

Next, process 1000 proceeds to block 1004, where the system generates representation(s) of the software application session(s). The system may generate a representation of a given software application session using the data collected during the software application session. The representation may indicate a sequence of events that occurred during the software application session. For example, the system may use the data collected during the software application session to generate a sequence of textual entries, each indicating an event that occurred in the software application session. As another example, the system may include one or more images (e.g., generated using the collected data) in a session representation.

The system may generate a session representation by translating data collected during a session into a sequence of events that occurred in the session. In some embodiments, the system may determine a sequence of events comprising a sequence of user actions (e.g., click/touch interactions, GUI elements/screens viewed by the user, and/or other user actions) that were performed in the session. In some embodiments, the system may order the sequence of events based on an order in which they occurred during the session.

Next, process 1000 proceeds to block 1005, where the system determines whether to process data using the trained language model to obtain a description of the issue that occurred in the session(s). In some embodiments, the system may determine whether to use the trained language model to obtain a natural language description of the issue that occurred in the session(s). The system may determine whether to use the trained language model to obtain the natural language description by determining whether the session(s) meet one or more rules. The system may use the data collected from the session(s) and/or the representation(s) to determine whether the rule(s) are met. For example, the system may determine whether to use the trained language model to obtain the natural language description by determining whether repeated user activity occurred in the session(s) proximate occurrence of the issue, whether a threshold amount of time elapsed in the session(s), whether a particular event (e.g., an exception, a network error, or an error-level log message) occurred in the software application in the session(s), and/or whether the representation(s) include a threshold number of entries. In some embodiments, the system may determine whether a threshold number of session(s) meet the rule(s) to determine whether to use the trained language model to obtain the natural language description of the issue. For example, the system may determine whether at least 1, 2, 3, 4, 5, 6, 7, 8, 9, 10, or another suitable number of sessions meets the rule(s).

If at block 1005 the system determines to not use the trained language model to obtain a natural language description of the issue, then process 1000 ends. If at block 1005 the system determines to use the trained language model to obtain a natural language description of the issue, then process 1000 proceeds to block 1006, where the system processes the session representation(s) using a language model to generate a natural language description of an issue that occurred in the session(s). In some embodiments, the system may generate the description of the issue using the language model by: (1) generating one or more inputs to the language model using the session representation(s); and (2) providing the input(s) to the language model to obtain the description of the issue. Example processing that may be performed by the system using the language model to obtain the description is described herein with reference to FIG. 11. In some embodiments, the processing may involve querying the language model with a series of inputs to obtain corresponding output responses from the language model. The system may process outputs from the language model to determine whether to generate a subsequent input, and to generate the input. An example such series of inputs and output responses is described herein with reference to FIG. 8.

In some embodiments, the system may be configured to process the session representation(s) using the language model to generate the natural language description by guiding the language model to provide a desired output with a sequence of multiple inputs. The system may generate a first input requesting a first output, then generate a second input requesting a second output where the second input includes the first output. The language model may provide an improved output when guided by multiple steps. As an illustrative example, the system may guide the language model to output a concise description of an issue that occurred in the session(s) using multiple inputs. The system may provide a first input to the language model along with data from the session representation(s) requesting a description of the issue in a few sentences (e.g., 3-5 sentences). The system may receive a first output in response to the first input that describes the issue. The system may provide a second input to the language model requesting a concise description of the issue. The system may include the first output in the second input. The system may receive, in response to providing the second input, a second output including a concise description of the issue. As an illustrative example, the system may provide the language model with a first input requesting a description of the issue in at most a few sentences and receive the following output "The user is trying to access a specific page, but encounters an error message stating that a metric could not be loaded. They click on the error message, which takes them back to the same page. They then see a form asking for their email address, last name, and first name. After that, they see a message saying "Please Wait" and the number "1". They encounter the same error message again and navigate to a different page where they click on the "Metrics" option.". The system may provide a second input requesting a concise description of the issue and receive the following response: "Users are encountering an issue with loading specific metrics."

Figure 13:
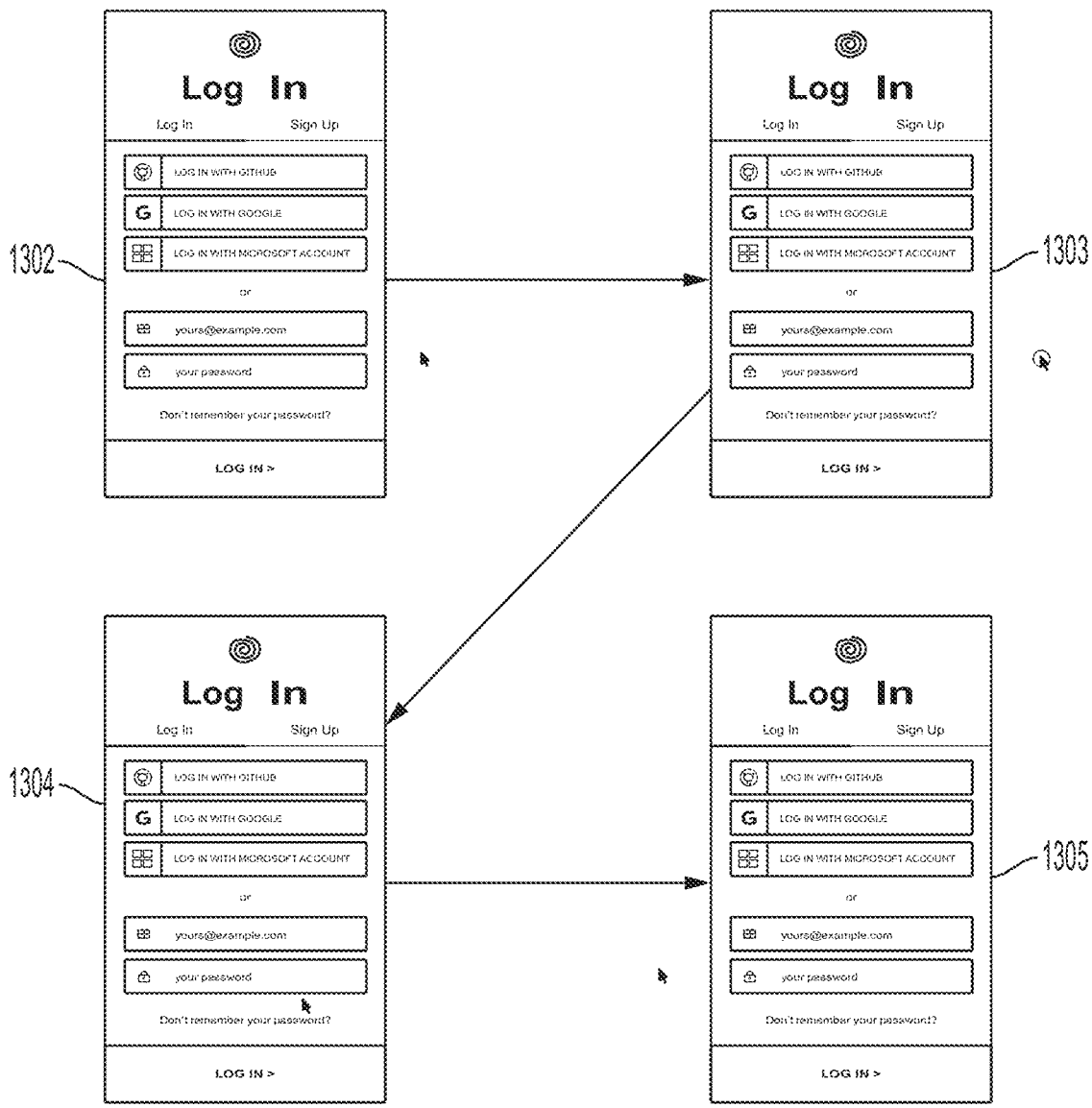
FIG. 13 is an illustrative example of GUI images that the system processes and does not detect an issue, according to some embodiments of the technology described herein.

As another example, reference is made to FIG. 13. FIG. 13 is an illustrative example of GUI images that the system processes and determines that there is no evidence of a technical issue. GUIs 1302-1305 together illustrate a time lapse of GUIs of a given session representation. GUI 1302 is an image of the GUI displayed to the user at a first time in the user session. GUI 1303 is an image of the GUI displayed to the user at a second time in the user session. GUI 1304 is an image of the GUI displayed to the user at a third time in the user session. GUI 1305 is an image of the GUI displayed to the user at a fourth time in the user session. As shown in FIG. 13, and as discussed below, in this example each of GUIs 1302-1305 lacks evidence of a technical issue.

The first input by the system to the language model requests a determination of whether a technical issue appears by inputting "Does evidence of a technical issue appear in this user session?".

The first output received by the system, in this illustrative example, indicates that no technical issue was detected by stating "No, there is no evidence of a technical issue in this user session."

Figure 14A:
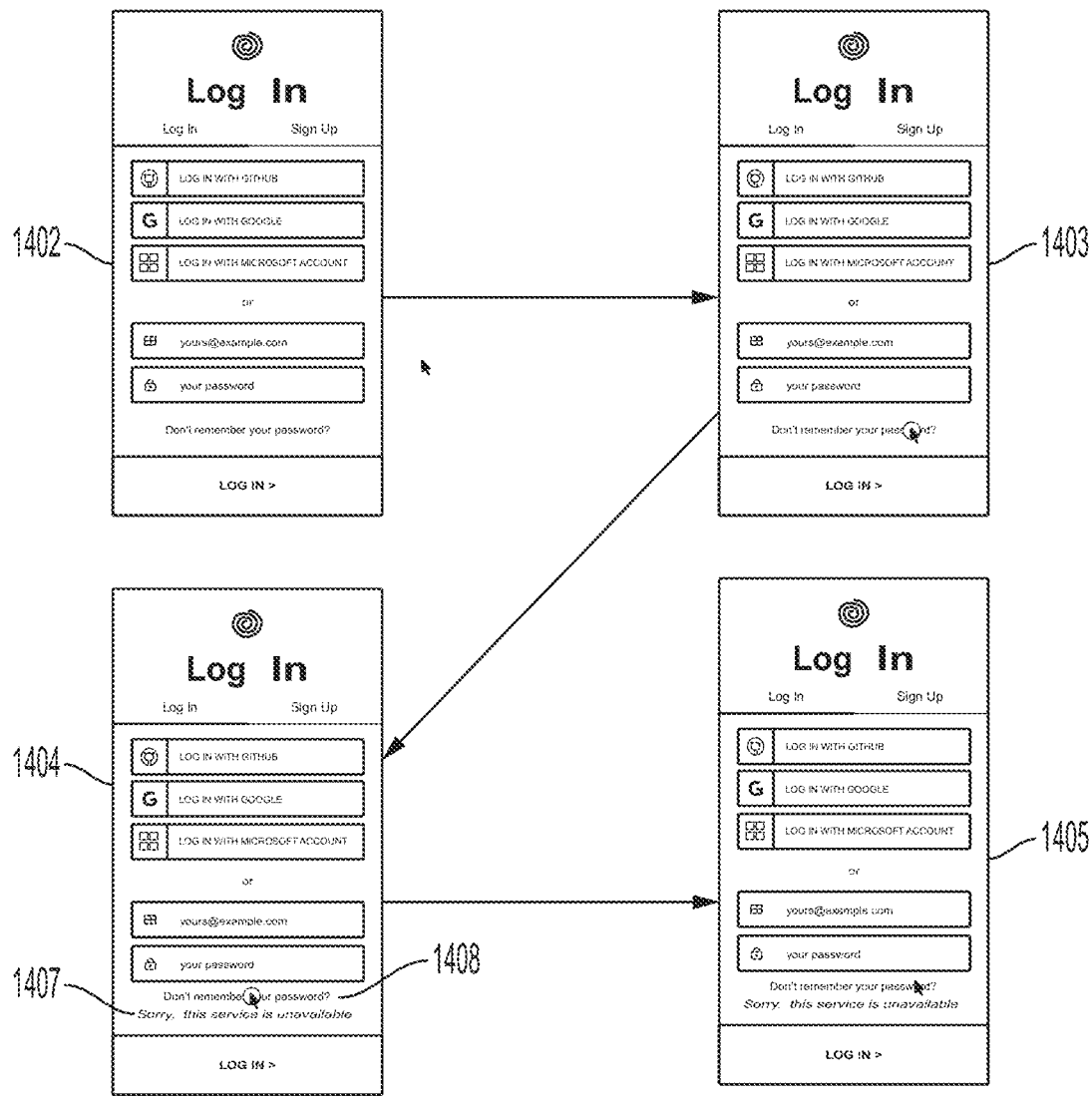
FIGS. 14A-14C illustrate GUI images that are processed and result in a repeated detection of the same technical issue in two distinct user sessions, according to some embodiments of the technology described herein.
Figure 14B:
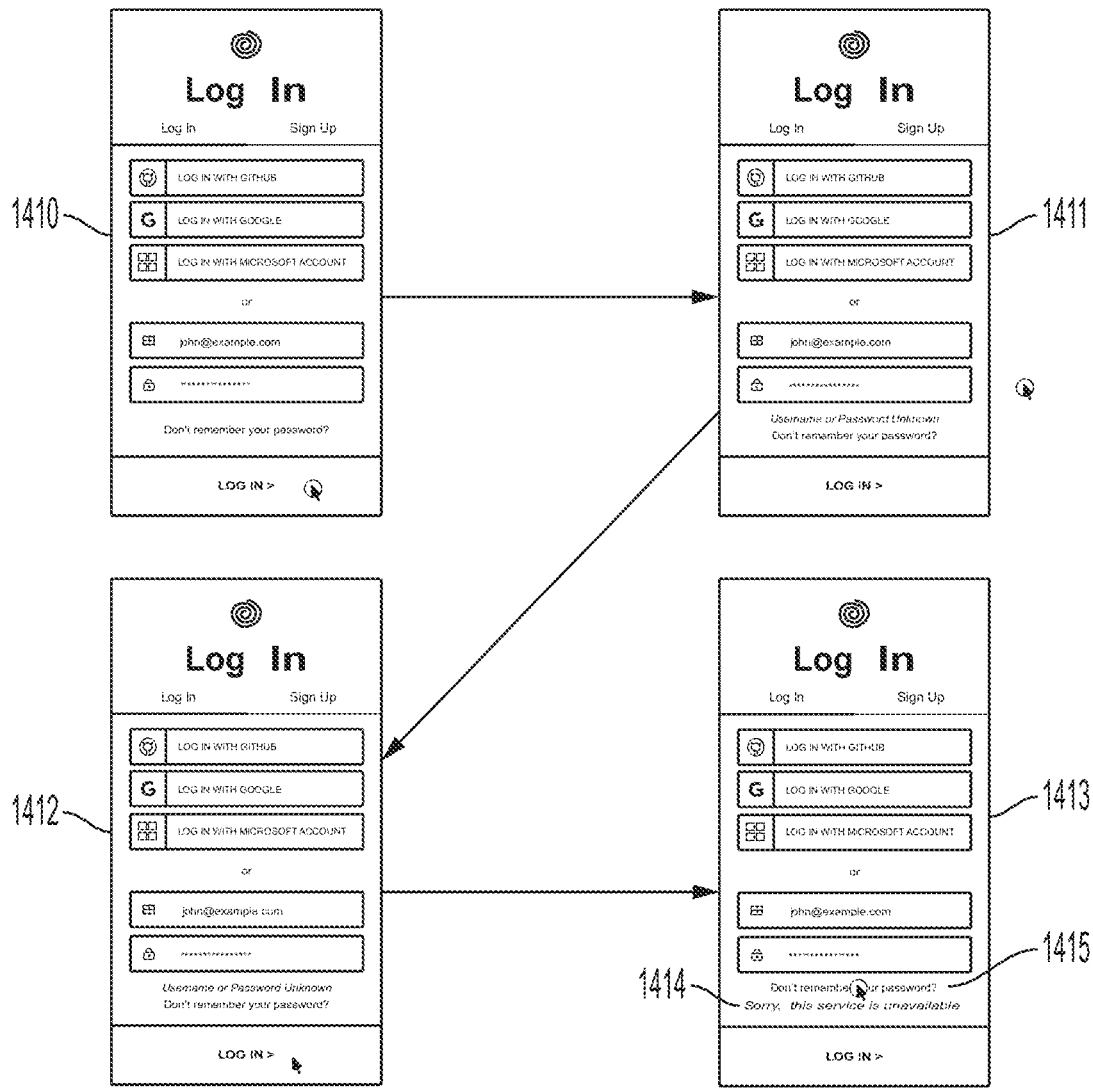
Figure 14C:
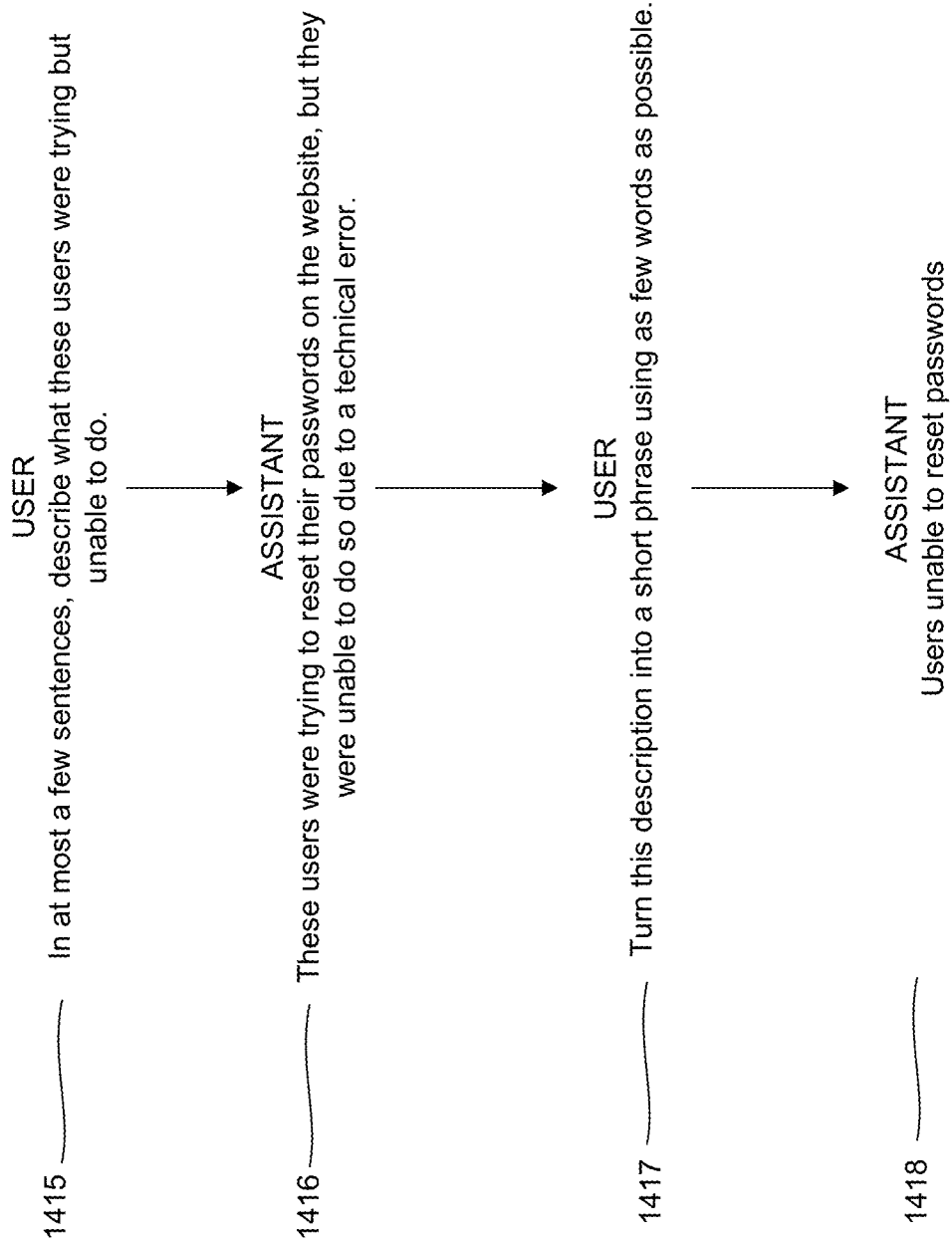

As a further illustrative example, reference is made to FIGS. 14A-14C. FIGS. 14A-14C illustrate GUI images for which the system makes a repeated detection of the same technical issue in two distinct user sessions. FIG. 14A illustrates the GUI images of a first user session in which the system detects a technical issue. The first input provided by the system to the language model requests a determination of whether a technical issue appears in the first user session by asking "Does evidence of a technical issue appear in this user session?". GUIs 1402-1405 together illustrate a time lapse of the given first user session. GUI 1402 is an image of the GUI displayed to the user at a first time in the first user session. GUI 1403 is an image of the GUI displayed to the user at a second time in the first user session. GUI 1404 is an image of the GUI displayed to the user at a third time in the first user session. GUI 1405 is an image of the GUI displayed to the user at a fourth time in the first user session. As illustrated in FIG. 14A, GUIs 1404 and 1405 include evidence of a technical issue in the given first user session. The evidence of the technical issue is in the form of error message 1407, which reads "Sorry, this service is unavailable" when the user tries to click on executable text 1408, which is labeled "Don't remember your password?".

First output received by the system from the large language model indicates the determination of evidence of a technical issue in GUIs 1404 and 1405 of the given first user session, which states "Yes, there is evidence of a technical issue in this user session. The user encounters an error message 'Sorry, this service is unavailable' when trying to click on 'Don't remember your password?' This suggests that there is a problem with the password reset process on the website." Thus, since a technical issue is detected, the first output includes a statement that there is evidence of a technical issue in the given first user session. First output further includes a description of the evidence of the technical issue. This description is in the form of a statement that the user encounters an error message "Sorry, this service is unavailable" when trying to click on "Don't remember your password?". First output further includes an inference about the general nature of the detected technical issue. This inference is in the form of a statement that the evidence suggests that there is a problem with the password reset process on the website.

FIG. 14B illustrates GUI images of a second user session for which the system detects a technical issue. In particular, and as explained below, the technical issue detected by the system using the GUI images from the second user session in FIG. 14B is the same as the technical issue detected by the system in the first user session in FIG. 14A.

Second input provided by the system to the language model requests a determination of whether the same technical issue that appeared in the first user session (illustrated in FIG. 14A) also appears in the second user session by asking "Does evidence of the same technical issue also appear in this user session?". GUIs 1410-1413 together illustrate a time lapse of the given second user session. For example, GUI 1410 is an image of the GUI displayed to the user at a first time in the second user session. GUI 1411 is an image of the GUI displayed to the user at a second time in the second user session. GUI 1412 is an image of the GUI displayed to the user at a third time in the second user session. GUI 1413 is an image of the GUI displayed to the user at a fourth time in the second user session.

As illustrated in FIG. 14B, GUI 1413 includes evidence of a technical issue in the given second user session. The evidence of the technical issue is in the form of error message 1414, which reads "Sorry, this service is unavailable" when the user tries to click on the executable text 1415, which is labeled "Don't remember your password?". A comparison of FIG. 14A and FIG. 14B shows that the evidence of the technical issue illustrated in GUI 1413 of FIG. 14B is the same as to the evidence of the technical issue illustrated in GUIs 1404 and 1405 of FIG. 14A.

Second output received by the system indicates the determination that the same technical issue that appeared in the first user session (illustrated in FIG. 14A) also appears in the given second user session by stating "Yes, the same technical issue appears in this user session. The user first tries logging in with their email and password, but the website does not accept it. The user tries to reset their password but encounters the same error message 'Sorry, this service is unavailable' when trying to click on 'Don't remember your password?' This suggests that the password reset function on the website is not working for this user either." As explained above, in this illustrative example, the evidence of the technical issue in GUI 1413 of the given second user session is the same as the evidence of the technical issue that appeared in GUIs 1404 and 1405 of the first user session. Therefore, the same technical issue that was detected in the first user session is also detected in the given second user session, so the second output includes a statement that the same technical issue appears in the given second user session. Second output further includes a description of the evidence of the same technical issue. This description is in the form of two statements. The first statement is that the user first tries logging in with their email and password, but the website does not accept it. The second statement is that the user tries to reset their password but encounters the same error message "Sorry, this service is unavailable" when trying to click on "Don't remember you password?". Second output further includes an inference about the general nature of the detected same technical issue. This inference is in the form of a statement that the evidence suggests that there is a problem with the password reset process on the website for the user of the given second session, as well as for the user of the first user session.

FIG. 14C illustrates a number of inputs and outputs which may be given and received by the system following a repeated detection of the same technical issue in two distinct user sessions, as illustrated in FIGS. 14A and 14B. Third input 1415 provided by the system to the language model requests a description of what the users of both user sessions were trying but unable to do by asking "In at most a few sentences, describe what these users were trying but unable to do." Thus, third input 1415 further requests that the requested description be at most a few sentences in length.

Third output 1416 is received by the system and includes a description of what the users of both user sessions were trying but unable to do by stating "These users were trying to reset their passwords on the website, but they were unable to do so due to a technical error." As illustrated in FIG. 14B, third output 1416 is no more than a few sentences long, and thus complies with the request provided in third input 1415.

Fourth input 1417 provided by the system to the language model requests that the language model turn the description included in third output 1416 into a short phrase using as few words as possible by inputting "Turn this description into a short phrase using as few words as possible."

Fourth output 1418 received by the system includes a short phrase that corresponds to the description included in third output 1416. This short phrase includes "Users unable to reset passwords." It should be appreciated from a comparison of fourth input 1417 and fourth output 1418 that fourth output 1418 complies with the request provided in fourth input 1417.

Figure 11:
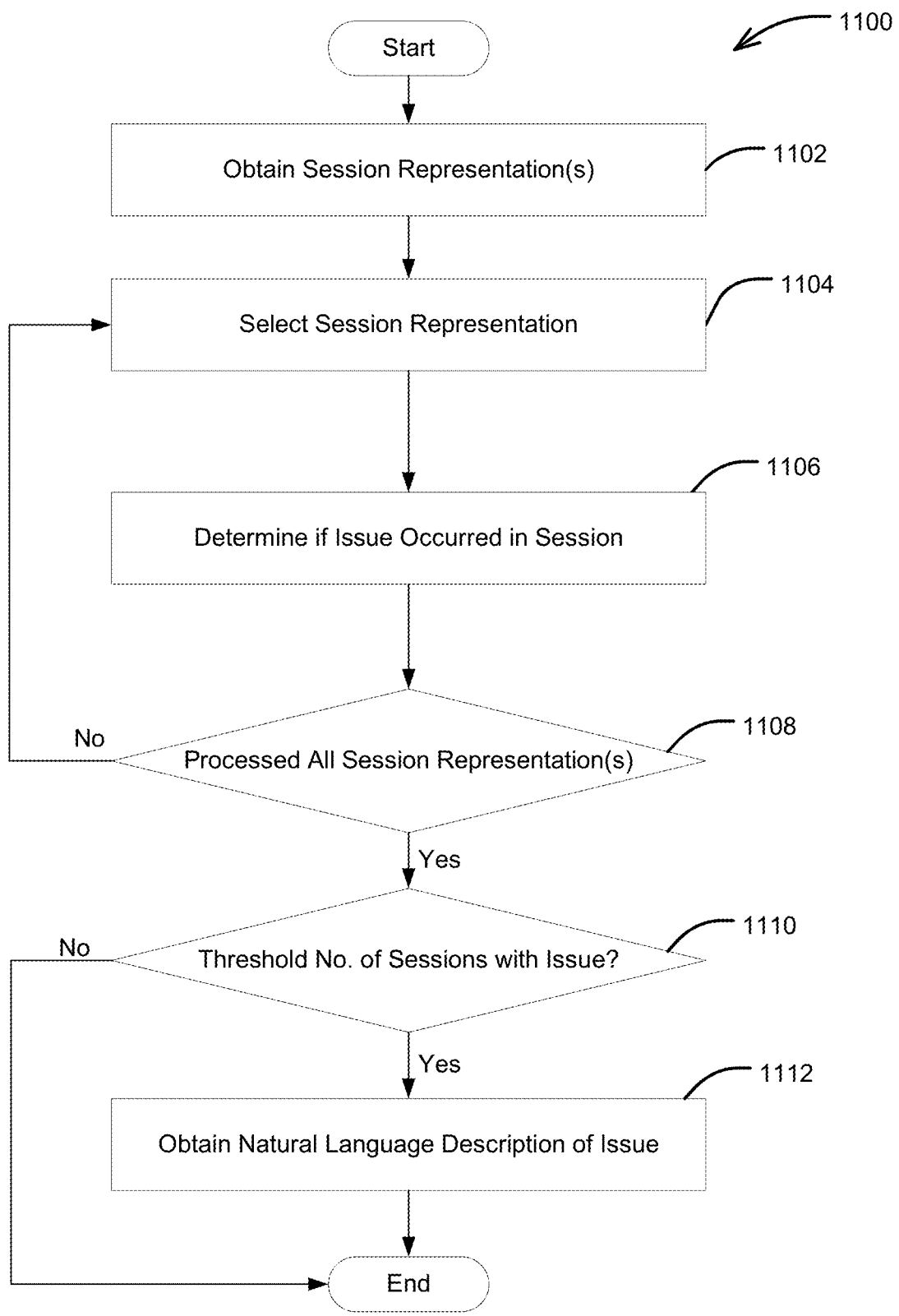
FIG. 11 is an example process for processing session representation(s) using a language model to obtain a natural language description of an issue that occurred in session(s) of a software application, according to some embodiments of the technology described herein.

FIG. 11 is an example process 1100 for processing session representation(s) using a language model to obtain a natural language description of an issue that occurred in session(s) of a software application, according to some embodiments of the technology described herein. Process 1100 may be performed by session description system 700 described herein with reference to FIGS. 7A-7C. In some embodiments, process 1100 may be performed at block 1006 of process 1000 described herein with reference to FIG. 10.

Process 1100 begins at block 1102, where the system obtains representation(s) of one or more sessions of a software application (e.g., generated using data collected during the session(s)). Example techniques for generating a session representation are described herein. In some embodiments, the system may obtain session representation(s) associated with sessions in which occurrence of an issue was detected (e.g., using issue detection system 200 described herein with reference to FIG. 2). In some embodiments, the system may obtain session representation(s) associated with a set of one or more sessions that had the occurrence of an issue that was classified into a particular impact level (e.g., high impact level). The issue classifications may be obtained, for example, by performing blocks 602-606B of process 600 described herein with reference to FIG. 6.

In some embodiments, the system may obtain a particular number of representations of sessions in which a particular issue was detected. The system may obtain 1, 2, 3, 4, 5, 6, 7, 8, 9, or 10 session representations. For example, the system may obtain 3 session representations associated with a set of 3 sessions in which the issue occurred.

Next, process 1100 proceeds to block 1104, where the system selects one of the obtained session representation(s). In some embodiments, the system may randomly select the session representation. In some embodiments, the system may select a session representation based on one or more criteria. For example, the system may select the session representation associated with the earliest session.

Next, process 1100 proceeds to block 1106, where the system determines whether an issue occurred in the session associated with the session representation. The system may use the selected session representation to generate input to the language model requesting whether an issue occurred in the session (e.g., as described herein with reference to block 802 of FIG. 8). The system may provide the input to the language model 712 to obtain an output (e.g., output 804) indicating whether an issue occurred. The system may process the output obtained from the language model to determine whether an issue occurred (e.g., as described with reference to block 806). If the system determines that no issue occurred, then process 1100 ends.

In some embodiments, the system determines whether the issue that occurred is the same as an issue that was determined to occur by the language model in another session for which processing has previously been performed. The system may not determine whether the issue is the same as one that occurred in another session if the selected session representation is the first one of a set of obtained session representations or if no issues were detected from previously processed session representations.

The system may determine whether the issue that was determined to occur in the session is the same one as in a previous session by generating an input to the language model (e.g., input 806) requesting whether the issue is the same as one that was determined to occur in a previous session. The system may receive output (e.g., output 808) indicating whether the issue was the same one as in the previous session. The system may process the output to determine whether the issue is the same as one in the previous session.

Next, process 1100 proceeds to block 1108, where the system determines whether all the session representation(s) have been processed. If it is determined that all the session representation(s) have been processed, then process 1100 proceeds to block 1110. Otherwise, process 1100 proceeds back to block 1104, where the system selects another session representation for processing.

At block 1110, the system determines whether the issue has occurred in a threshold number of sessions. The threshold number of sessions may be 1, 2, 3, 4, 5, 6, 7, 8, 9, 10, or other number of sessions. For example, the threshold number of sessions may be 2 sessions. In some embodiments, the system may determine whether the same issue has occurred in the threshold number of sessions. In some embodiments, the threshold number of sessions may be the number of sessions obtained at block 1102.

If at block 1110 the system has not identified the threshold number of sessions in which the issue occurred, then process 1100 ends and no description of the issue is obtained. If at block 1110 the system has identified the threshold number of issues in which the issue occurred, then process 1100 proceeds to block 1112 where the system obtains a natural language description of the issue. In some embodiments, the system may obtain the natural language description of the issue by generating input requesting a description of the issue. The system may provide the input to the language model to obtain output that includes a natural language description of the issue. In some embodiments, the system may further obtain a more concise version of the description. The system may provide input to the language model requesting a more concise version of a previously obtained description (e.g., to use as a title in a presentation interface).

Figure 12:
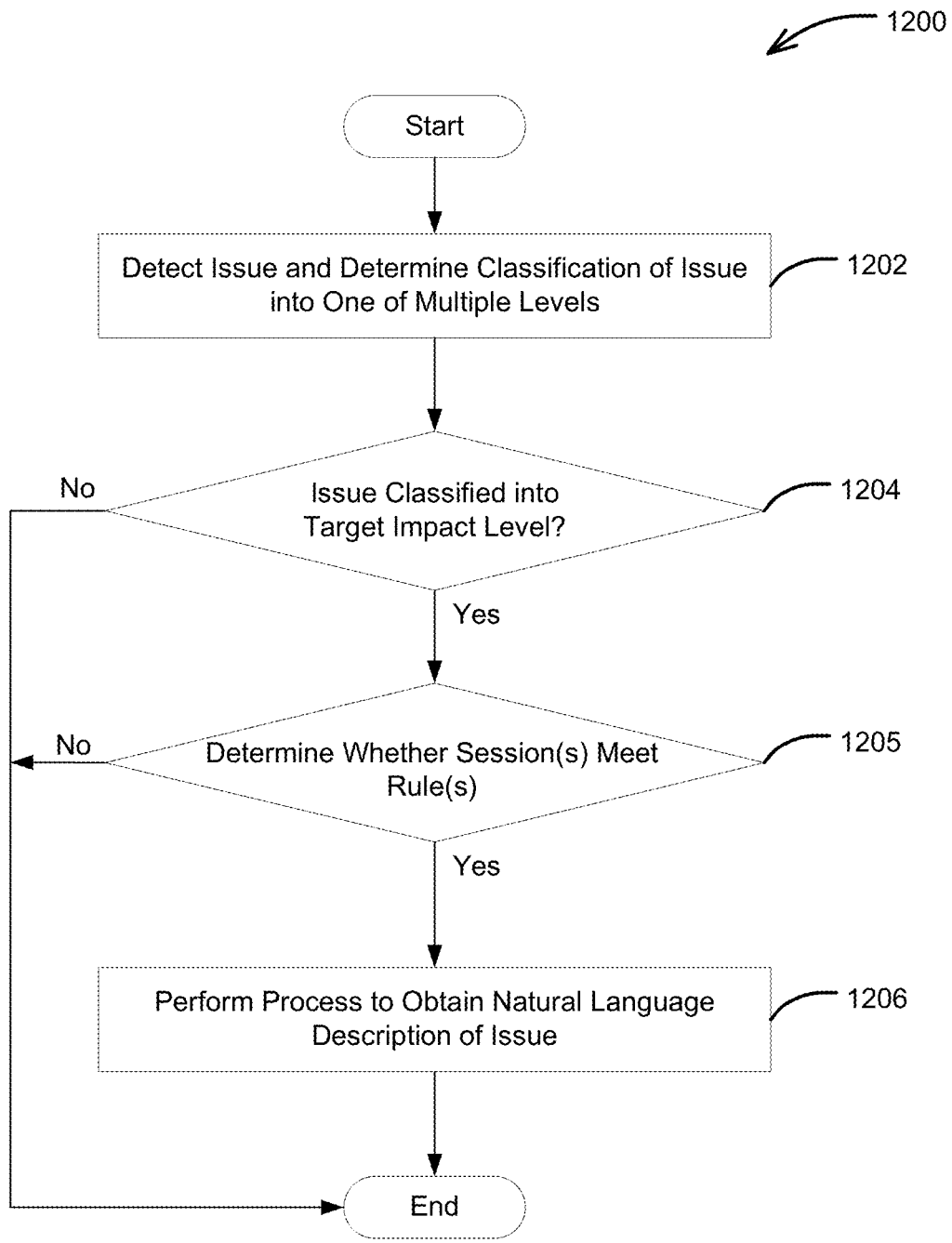
FIG. 12 is an example process for determining whether to obtain a natural language description of an issue, according to some embodiments of the technology described herein.

FIG. 12 is an example process 1200 for determining whether to obtain a natural language description of an issue, according to some embodiments of the technology described herein. In some embodiments, process 1200 may be performed by session description system 700 described herein with reference to FIGS. 7A-7C. In some embodiments, the process 1200 may be performed using the issue detection system 200 described herein with reference to FIG. 2 (which may also be a component of the session description system 700).

Process 1200 begins at block 1202, where the system detects occurrence of an issue in one or more sessions of a software application and determines a classification of the issue into one of multiple impact levels (e.g., as low impact or high impact). The system may detect and classify the issue by performing steps at blocks 602-604 and 606A-606B of process 600 described herein with reference to FIG. 6.

Next, process 1200 proceeds to block 1204, where the system determines whether the issue is classified into a target impact level (e.g., high impact). In some embodiments, the system may determine whether the issue is classified into the target impact level by determining whether the classification determined at block 1202 matches the target impact level. For example, the system may determine whether an impact level field in a data record associated with the issue stores a value that matches a value associated with the target impact level. If at block 1204 the system determines that the issue is not classified into the target impact level, then process 1200 ends. The system bypasses performance of a process to obtain a natural language description of the issue.

If at block 1204 the system determines that the issue is classified into the target impact level, then process 1200 proceeds to block 1205, where the system determines whether the session(s) meet one or more rules using data collected from the session(s). For example, the rule(s) may include one or more of the following rules:

ooo. That a session includes repeated user activity proximate occurrence of the issue in the session.
ppp. That a representation of the session includes more than a threshold numb of entries.
qqq. That a representation of the session includes less than a threshold number of entries.
rrr. That a session includes a particular type of event (e.g., an exception, a network error, or other particular type of event) proximate occurrence of the issue in the session (e.g., within a time period before and/or after occurrence of the issue).
sss. That a threshold number of the session(s) meet one, some, or all of the rule(s).

If at block 1205 the system determines that the session(s) meet the rule(s), then process 1200 proceeds to block 1206, where the system performs a process to obtain a natural language description of the issue. For example, the system may perform process 1000 described herein with reference to FIG. 10 and/or process 1100 described herein with reference to FIG. 11. If at block 1205 the system determines that the session(s) do not meet the rule(s), then process 1200 ends. The system bypasses performance of a process to obtain a natural language description of the issue.

Figure 15:
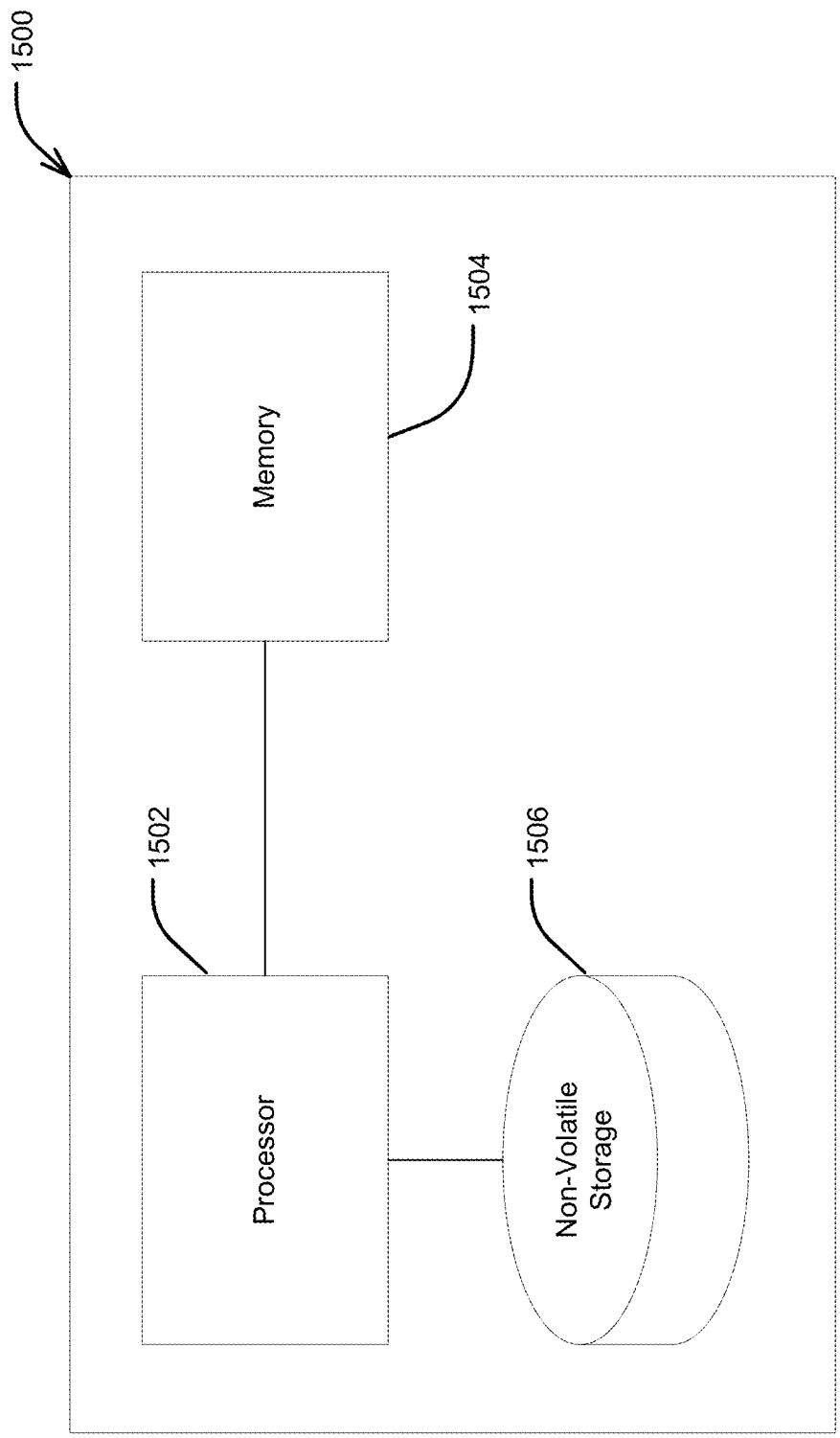
FIG. 15 is a block diagram of an illustrative computing system that may be used in implementing some embodiments of the technology described herein.

FIG. 15 is an example computer system 1500 which may be used to implement some embodiments of the technology described herein. The computing system 1500 may include one or more computer hardware processors 1502 and non-transitory computer-readable storage media (e.g., memory 1504 and one or more non-volatile storage devices 1506). The processor(s) 1502 may control writing data to and reading data from (1) the memory 1504; and (2) the non-volatile storage device(s) 1506. To perform any of the functionality described herein, the processor(s) 1502 may execute one or more processor-executable instructions stored in one or more non-transitory computer-readable storage media (e.g., the memory 1504), which may serve as non-transitory computer-readable storage media storing processor-executable instructions for execution by the processor(s) 1502.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. As used herein, the term "computer-readable storage medium" encompasses only a non-transitory computer-readable medium that can be considered to be a manufacture (i.e., article of manufacture) or a machine. Alternatively or additionally, aspects of the technology described herein may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion amongst a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIG. 6. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by an "actor" or a "user." It should be appreciated that an "actor" or a "user" need not be a single individual, and that in some embodiments, actions attributable to an "actor" or a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various aspects are described in this disclosure, which include, but are not limited to, the following aspects:

1. A system for automatically generating natural language descriptions of issues that occur during interactions of users with a software application, the system comprising: a processor; and a non-transitory computer-readable storage medium storing instructions that, when executed by the processor, cause the processor to: access data collected during at least one software application session in which at least one user was interacting with the software application and in which an issue occurred; generate, using the data collected during the at least one software application session, at least one representation of the at least one software application session, wherein the at least one representation of the at least one software application session indicates a sequence of events that occurred in the at least one software application session; and process the at least one representation of the at least one software application session using the trained language model to obtain the natural language description of the issue that occurred in the at least one software application session.

2. The system of aspect 1, wherein the language model is a large language model.

3. The system of any of aspects 1-2, wherein the language model comprises a transformer model.

4. The system of any of aspects 1-3, wherein processing the at least one representation of the at least one software application session using the trained language model to obtain the natural language description of the issue that occurred in the at least one software application session comprises: process the at least one representation of the at least one software application session using the trained language model to obtain at least one output indicating whether any issue occurred in the at least one software application session; when the at least one output indicates that the issue occurred in the at least one software application session: process the at least one representation of the at least one software application session using the trained language model to obtain the natural language description of the issue that occurred in the at least one software application session.

5. The system of aspect 4, wherein processing the at least one representation of the at least one software application session using the trained language model to obtain the at least one output indicating whether any issue occurred in the at least one software application session comprises: generating input comprising a portion of the at least one representation of the at least one software application session and a query for whether any issue occurred in the at least one software application session; and providing the input to the trained language model to obtain the at least one output indicating whether any issue occurred in the at least one software application session.

6. The system of any of aspects 1-5, wherein the instructions further cause the processor to: determine, using the data collected during the at least one software application session, whether the at least one software application session meets one or more rules; and process the at least one representation of the at least one software application session using the trained language model to obtain the natural language description of the issue that occurred in the at least one software application session when it is determined that the at least one software application session meets the one or more rules.

7. The system of aspect 6, wherein determining, using the data collected during the at least one software application session, whether the at least one software application session meets the one or more rules comprises: determine whether repeated user activity occurred proximate occurrence of the issue in the at least one software application session.

8. The system of aspect 6, wherein determining, using the data collected during the at least one software application session, whether the at least one software application session meets the one or more rules comprises: determine whether the at least one representation includes a threshold number of entries.

9. The system of aspect 6, wherein determining, using the data collected during the at least one software application session, whether the at least one software application session meets the one or more rules comprises: determine whether a particular error occurred in the software application during the at least one software application session.

10. The system of any of aspects 1-9, wherein: the at least one software application session comprises a plurality of software application sessions; the at least one representation of the at least one software application session comprises a plurality of representations of the plurality of software application sessions; and processing the at least one representation of the at least one software application session using the trained language model to obtain the natural language description of the issue that occurred in the at least one software application session comprises: process the plurality of session representations using the language model to determine whether the issue occurred in at least a threshold number of the plurality of software application sessions; and when it is determined that the issue occurred in at least the threshold number of the plurality of software application sessions: provide input to the language model requesting the natural language description of the issue.

11. The system of aspect 10, wherein the threshold number of software application sessions is 3 software application sessions.

12. The system of aspect 10, wherein processing the plurality of session representations using the language model to determine whether the issue occurred in at least a threshold number of the plurality of software application sessions comprises: process a first one of the plurality of representations using the trained language model to obtain a first output indicating that an issue occurred in a first one of the plurality of software application sessions; process a second one of the plurality of representations using the trained language model to obtain a second output indicating whether the issue that occurred in the first software application session occurred in a second one of the plurality of software application sessions; and determine whether the issue occurred in the threshold number of the plurality of software application sessions based at least in part on the first and second output.

13. The system of any of aspects 1-12, wherein processing the at least one representation of the at least one software application session using the trained language model to obtain the natural language description of the issue that occurred in the at least one software application session comprises: identify a portion of the at least one representation of the at least one software application session; generate input for the trained language model that includes the identified portion of the at least one representation of the at least one software application session; and provide the input to the trained language model to obtain the natural language description of the issue that occurred in the at least one software application session.

14. The system of aspect 13, wherein identifying the portion of the at least one representation of the at least one software application session comprises: identify a portion of the at least one representation of the at least one software application session corresponding to a reaction of the at least one user to occurrence of the issue.

15. The system of any of aspects 1-14, wherein generating, using the data collected during the at least one software application session, the at least one representation of the at least one software application session comprises: generating, for the at least one software application session, at least one textual transcription of the sequence of events that occurred in the at least one software application session.

16. The system of any of aspects 1-15, wherein generating, using the data collected during the at least one software application session, the at least one representation of the at least one software application session comprises: generating, for the at least one software application session, at least one image and/or video indicating the sequence of events that occurred in the at least one software application session.

17. The system of any of aspects 1-16, wherein the instructions further cause the processor to: detect occurrence of the issue in the at least one software application session; and determine a classification of the issue into one of a plurality of impact levels using the data collected during the at least one software application session; wherein processing the at least one representation of the at least one software application session using the trained language model comprises performing the processing when the issue is classified into a first impact level of the plurality of impact levels.

18. The system of aspect 17, wherein determining the classification of the issue into one of the plurality of impact levels using the data collected during the at least one software application session comprises: generating a set of feature values associated with the issue using the data collected during the at least one software application session; providing the set of feature values associated with the issue as input to a trained machine learning model to obtain output indicating the classification of the issue into the first impact level.

19. The system of aspect 17, wherein determining the classification of the issue into one of the plurality of impact levels using the data collected during the at least one software application session comprises: determining values of one or more parameters indicating reaction of one or more users in one or more respective GUIs of the software application in response to occurrence of the issue; and determining the classification of the issue into one of the plurality of impact levels using the values of the one or more parameters.

20. The system of aspect 19, wherein the one or more parameters include at least one of: density of user activity in the respective GUI of the software application before and/or after occurrence of the issue; change in frequency of user activity in the respective GUI of the software application before and/or after occurrence of the issue; count of mouse moves and/or touch interactions before and/or after occurrence of the issue; count of repeated mouse clicks and/or repeated touch interactions before and/or after occurrence of the issue; area of a convex hull encompassing coordinates of mouse moves, mouse clicks, and/or touch interactions in the respective GUI of the software application before and/or after occurrence of the issue; scrolling distance in the respective GUI of the software application before and/or after occurrence of the issue; and frequency of hypertext markup language (HTML) document object model (DOM) tree changes before and/or after occurrence of the issue.

21. A method for automatically generating natural language descriptions of issues that occur during interactions of users with a software application, the method comprising: using a processor to perform: accessing data collected during at least one software application session in which at least one user was interacting with the software application and in which an issue occurred; generating, using the data collected during the at least one software application session, at least one representation of the at least one software application session, wherein the at least one representation of the at least one software application session indicates a sequence of events that occurred in the at least one software application session; and processing the at least one representation of the at least one software application session using the trained language model to obtain the natural language description of the issue that occurred in the at least one software application session.

22. A non-transitory computer-readable storage medium storing instructions that, when executed by a processor, cause the processor to perform a method for automatically generating natural language descriptions of issues that occur during interactions of users with a software application, the method comprising: accessing data collected during at least one software application session in which at least one user was interacting with the software application and in which an issue occurred; generating, using the data collected during the at least one software application session, at least one representation of the at least one software application session, wherein the at least one representation of the at least one software application session indicates a sequence of events that occurred in the at least one software application session; and processing the at least one representation of the at least one software application session using the trained language model to obtain the natural language description of the issue that occurred in the at least one software application session.

23. A system for detecting and triaging potential issues that occur during interactions of a plurality of users with a software application, the system comprising: a processor; and a non-transitory computer-readable storage medium storing instructions that, when executed by the processor, cause the processor to: collect, during each of a plurality of sessions in which a user of the plurality of users is interacting with the software application, data from a device being used to interact with the software application; detect occurrences of a plurality of potential issues in at least some of the plurality of sessions; generate, in a graphical user interface (GUI), visual indications of impact levels of the plurality of potential issues, the generating comprising, for each of the plurality of potential issues: obtain data collected during one or more of the plurality of sessions in which the issue occurred; determine a classification of the issue into one of a plurality of impact levels using the data collected during the one or more sessions; and generate, in the GUI, a visual indication of the impact level into which the issue was classified.

24. The system of aspect 23, wherein determining the classification of the issue into one of the plurality of impact levels using the data collected during the one or more sessions comprises: determining values of one or more parameters indicating reaction of one or more users in one or more respective GUIs of the software application in response to occurrence of the issue; and determining the classification of the issue into one of the plurality of impact levels using the values of the one or more parameters.

25. The system of aspect 24, wherein the one or more parameters include at least one of: density of user activity in the respective GUI of the software application before and/or after occurrence of the issue; change in frequency of user activity in the respective GUI of the software application before and/or after occurrence of the issue; count of mouse moves and/or touch interactions before and/or after occurrence of the issue; count of repeated mouse clicks and/or repeated touch interactions before and/or after occurrence of the issue; area of a convex hull encompassing coordinates of mouse moves, mouse clicks, and/or touch interactions in the respective GUI of the software application before and/or after occurrence of the issue; scrolling distance in the respective GUI of the software application before and/or after occurrence of the issue; and frequency of hypertext markup language (HTML) document object model (DOM) tree changes before and/or after occurrence of the issue.

26. The system of any of aspects 23-25, wherein determining the classification of the issue into one of a plurality of impact levels using the data collected during the one or more sessions comprises: determining, for the issue, a plurality of scores corresponding to respective ones of the plurality of impact levels, the plurality of scores including a first score corresponding to a first impact level of the plurality of impact levels; and determining a classification of the issue into the first impact level when the first score is greater than a threshold score.

27. The system of aspect 26, wherein the one or more sessions in which the occurrence of the issue was detected comprise multiple ones of the plurality of sessions and determining the plurality of scores corresponding to respective ones of the plurality of impact levels comprises: determining, for each of the multiple sessions in which the occurrence of the issue was detected, a respective score corresponding to the first impact level to obtain a plurality of scores; and determining the first score corresponding to the first impact level for the issue using the plurality of scores.

28. The system of any of aspects 23-27, wherein the data collected during the one or more sessions comprises information indicating at least one of: HTML DOM tree changes during the one or more sessions; CSS styles and stylesheets; navigation history; client viewport dimensions; a type of device being used to interact with the software application; a type of browser application being used to interact with the software application; user activity within a respective GUI of the software application; network requests and responses generated by the device; exceptions; processor and memory usage of a device being used to interact with the software application; and a status of a network connection of the device being used to interact with the software application.

29. The system of any of aspects 23-28, wherein the plurality of issues comprise of one thousand or more issues and generating, in the GUI, the visual indications of the impact levels of the plurality of potential issues comprises: generating, for a subset of the plurality of issues consisting of 100 or fewer issues, visual indications of a first impact level of the plurality of impact levels.

30. The system of any of aspects 23-29, wherein the plurality of impact levels includes a high impact level and a low impact level.

31. The system of any of aspects 23-30, wherein determining the classification of the issue into the one of the plurality of impact levels comprises: generating at least one set of feature values associated with the issue using the data collected during the one or more sessions in which the occurrence of the issue was detected; providing the at least one set of feature values associated with the issue as input to a trained machine learning model to obtain at least one output; and determining the classification of the issue into the one of the plurality of impact levels using the at least one output.

32. The system of aspect 31, wherein the instructions further cause the processor to: obtain, through the GUI, user input indicating an impact designation for a first issue of the plurality of potential issues; generate a plurality of sets of feature values associated with the first issue using data collected during a plurality of sessions in which the first issue occurred; label each of the plurality of sets of feature values with one of the plurality of impact levels based on the impact designation for the first issue to obtain a plurality of labeled sets of feature values; and train a machine learning model using the plurality of labeled sets of feature values to obtain the trained machine learning model.

33. The system of aspect 31, wherein the data collected during the one or more sessions comprises values of a plurality of parameters, and generating the set of feature values associated with the issue using the data collected during the at least one session comprises: obtaining values of at least some of the plurality of parameters; and generating the feature values using the values of the at least some parameters.

34. The system of aspect 31, wherein the set of feature values comprises values of one or more parameters indicating user activity in a respective GUI of the software application in a period of time before and/or after occurrence of the issue.

35. The system of aspect 31, wherein the plurality of potential issues includes a first issue classified into a first impact level of the plurality of impact levels, and the instructions further cause the processor to: receive, through the GUI, user input indicating a classification of the first issue into a second one of the plurality of impact levels; assign the second impact level as a label for one or more sets of feature values associated with the first issue; and retrain the trained machine learning model using the one or more sets of feature values assigned the second impact level as the label.

36. The system of any of aspects 23-35, wherein the plurality of impact levels includes a first impact level; and the instructions further cause the processor to: identify, using impact level classifications determined for the plurality of potential issues, one or more issues classified into the first impact level; and transmit, to a computing device, an alert for the one or more issues classified into the first impact level.

37. The system of any of aspects 23-36, wherein the plurality of impact levels includes a first impact level; and the instructions further cause the processor to: identify, using impact level classifications determined for the plurality of potential issues, one or more issues classified into the first impact level; and generate, in the GUI, a listing of the one or more issues classified into the first impact level.

38. The system of any of aspects 23-37, wherein the instructions further cause the processor to: generate, using data collected during at least one of the at least some sessions, at least one representation of the at least one session, wherein the at least one representation of the at least one session indicates a sequence of events that occurred in the at least one session; and process the at least one representation of the at least one session using a trained language model to obtain a natural language description of at least one issue that occurred in the at least one session.

39. A method for detecting and triaging potential issues that occur during interactions of a plurality of users with a software application, the method comprising: using a processor to perform: collecting, during each of a plurality of sessions in which a user of the plurality of users is interacting with the software application, data from a device being used to interact with the software application; detecting occurrences of a plurality of potential issues in at least some of the plurality of sessions; generating, in a graphical user interface (GUI), visual indications of impact levels of the plurality of potential issues, the generating comprising, for each of the plurality of potential issues: obtaining data collected during one or more of the plurality of sessions in which the issue occurred; determining a classification of the issue into one of a plurality of impact levels using the data collected during the one or more sessions; and generating, in the GUI, a visual indication of the impact level into which the issue was classified.

40. The method of aspect 39, wherein determining the classification of the issue into one of the plurality of impact levels using the data collected during the one or more sessions comprises: determining values of one or more parameters indicating reaction of one or more users in one or more respective GUIs of the software application in response to occurrence of the issue; and determining the classification of the issue into one of the plurality of impact levels using the values of the one or more parameters.

41. The method of aspect 40, wherein determining the classification of the issue into one of a plurality of impact levels using the data collected during the one or more sessions comprises: determining a plurality of scores corresponding to respective ones of the plurality of impact levels, the plurality of scores including a first score corresponding to a first impact level of the plurality of impact levels; and determining a classification of the issue into the first impact level when the first score is greater than a threshold score.

42 The method of aspect 39, wherein the plurality of impact levels includes a high impact level and a low impact level, and the first impact level is the high impact level.

43. The method of aspect 39, wherein determining the classification of the issue into the one of the plurality of impact levels comprises: generating at least one set of feature values associated with the issue using the data collected during the one or more sessions in which the occurrence of the issue was detected; and providing the at least one set of feature values associated with the issue as input to a trained machine learning model to obtain at least one output; and determining the classification of the issue into the one of the plurality of impact levels using the at least one output.

44 The method of aspect 43, wherein the method further comprises: obtaining, through the GUI, user input indicating an impact designation for a first issue of the plurality of potential issues; generating a plurality of sets of feature values associated with the first issue using data collected during a plurality of sessions in which the first issue occurred; labeling each of the plurality of sets of feature values with one of the plurality of impact levels based on the impact designation for the first issue to obtain a plurality of labeled sets of feature values; and training a machine learning model using the plurality of labeled sets of feature values to obtain the trained machine learning model.

45. The method of aspect 43, wherein the plurality of potential issues includes a first issue classified into a first impact level of the plurality of impact levels, and the method further comprises: receiving, through the GUI, user input indicating a classification of the first issue into a second one of the plurality of impact levels; assigning the second impact level as a label for a set of feature values associated with the first issue; and retraining the trained machine learning model using the set of feature values and the assigned label.

46. The method of aspect 39, wherein the plurality of impact levels includes a first impact level, and the method further comprises: identifying, using impact level classifications determined for the plurality of potential issues, one or more issues classified into the first impact level; and transmitting, to a computing device, an alert for the one or more issues classified into the first impact level.

47. The method of aspect 39, wherein the plurality of impact levels includes a first impact level, and the method further comprises: identifying, using impact level classifications determined for the plurality of potential issues, one or more issues classified into the first impact level; and generating, in the GUI, a listing of the one or more issues classified into the first impact level.

48. The method of aspect 39, further comprising: generating, using data collected during at least one of the at least some sessions, at least one representation of the at least one session, wherein the at least one representation of the at least one session indicates a sequence of events that occurred in the at least one session; and processing the at least one representation of the at least one session using a trained language model to obtain a natural language description of at least one issue that occurred in the at least one session.

49. A non-transitory computer-readable storage medium storing instructions that, when executed by a processor, cause the processor to perform: collecting, during each of a plurality of sessions in which a user of the plurality of users is interacting with the software application, data from a device being used to interact with the software application; detecting occurrences of a plurality of potential issues in at least some of the plurality of sessions; generating, in a graphical user interface (GUI), visual indications of impact levels of the plurality of potential issues, the generating comprising, for each of the detected plurality of issues: obtaining data collected during one or more of the plurality of sessions in which the issue occurred; determining a classification of the issue into one of a plurality of impact levels using the data collected during the one or more sessions; and generating, in the GUI, a visual indication of the impact level into which the issue was classified.

50. The non-transitory computer-readable storage medium of claim 49, wherein the instructions, when executed by the processor, further cause the processor to perform: generating, using data collected during at least one of the at least some sessions, at least one representation of the at least one session, wherein the at least one representation of the at least one session indicates a sequence of events that occurred in the at least one session; and processing the at least one representation of the at least one session using a trained language model to obtain a natural language description of at least one issue that occurred in the at least one session.

The invention claimed is:
1. A system for automatically generating natural language descriptions of issues that occur during interactions of users with a software application, the system comprising:
 a processor; and
 a non-transitory computer-readable storage medium storing instructions that, when executed by the processor, cause the processor to:
  access data collected during at least one software application session in which at least one user was interacting with the software application and in which an issue occurred;
  generate, using the data collected during the at least one software application session, at least one representation of the at least one software application session, wherein the at least one representation of the at least one software application session indicates a sequence of events that occurred in the at least one software application session; and
  process, using a description generation module, the at least one representation of the at least one software application session using an automated series of input/output exchanges between the description generation module and a generative machine learning model to obtain the natural language description of the issue that occurred in the at least one software application session, the processing comprising:
   generate an input to the generative machine learning model that includes at least a portion of the at least one representation of the at least one software application session;
   provide the input to the generative machine learning model to obtain an output;
   generate a subsequent input to the generative machine learning model by processing the output;
   provide the subsequent input to the generative machine learning model to obtain a subsequent output; and
   generate the natural language description of the issue using the subsequent output obtained from the generative machine learning model.

2. The system of claim 1, wherein the generative machine learning model is a large language model.

3. The system of claim 1, wherein the generative machine learning model comprises a transformer model.

4. The system of claim 1, wherein:
 the output indicates whether any issue occurred in the at least one software application session; and
 generating the subsequent input to the generative machine learning model by processing the output comprises:
  when the output indicates that the issue occurred in the at least one software application session:
   generate, as the subsequent input, a request for the generative machine learning model to generate the natural language description of the issue.

5. The system of claim 4, wherein generating the input comprises:
 generate a query for whether any issue occurred in the at least one software application session.

6. The system of claim 1, wherein the instructions further cause the processor to:
 determine, using the data collected during the at least one software application session, whether the at least one software application session meets one or more rules; and
 process the at least one representation of the at least one software application session using the generative machine learning model to obtain the natural language description of the issue that occurred in the at least one software application session when it is determined that the at least one software application session meets the one or more rules.

7. The system of claim 6, wherein determining, using the data collected during the at least one software application session, whether the at least one software application session meets the one or more rules comprises:
 determine whether repeated user activity occurred proximate occurrence of the issue in the at least one software application session.

8. The system of claim 6, wherein determining, using the data collected during the at least one software application session, whether the at least one software application session meets the one or more rules comprises:
 determine whether the at least one representation includes a threshold number of events in the at least one representation of the at least one software application session.

9. The system of claim 6, wherein determining, using the data collected during the at least one software application session, whether the at least one software application session meets the one or more rules comprises:
 determine whether a particular error occurred in the software application during the at least one software application session.

10. The system of claim 1, wherein:
 the at least one software application session comprises a plurality of software application sessions;

the at least one representation of the at least one software application session comprises a plurality of representations of the plurality of software application sessions; and processing, using the description generation module, the at least one representation of the at least one software application session using the automated series of input/output exchanges between the description generation module and the generative machine learning model to obtain the natural language description of the issue that occurred in the at least one software application session comprises:

process the plurality of session representations using the generative machine learning model to determine whether the issue occurred in at least a threshold number of the plurality of software application sessions; and when it is determined that the issue occurred in at least the threshold number of the plurality of software application sessions:

provide input to the generative machine learning model requesting the natural language description of the issue.

11. The system of claim 10, wherein the threshold number of software application sessions is 3 software application sessions.

12. The system of claim 10, wherein processing the plurality of session representations using the generative machine learning model to determine whether the issue occurred in at least a threshold number of the plurality of software application sessions comprises:

process a first one of the plurality of representations using the generative machine learning model to obtain a first output indicating that an issue occurred in a first one of the plurality of software application sessions;

process a second one of the plurality of representations using the generative machine learning model to obtain a second output indicating whether the issue that occurred in the first software application session occurred in a second one of the plurality of software application sessions; and determine whether the issue occurred in the threshold number of the plurality of software application sessions based at least in part on the first output and the second output.

13. The system of claim 1, wherein generating the input comprises:

identify a portion of the at least one representation of the at least one software application session; and generate the input for the generative machine learning model that includes the identified portion of the at least one representation of the at least one software application session and excludes portions of the at least one representation of the at least one software application session that is outside of the identified portion.

14. The system of claim 13, wherein identifying the portion of the at least one representation of the at least one software application session comprises:

identify a portion of the at least one representation of the at least one software application session corresponding to a reaction of the at least one user to occurrence of the issue.

15. The system of claim 1, wherein generating, using the data collected during the at least one software application session, the at least one representation of the at least one software application session comprises:

generating, for the at least one software application session, at least one textual transcription of the sequence of events that occurred in the at least one software application session.

16. The system of claim 1, wherein generating, using the data collected during the at least one software application session, the at least one representation of the at least one software application session comprises:

generating, for the at least one software application session, at least one image and/or video indicating the sequence of events that occurred in the at least one software application session.

17. The system of claim 1, wherein the instructions further cause the processor to:

detect occurrence of the issue in the at least one software application session; and determine a classification of the issue into one of a plurality of impact levels using the data collected during the at least one software application session;

wherein processing the at least one representation of the at least one software application session comprises performing the processing when the issue is classified into a first impact level of the plurality of impact levels.

18. The system of claim 17, wherein determining the classification of the issue into one of the plurality of impact levels using the data collected during the at least one software application session comprises:

generating a set of feature values associated with the issue using the data collected during the at least one software application session; and providing the set of feature values associated with the issue as input to a trained machine learning model to obtain output indicating the classification of the issue into the first impact level.

19. The system of claim 17, wherein determining the classification of the issue into one of the plurality of impact levels using the data collected during the at least one software application session comprises:

determining values of one or more parameters indicating reaction of one or more users in one or more respective GUIs of the software application in response to occurrence of the issue; and determining the classification of the issue into one of the plurality of impact levels using the values of the one or more parameters.

20. A method for automatically generating natural language descriptions of issues that occur during interactions of users with a software application, the method comprising:

using a processor to perform:

accessing data collected during at least one software application session in which at least one user was interacting with the software application and in which an issue occurred;

generating, using the data collected during the at least one software application session, at least one representation of the at least one software application session, wherein the at least one representation of the at least one software application session indicates a sequence of events that occurred in the at least one software application session; and processing, using a description generation module, the at least one representation of the at least one software application session using an automated series of input/output exchanges between the description generation module and a generative machine learning model to obtain the natural language description of the issue that occurred in the at least one software application session, the processing comprising:

generating, an input to the generative machine learning model that includes at least a portion of the at least one representation of the at least one software application session;

providing the input to the generative machine learning model to obtain an output;

generating a subsequent input to the generative machine learning model by processing the output;

providing the subsequent input to the generative machine learning model to obtain a subsequent output; and generating the natural language description of the issue using the subsequent output obtained from the generative machine learning model.

21. A non-transitory computer-readable storage medium storing instructions that, when executed by a processor, cause the processor to perform a method for automatically generating natural language descriptions of issues that occur during interactions of users with a software application, the method comprising:

accessing data collected during at least one software application session in which at least one user was interacting with the software application and in which an issue occurred;

generating, using the data collected during the at least one software application session, at least one representation of the at least one software application session, wherein the at least one representation of the at least one software application session indicates a sequence of events that occurred in the at least one software application session; and processing, using a description generation module, the at least one representation of the at least one software application session using an automated series of input/output exchanges between the description generation module and a generative machine learning model to obtain the natural language description of the issue that occurred in the at least one software application session, the processing comprising:

generating, an input to the generative machine learning model that includes at least a portion of the at least one representation of the at least one software application session;

providing the input to the generative machine learning model to obtain an output;

generating a subsequent input to the generative machine learning model by processing the output;

providing the subsequent input to the generative machine learning model to obtain a subsequent output; and generating the natural language description of the issue using the subsequent output obtained from the generative machine learning model.

* * * * *